United States Patent [19]

Wakabayashi et al.

[11] Patent Number: 5,461,705
[45] Date of Patent: Oct. 24, 1995

[54] INFORMATION PROCESSING DEVICE IN AN ELECTRONIC APPARATUS UTILIZING AN ACCESSORY CONTROL DEVICE AND METHODS OF APPLICATION

[75] Inventors: Kenichi Wakabayashi; Chitoshi Takayama; Tadashi Shiozaki, all of Suwa, Japan

[73] Assignee: Seiko Epson Corporation, Japan

[21] Appl. No.: 883,753

[22] Filed: May 15, 1992

Related U.S. Application Data

[63] Continuation-in-part of Ser. No. 816,455, Dec. 30, 1991, Pat. No. 5,410,641.

[30] Foreign Application Priority Data

Feb. 24, 1992 [WO] WIPO .................. PCT/JP92/00197
Oct. 23, 1991 [JP] Japan ............................ 3-05457

[51] Int. Cl.$^6$ .................................................. G06K 15/00
[52] U.S. Cl. ............................................. 395/115; 395/113
[58] Field of Search ................................ 395/112, 114, 395/115, 116, 164, 165, 166, 163; 400/61, 62, 70, 76, 67

[56] References Cited

U.S. PATENT DOCUMENTS

| 4,441,164 | 4/1984 | Pavan et al. | 395/115 |
|---|---|---|---|
| 4,730,947 | 3/1988 | Ikeda et al. | 400/61 |
| 4,872,091 | 10/1989 | Maniwa et al. | 361/424 |
| 4,908,637 | 3/1990 | Chung et al. | 346/160 |
| 4,949,188 | 8/1990 | Sato | 358/448 |
| 5,041,918 | 8/1991 | Ishida et al. | 358/442 |
| 5,109,490 | 4/1992 | Arimilli et al. | 395/325 |
| 5,137,379 | 8/1992 | Ukai et al. | 400/121 |

FOREIGN PATENT DOCUMENTS

| 0383518 | 8/1990 | European Pat. Off. . |
|---|---|---|
| 211285 | 12/1983 | Japan . |
| 52884 | 4/1985 | Japan . |
| 52885 | 4/1985 | Japan . |
| 142730 | 7/1985 | Japan . |
| 218939 | 11/1985 | Japan . |
| 196495 | 8/1986 | Japan . |
| 5875 | 1/1987 | Japan . |
| 1181 | 1/1987 | Japan . |
| 14689 | 1/1987 | Japan . |
| 75991 | 4/1987 | Japan . |
| 111776 | 5/1987 | Japan . |
| 299892 | 12/1987 | Japan . |
| 41163 | 2/1988 | Japan . |
| 255750 | 10/1988 | Japan . |
| 250788 | 10/1988 | Japan . |
| 7281 | 1/1989 | Japan . |
| 159274 | 6/1989 | Japan . |
| 58789 | 2/1990 | Japan . |
| 37590 | 2/1990 | Japan . |
| 64728 | 3/1990 | Japan . |
| 122343 | 5/1990 | Japan . |
| 121023 | 5/1990 | Japan . |
| 159615 | 6/1990 | Japan . |
| 155675 | 6/1990 | Japan . |
| 244851 | 9/1990 | Japan . |
| 253289 | 10/1990 | Japan . |
| 249022 | 10/1990 | Japan . |

(List continued on next page.)

Primary Examiner—Arthur G. Evans

[57] ABSTRACT

An accessory control device for use in conjunction with electronic apparatus, such as, a laser printer and the information processing device and information processing methods for use of the accessory control device. The accessory control device may comprise a cartridge installed in the laser printer and include a RISC-type processor and a data transfer controller. The cartridge microprocessor receives print data via a read control circuit disposed within a data transfer controller or a FIFO control circuit and develops the print data into image data after which the image data is stored in a cartridge memory. The image data is then transferred to the electronic control device of the laser printer via a double-bank control circuit. The read control circuit and double-bank control circuit transfer print data to the printer microprocessor via a data bus, which has a read only capability as viewed from the electronic control device. This image data is then printed by a laser print engine of the printer under the control of the printer processor.

28 Claims, 28 Drawing Sheets

FOREIGN PATENT DOCUMENTS

| | | |
|---|---|---|
| 288985 | 11/1990 | Japan . |
| 301890 | 12/1990 | Japan . |
| 301463 | 12/1990 | Japan . |
| 22160 | 1/1991 | Japan . |
| 45365 | 2/1991 | Japan . |
| 51938 | 3/1991 | Japan . |
| 53635 | 3/1991 | Japan . |
| 9012359 | 10/1990 | WIPO . |

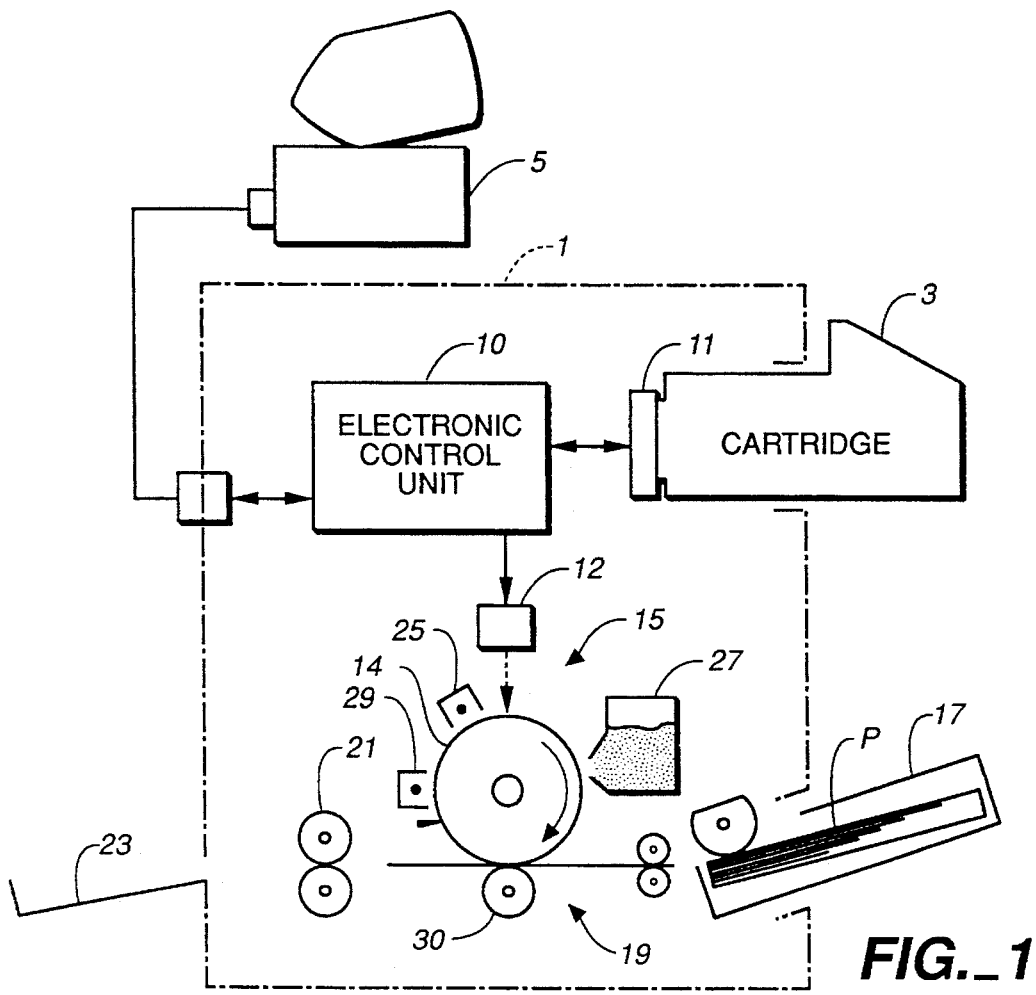
FIG._1
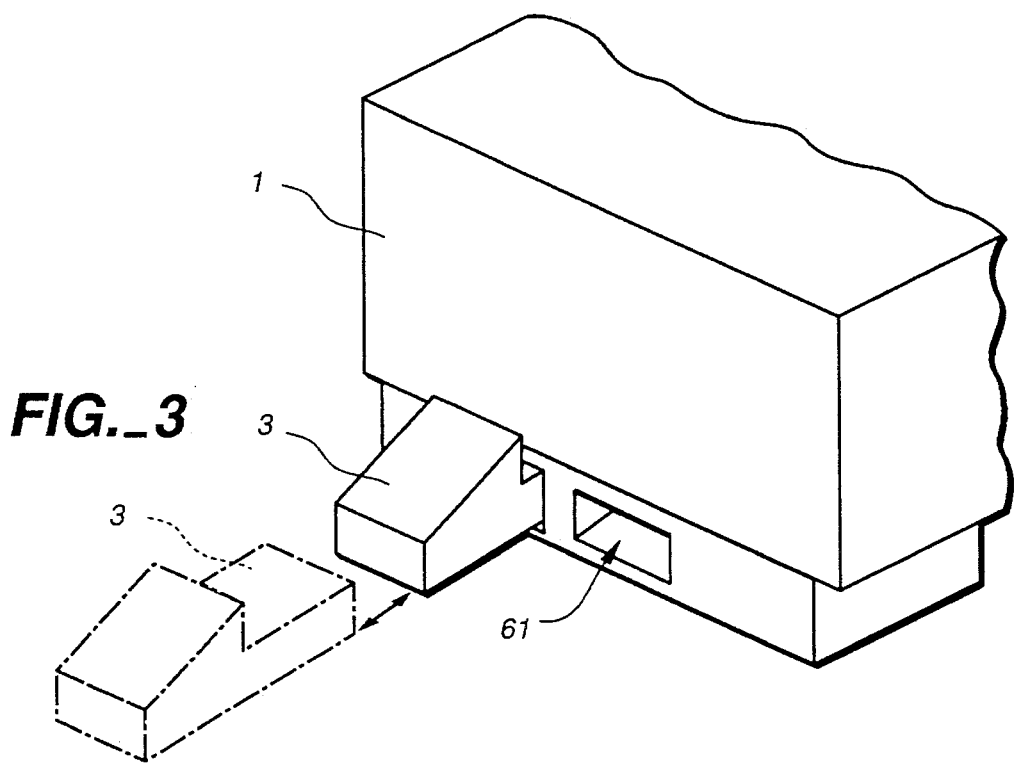
FIG._3

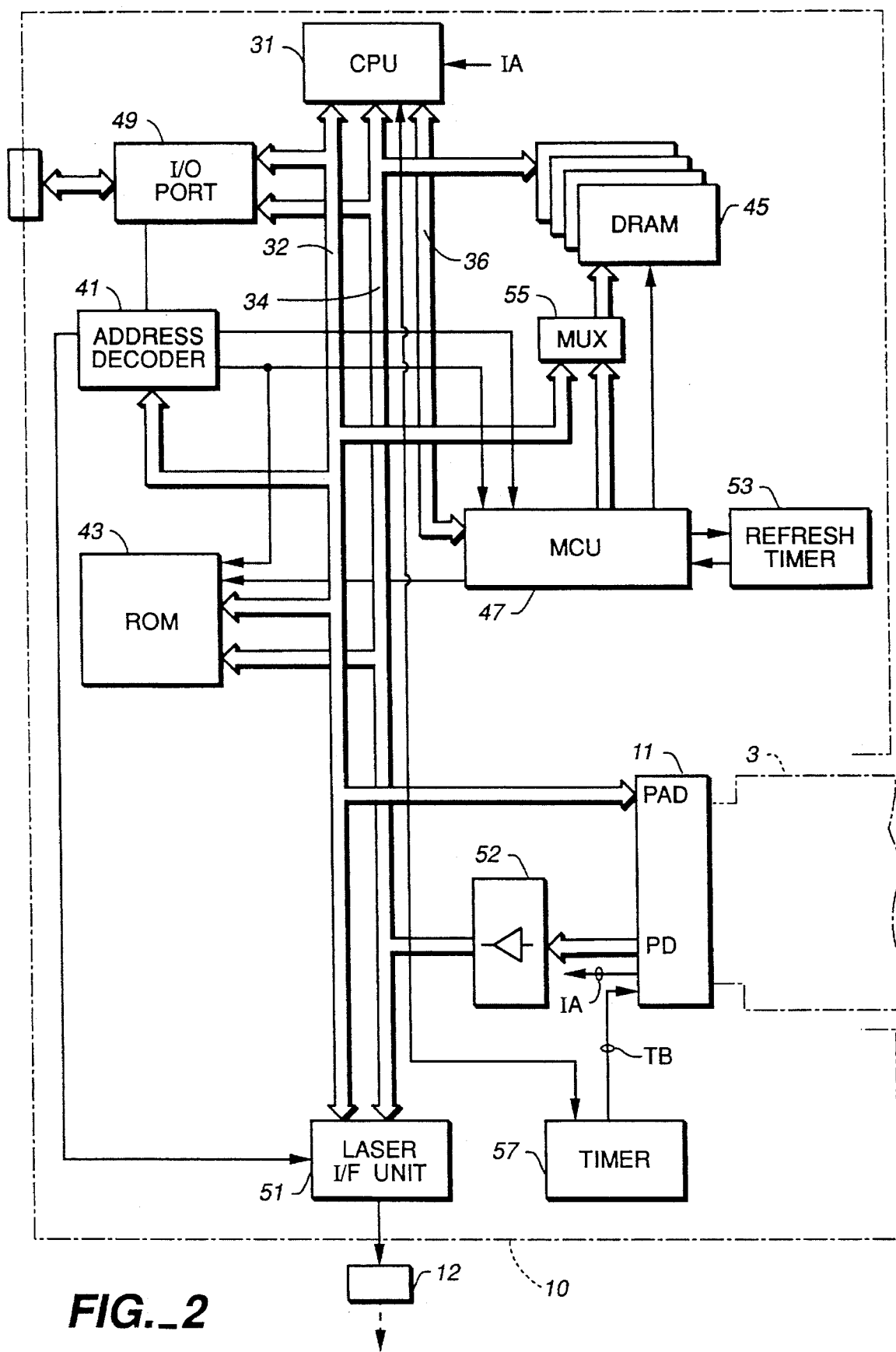
FIG._2

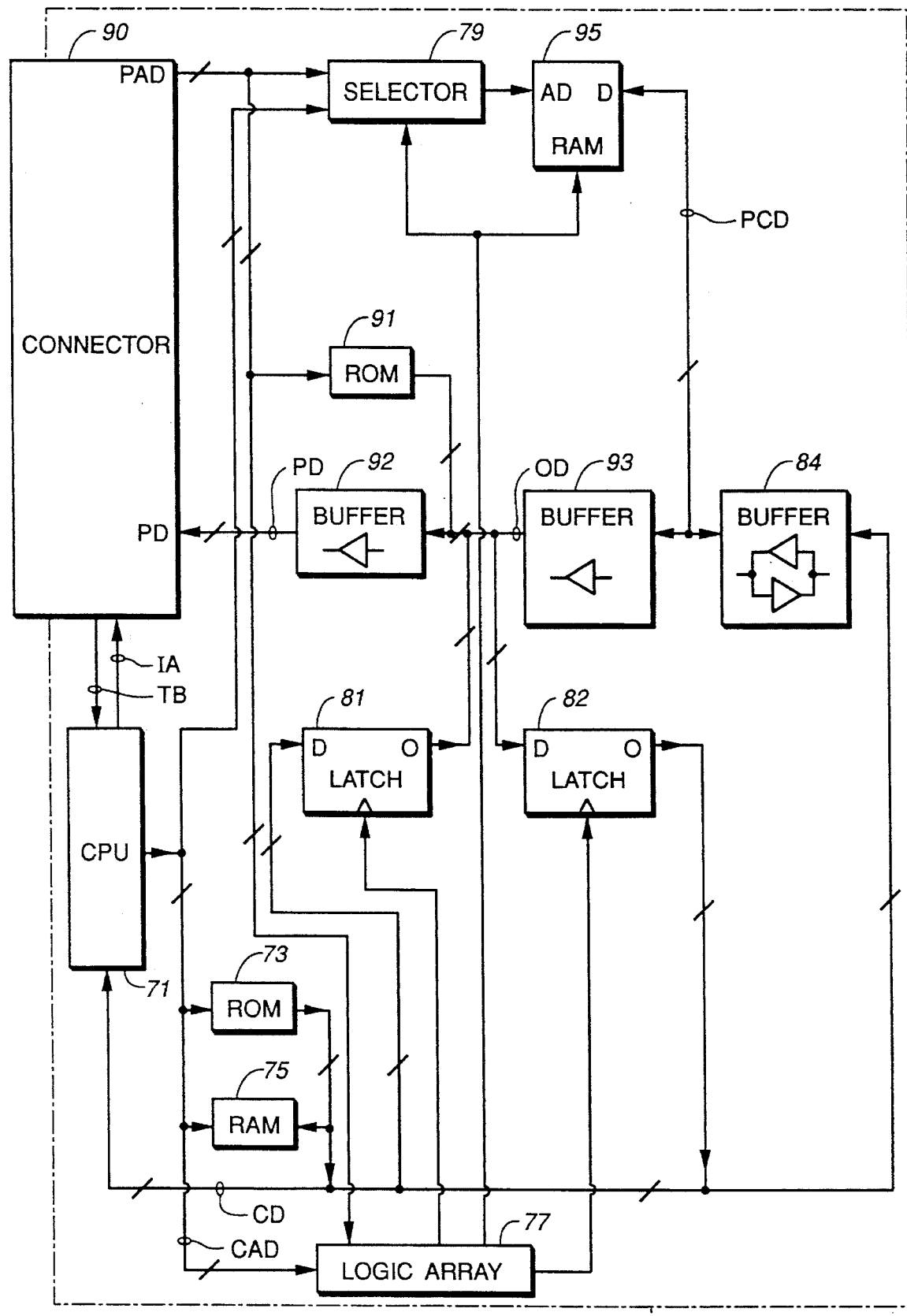
FIG._4

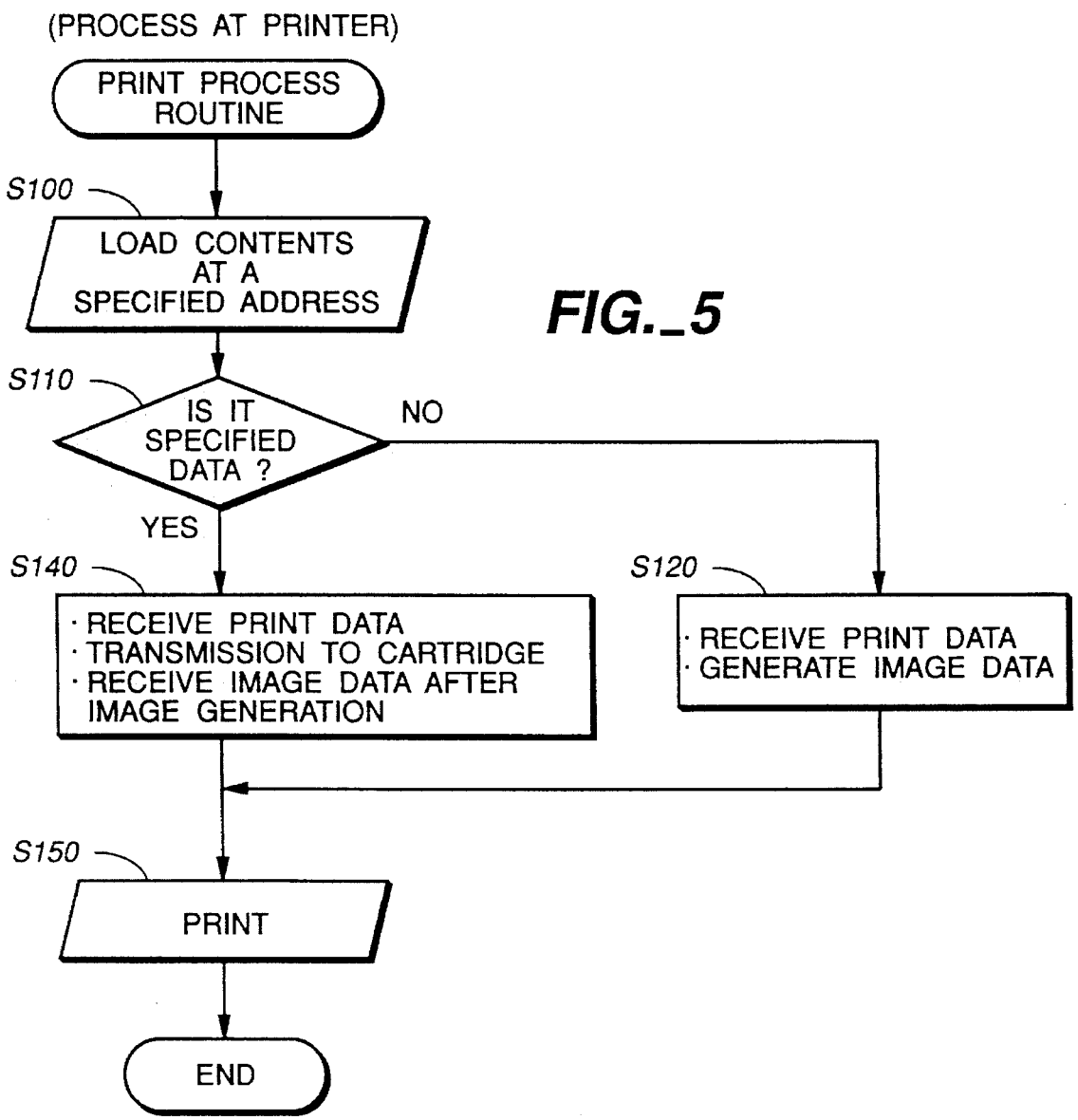
FIG._5
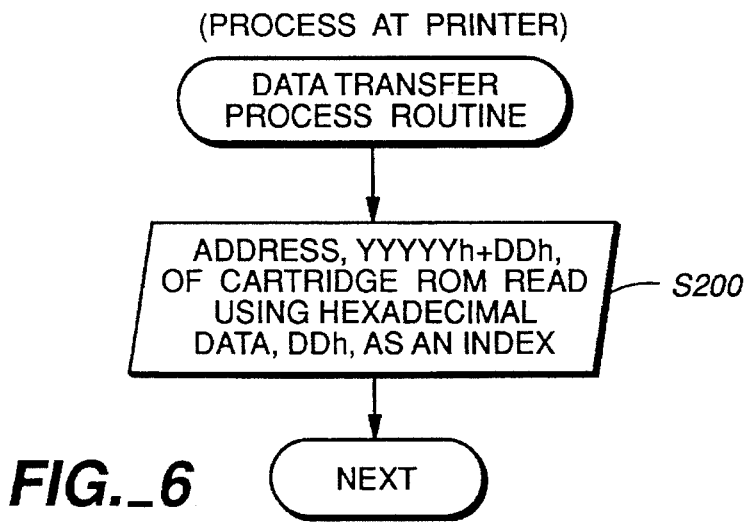
FIG._6

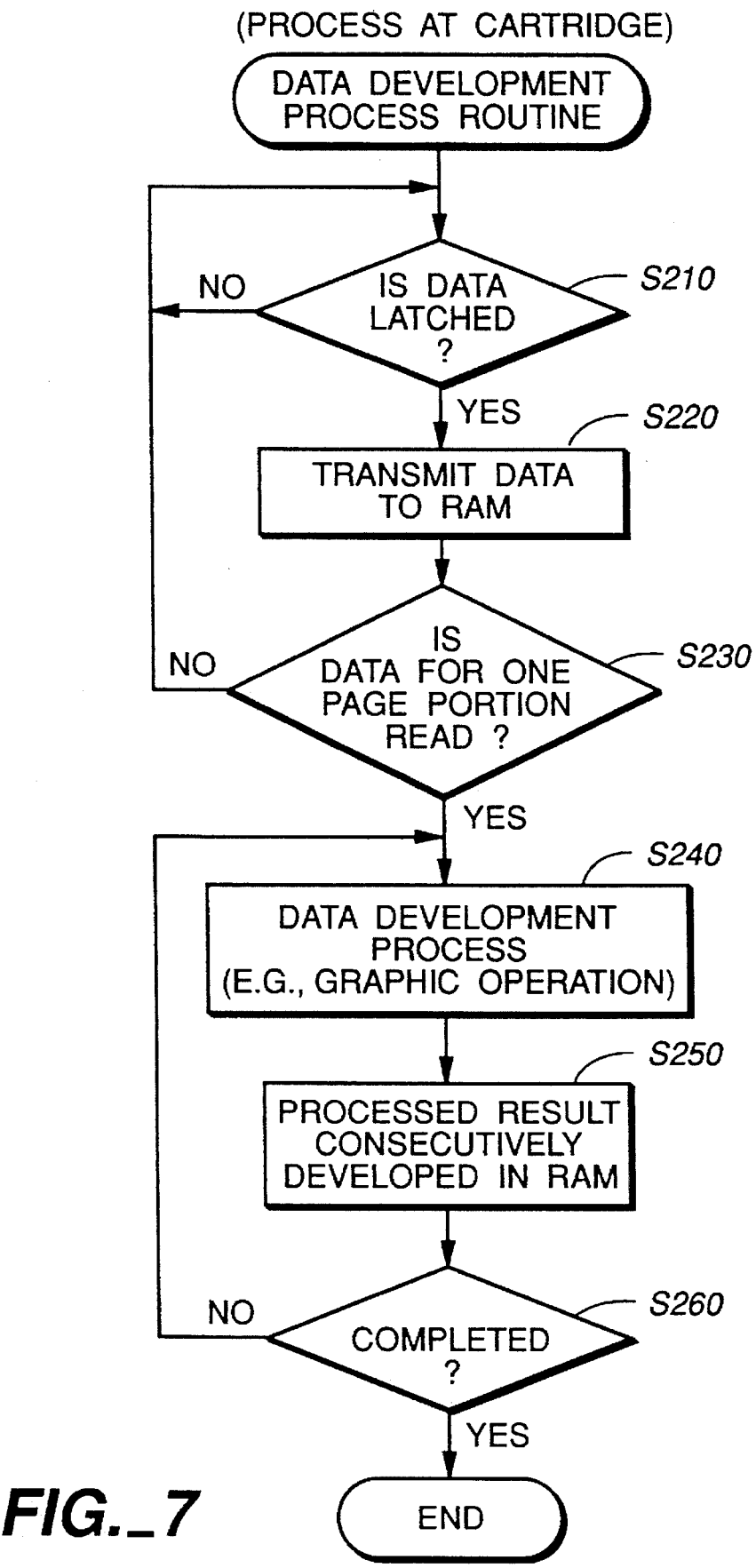
FIG._7

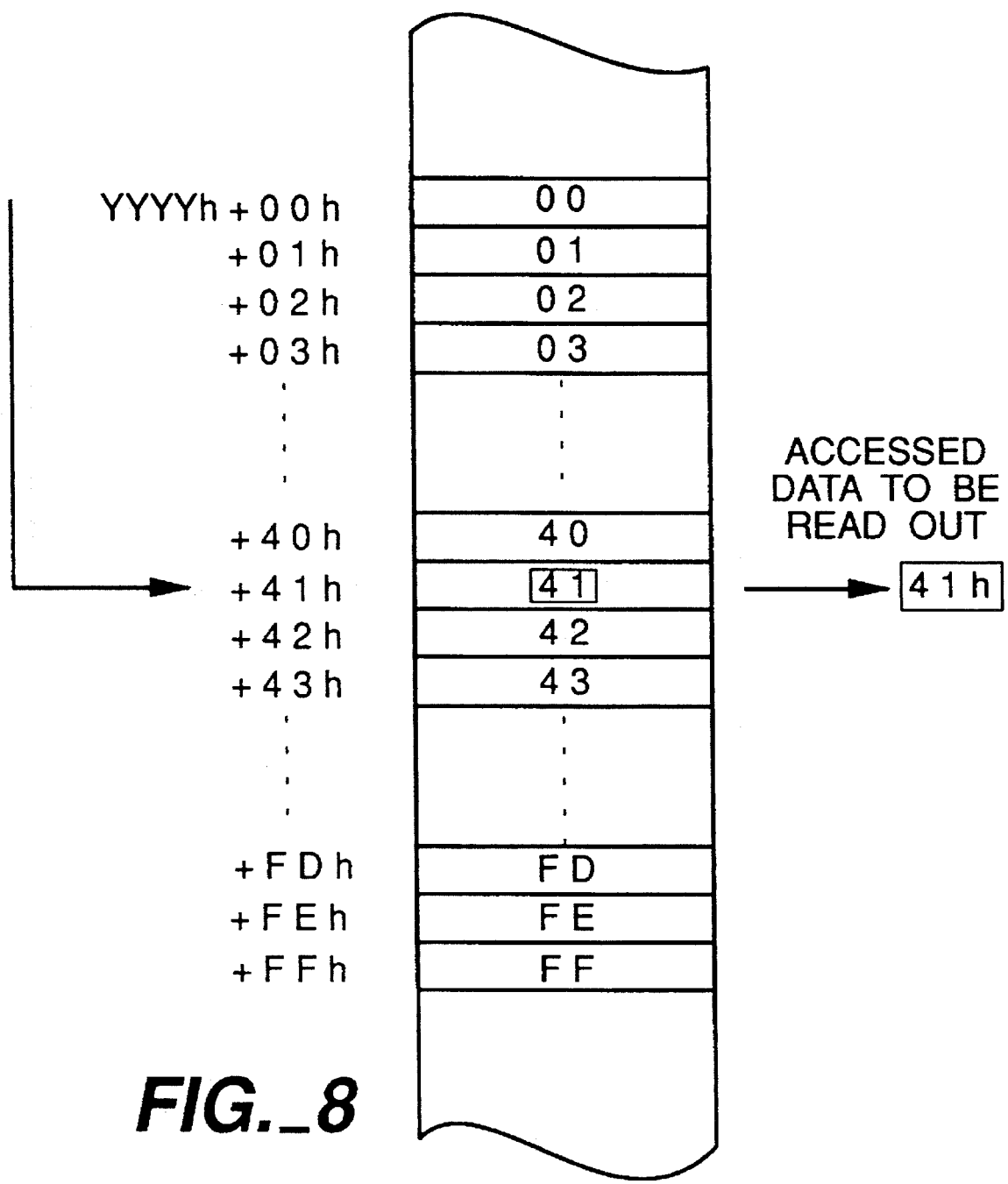
FIG._8

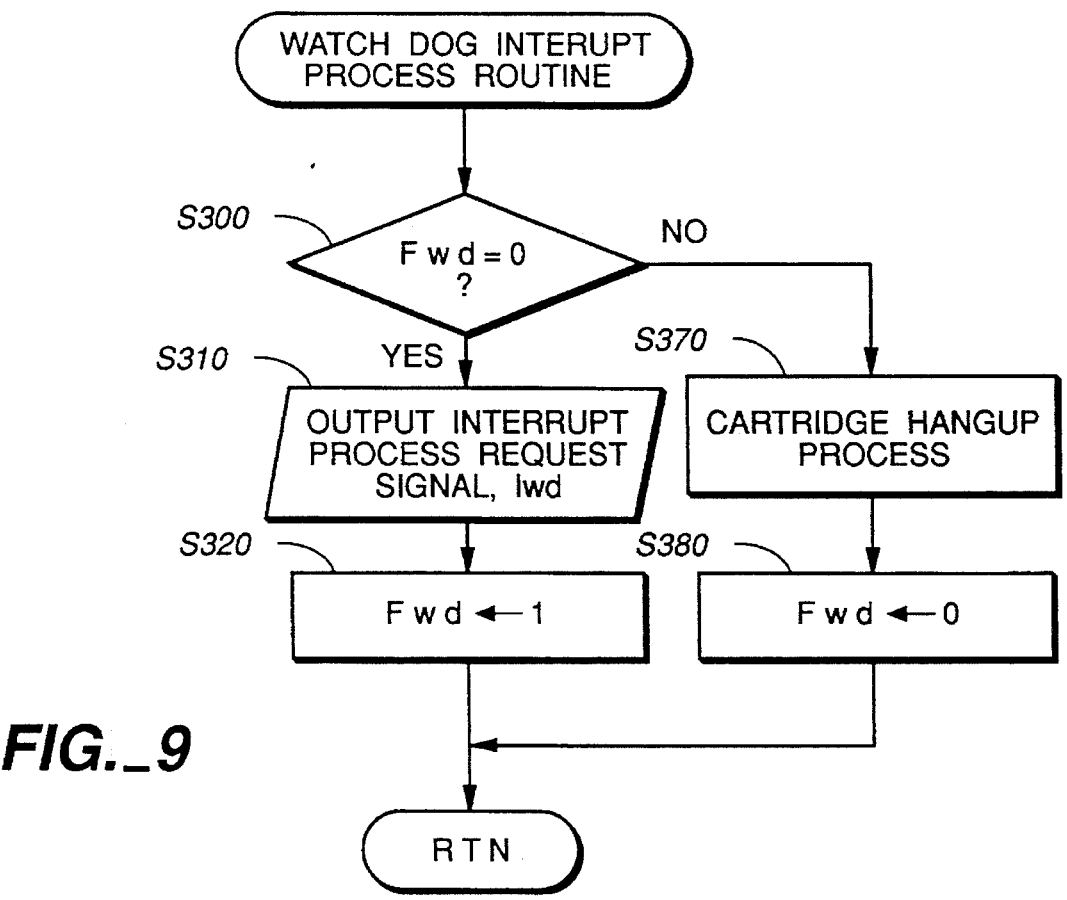
FIG._9
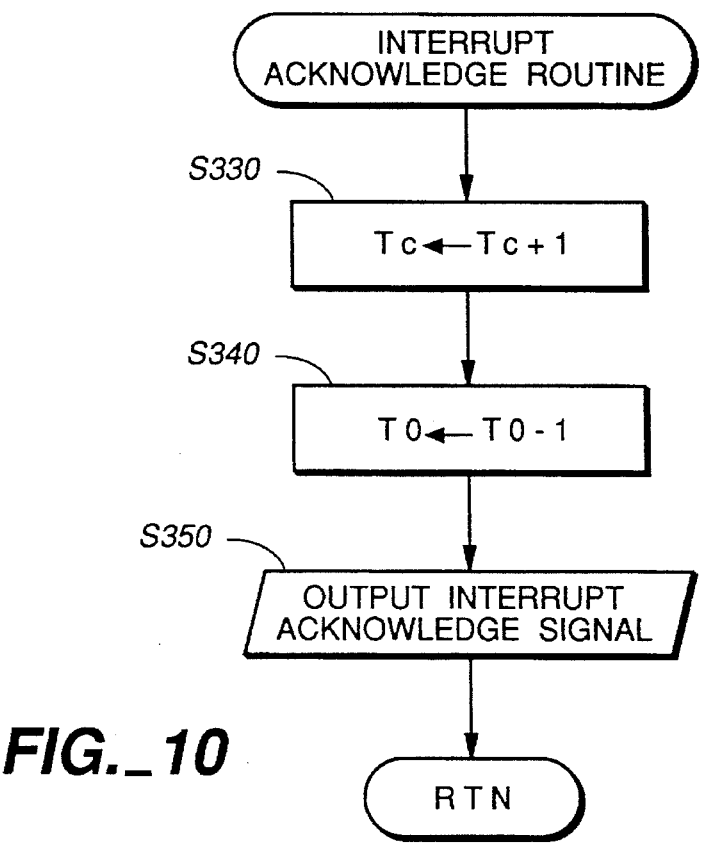
FIG._10

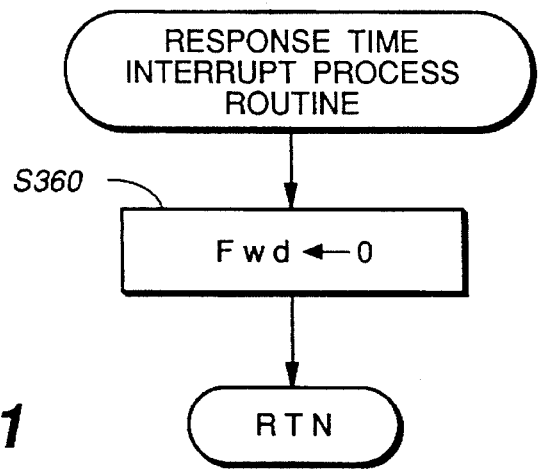
FIG._11
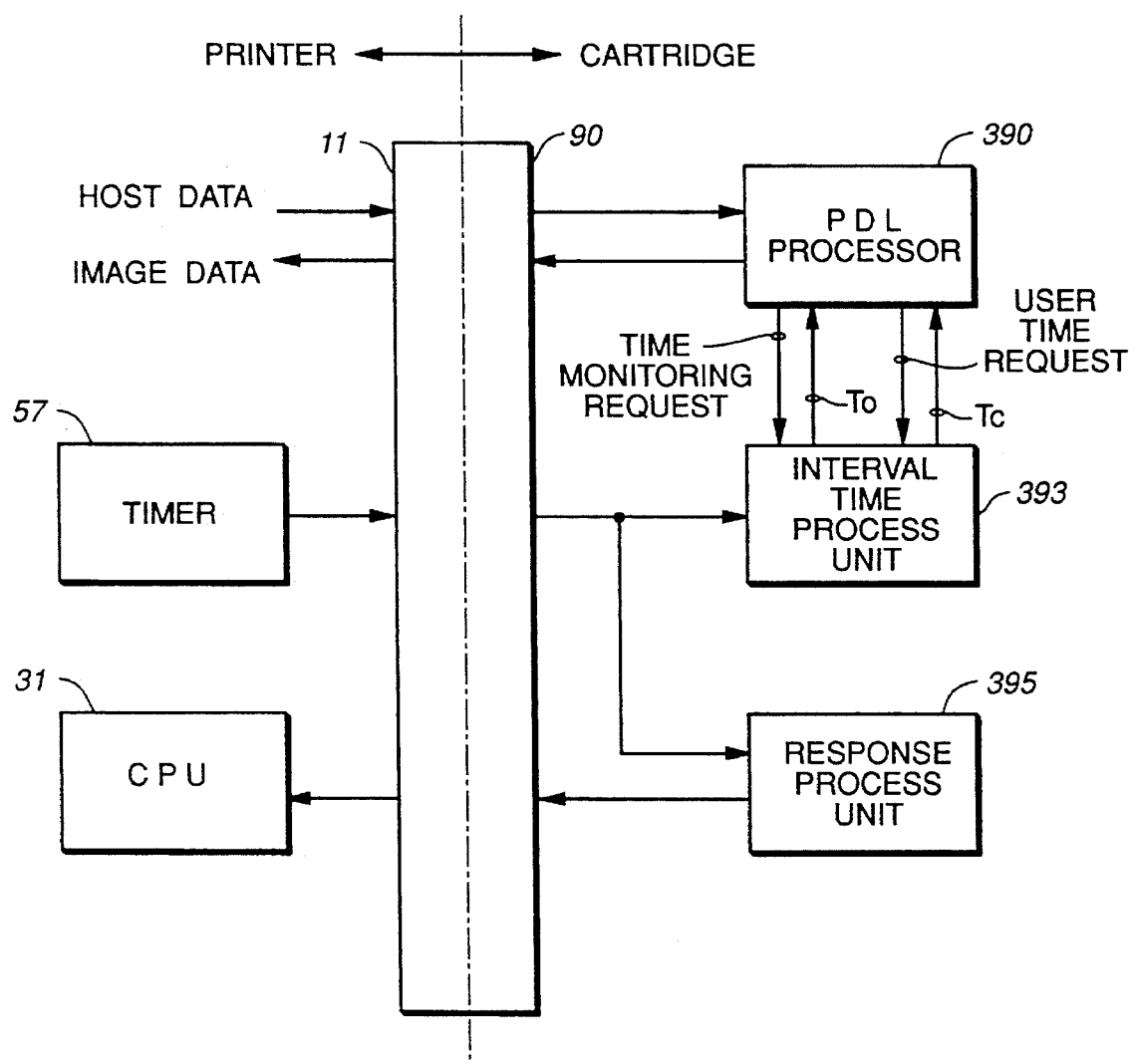
FIG._12

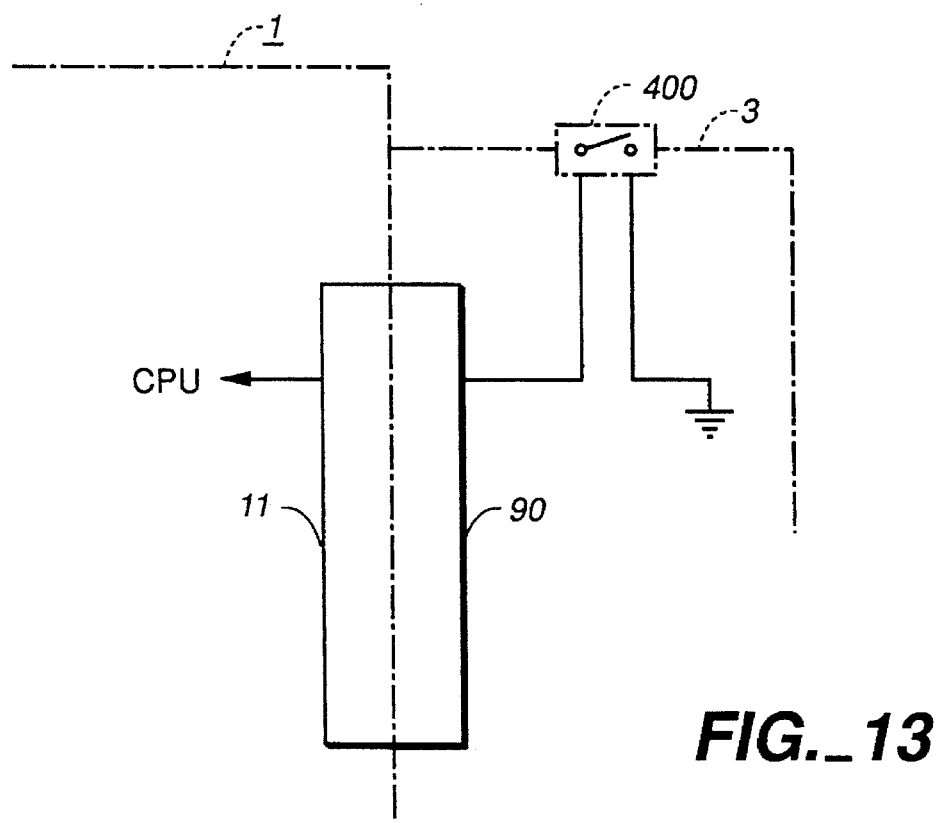
FIG._13
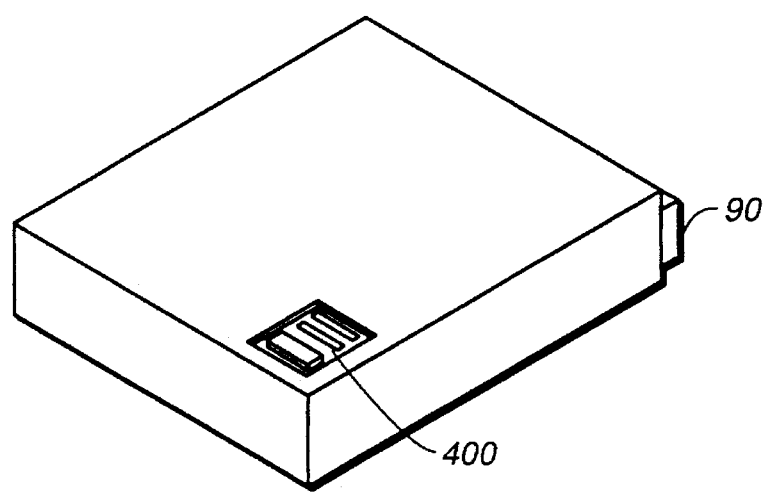
FIG._14

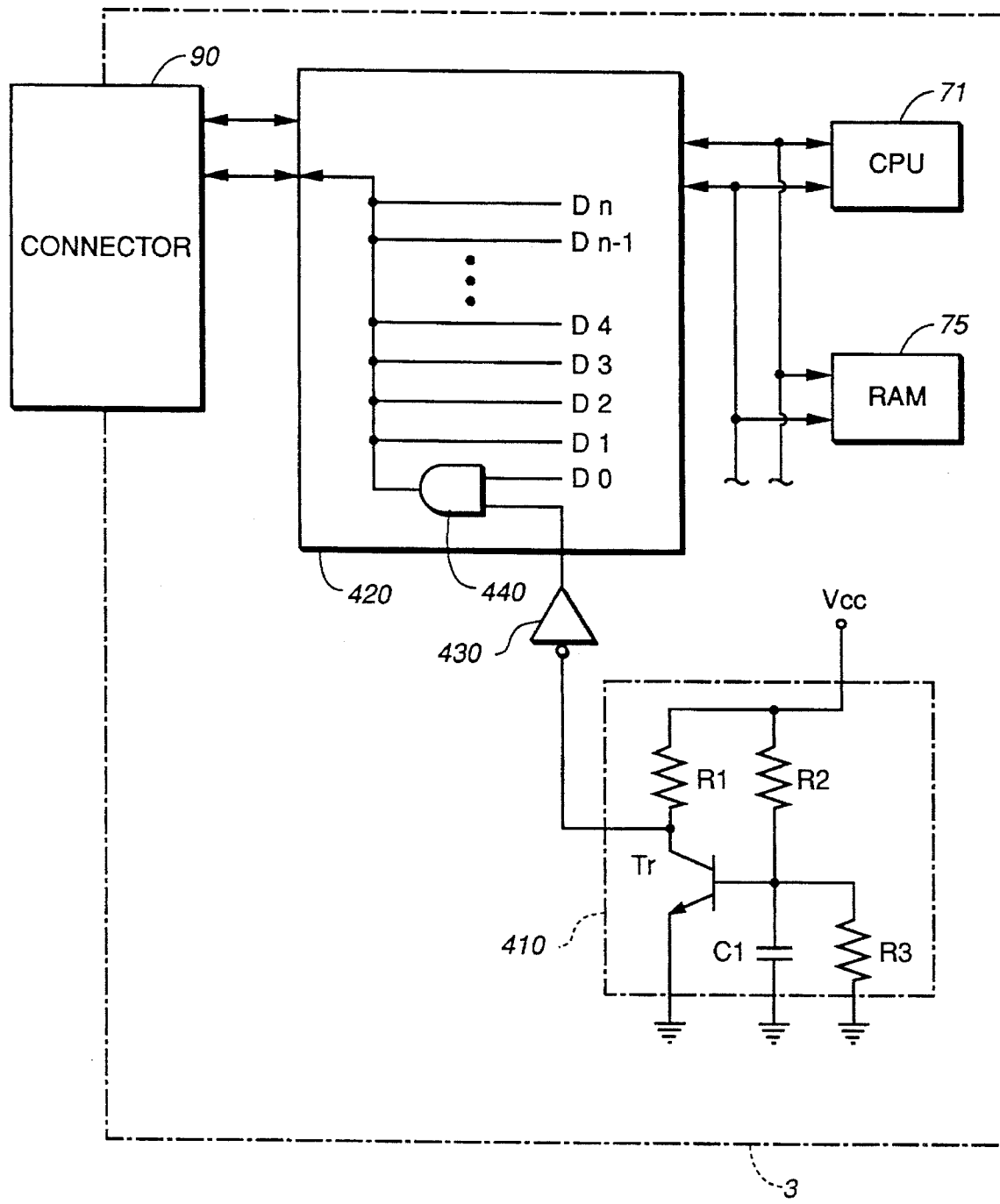
FIG._15

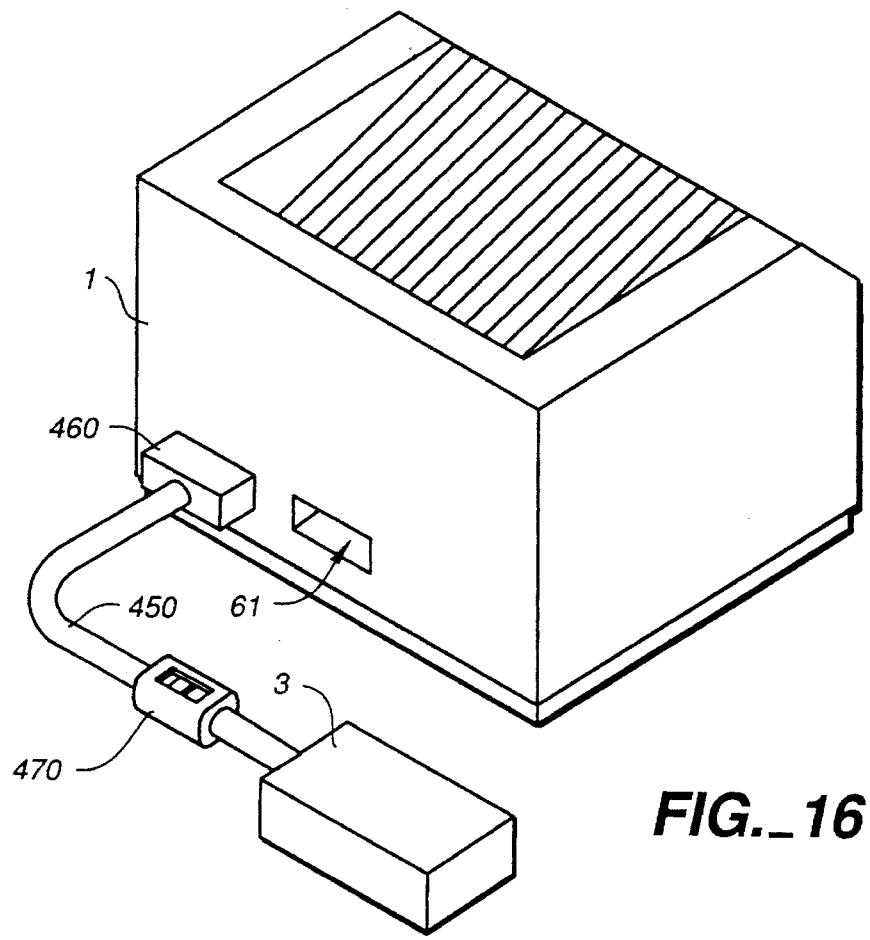
FIG._16
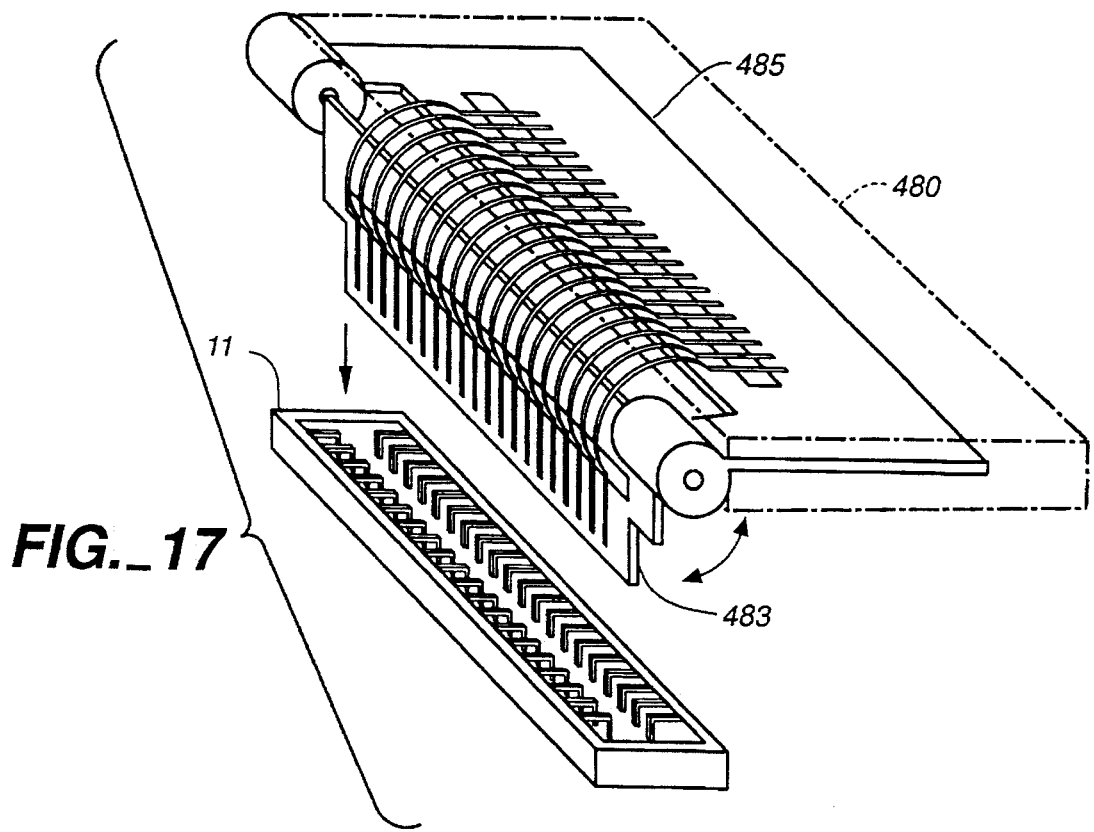
FIG._17

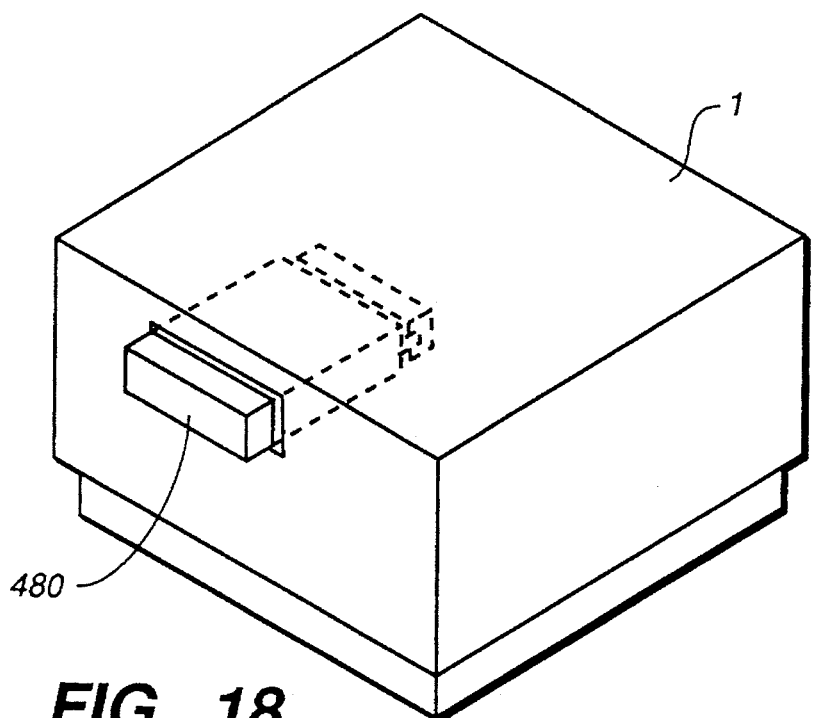
FIG._18
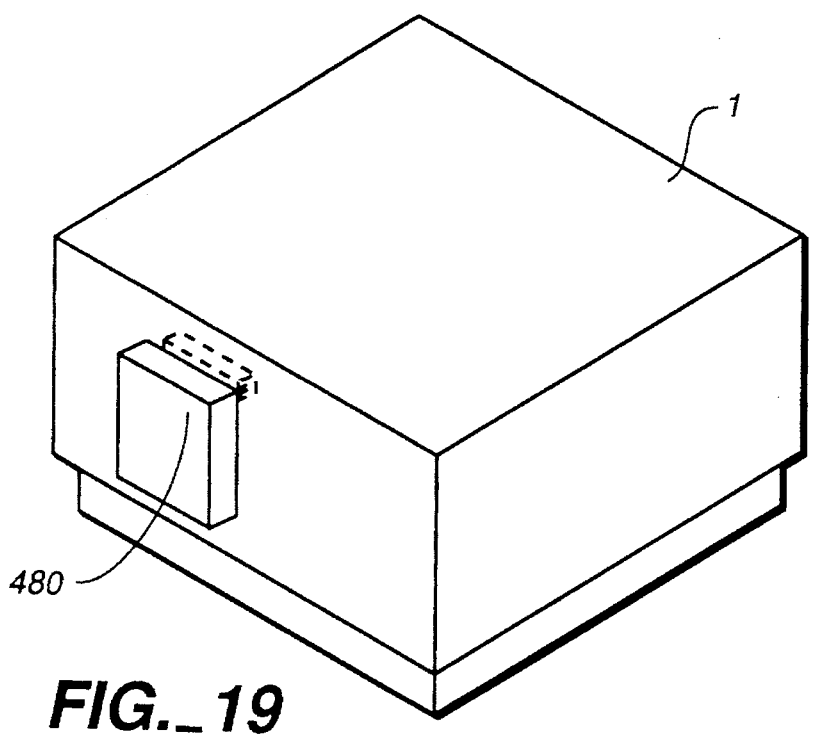
FIG._19

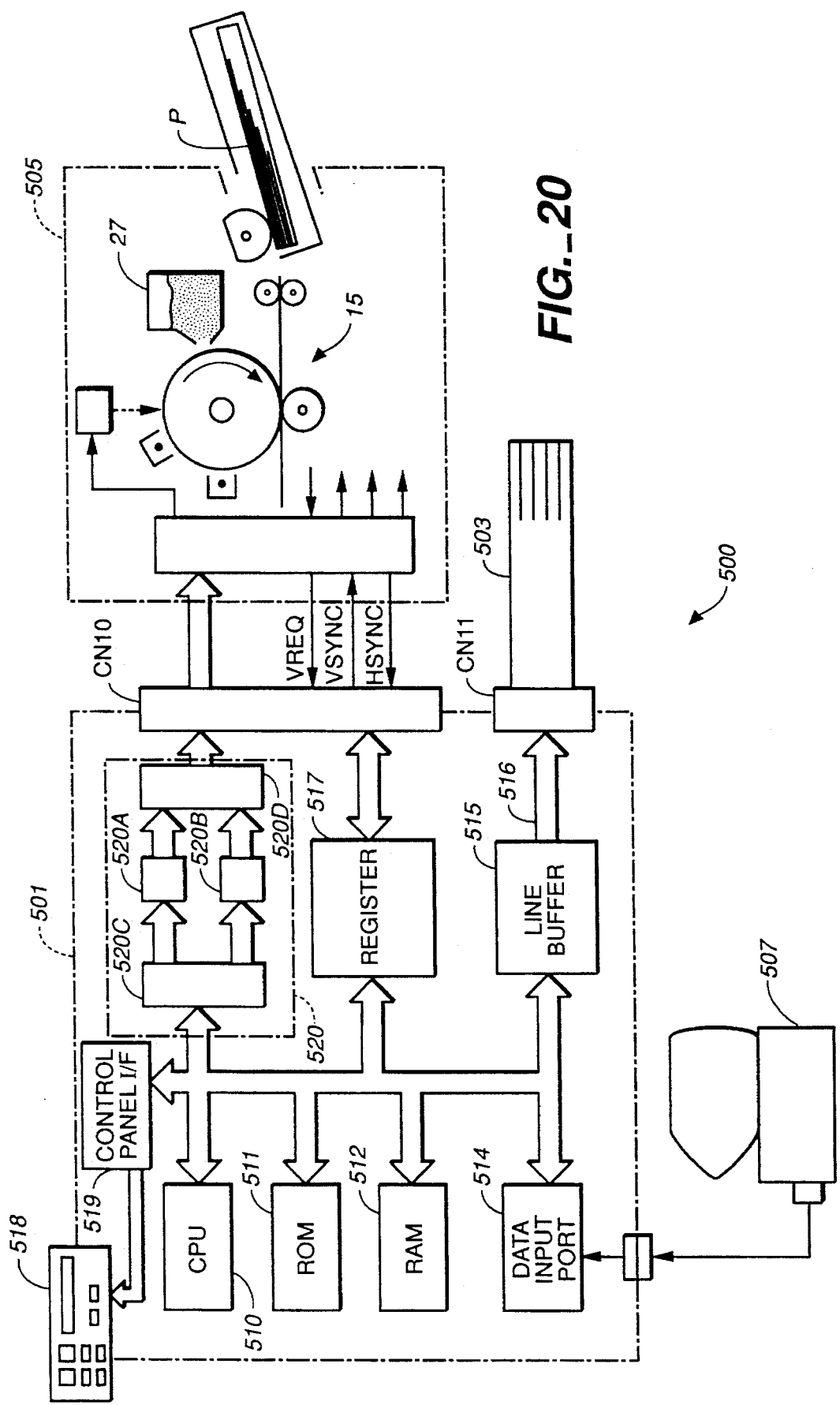
FIG._20

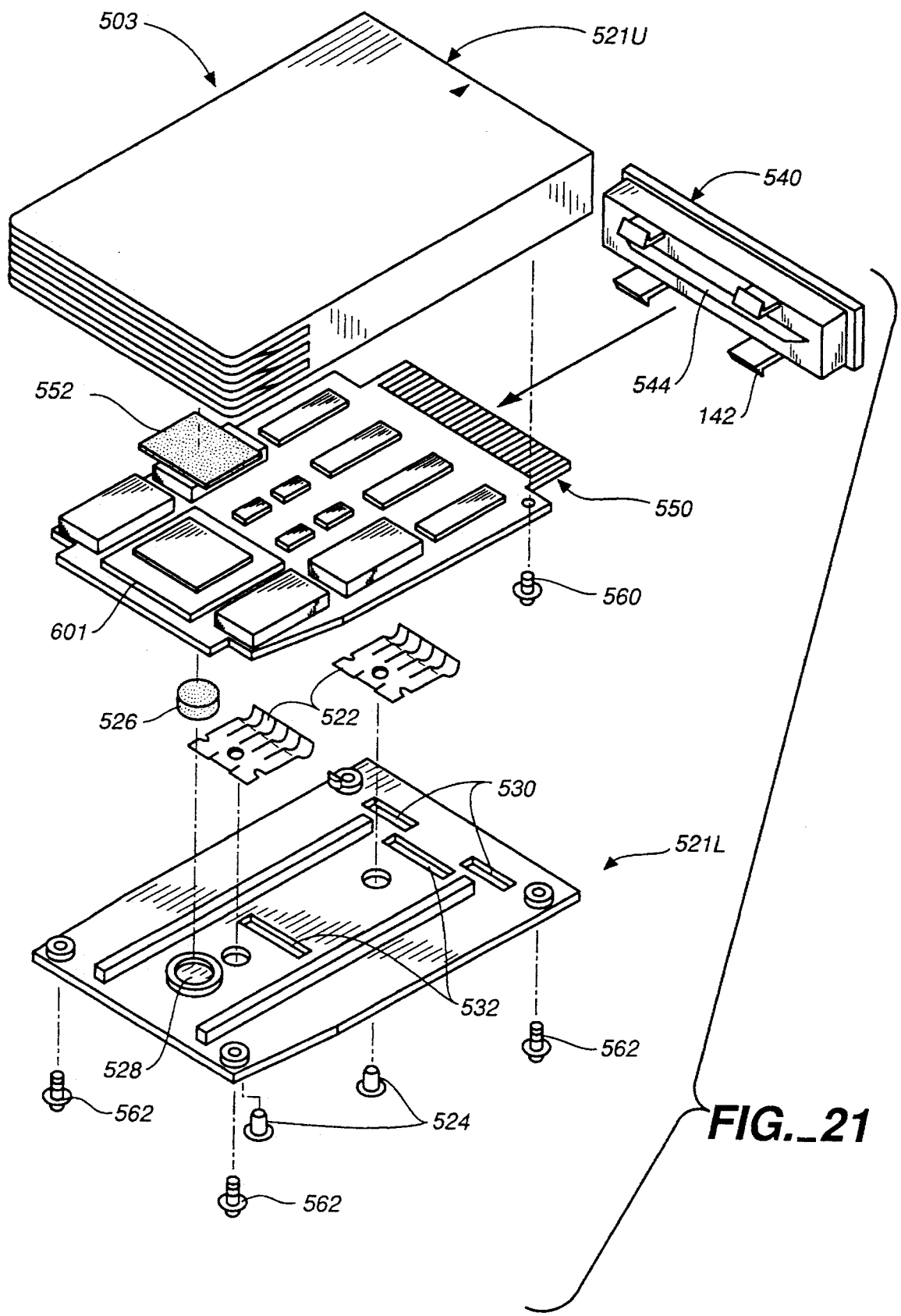
FIG._21

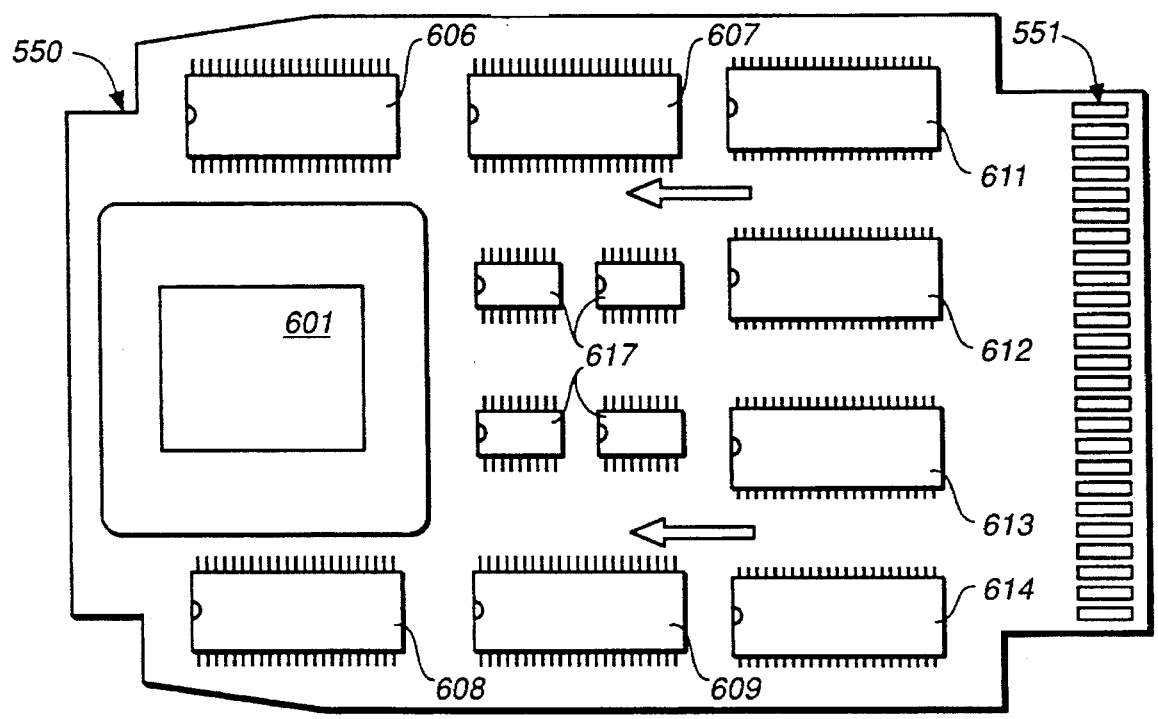
FIG._22A
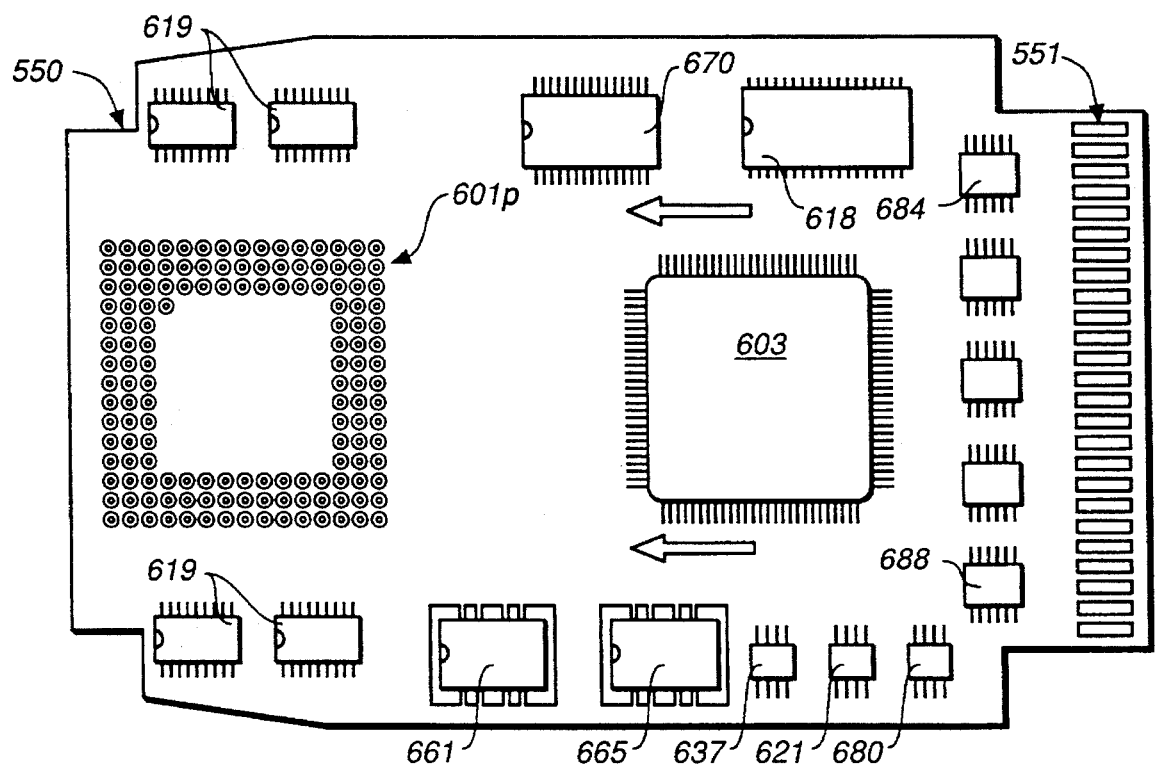
FIG._22B

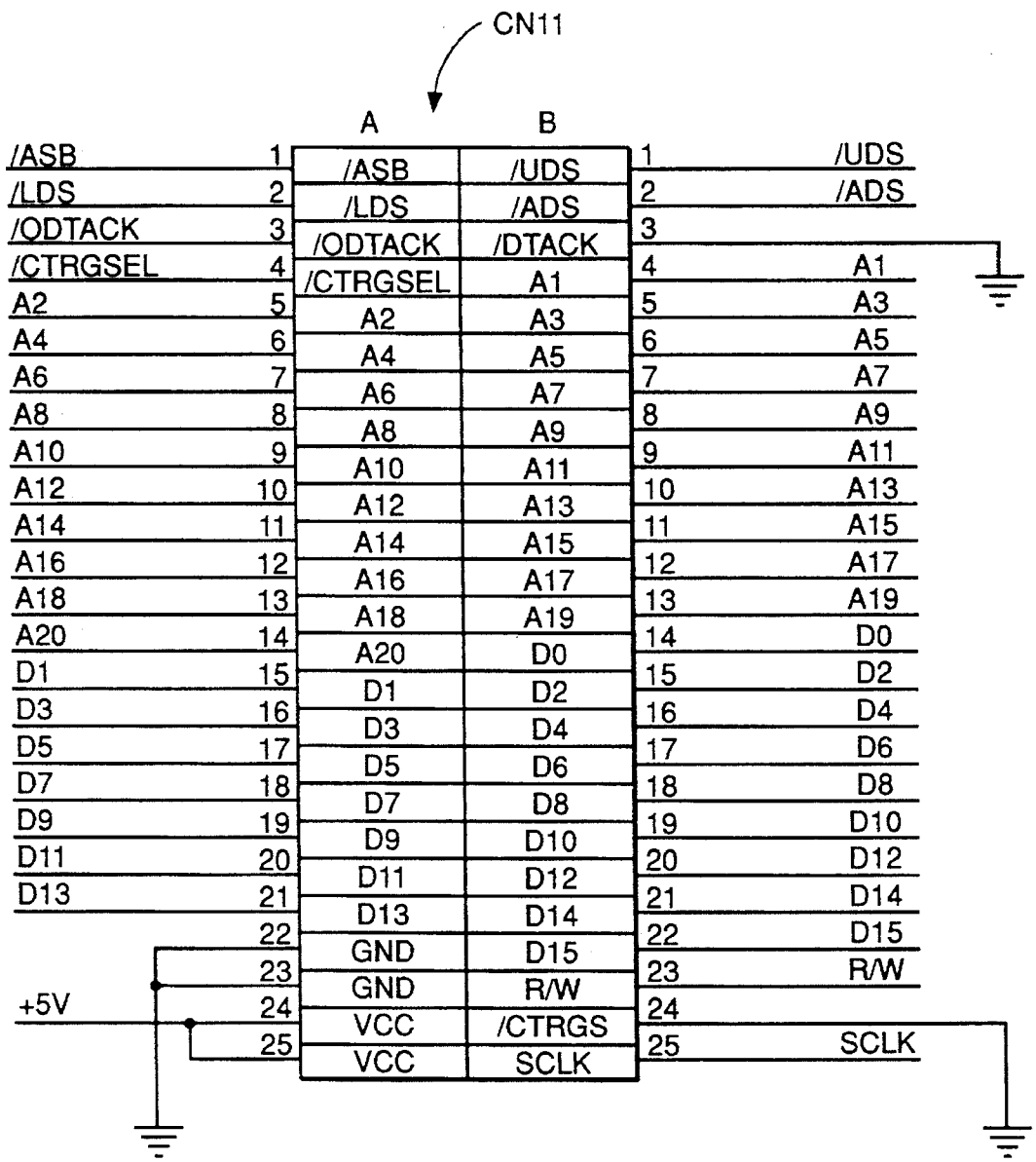
FIG._23
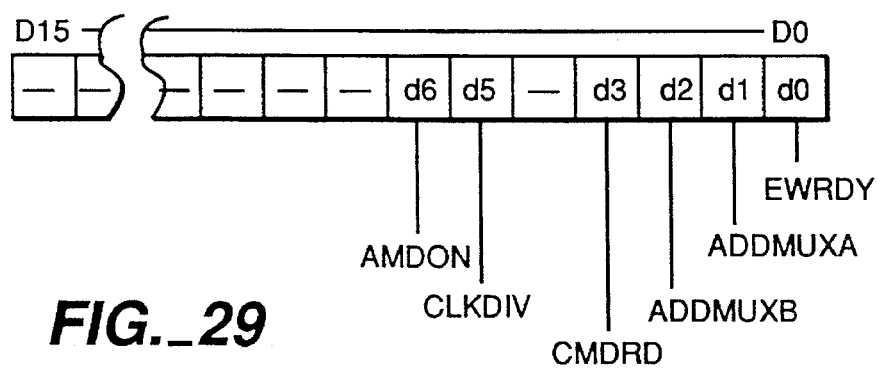
FIG._29

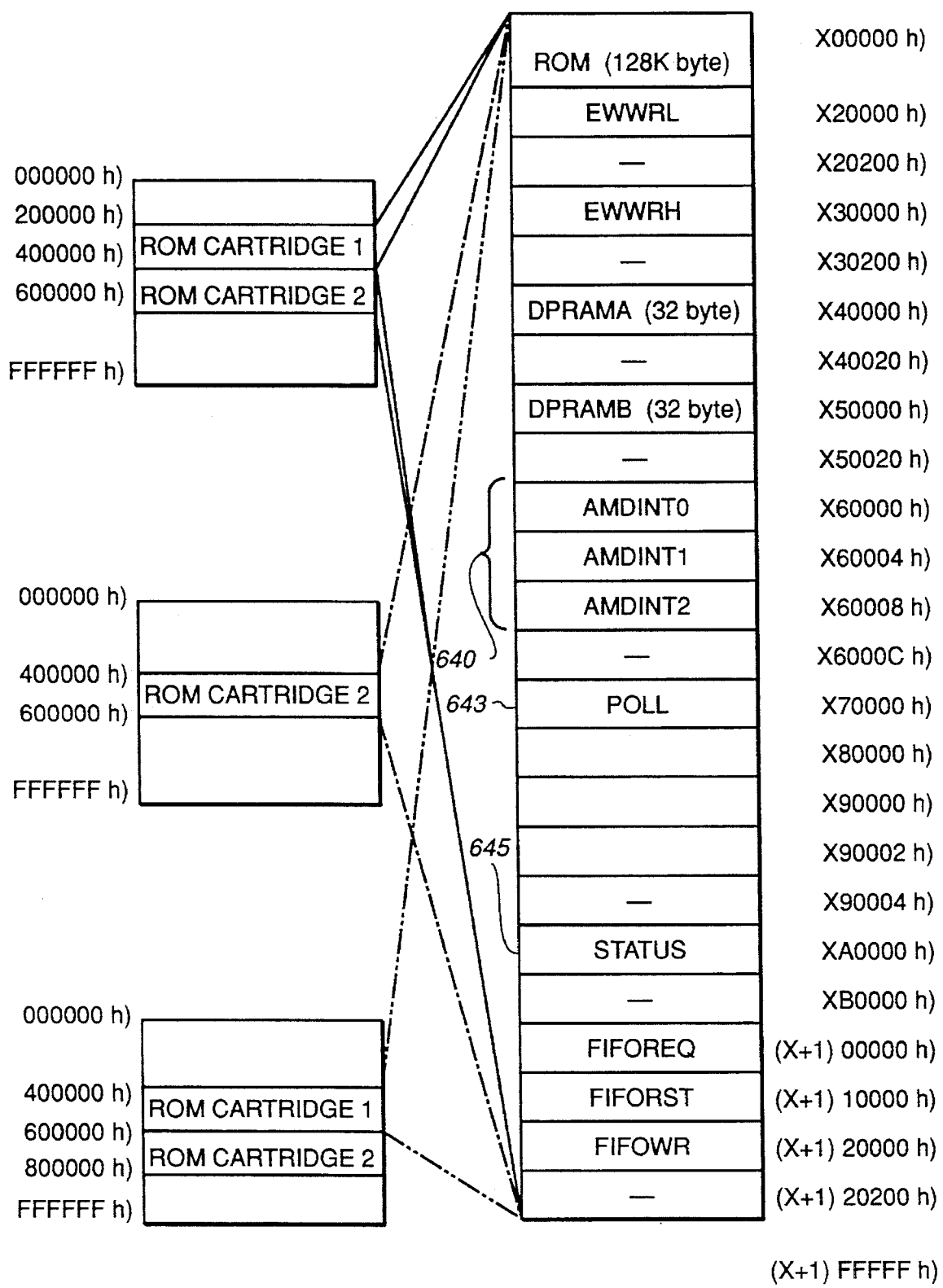
FIG._24

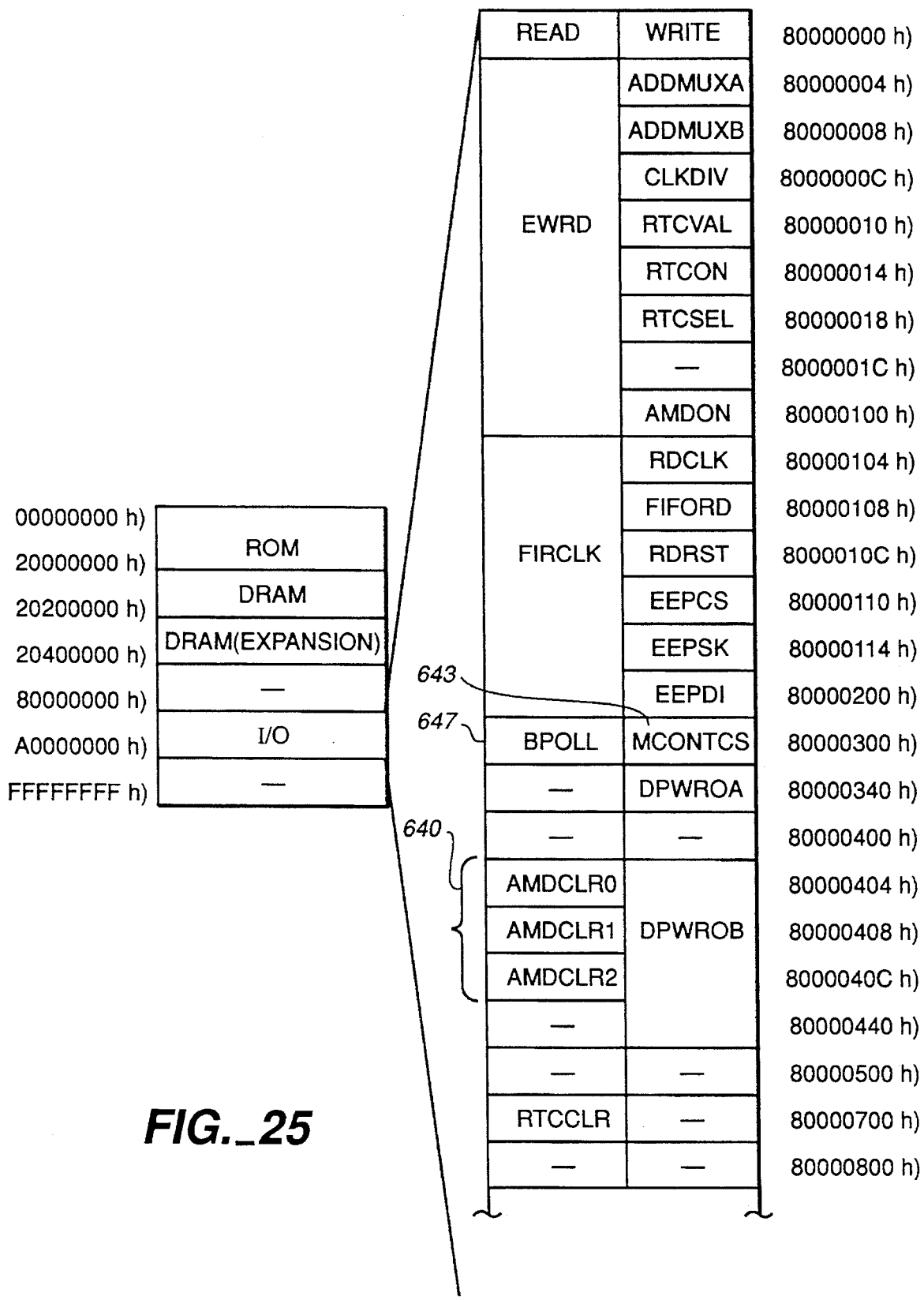
FIG._25

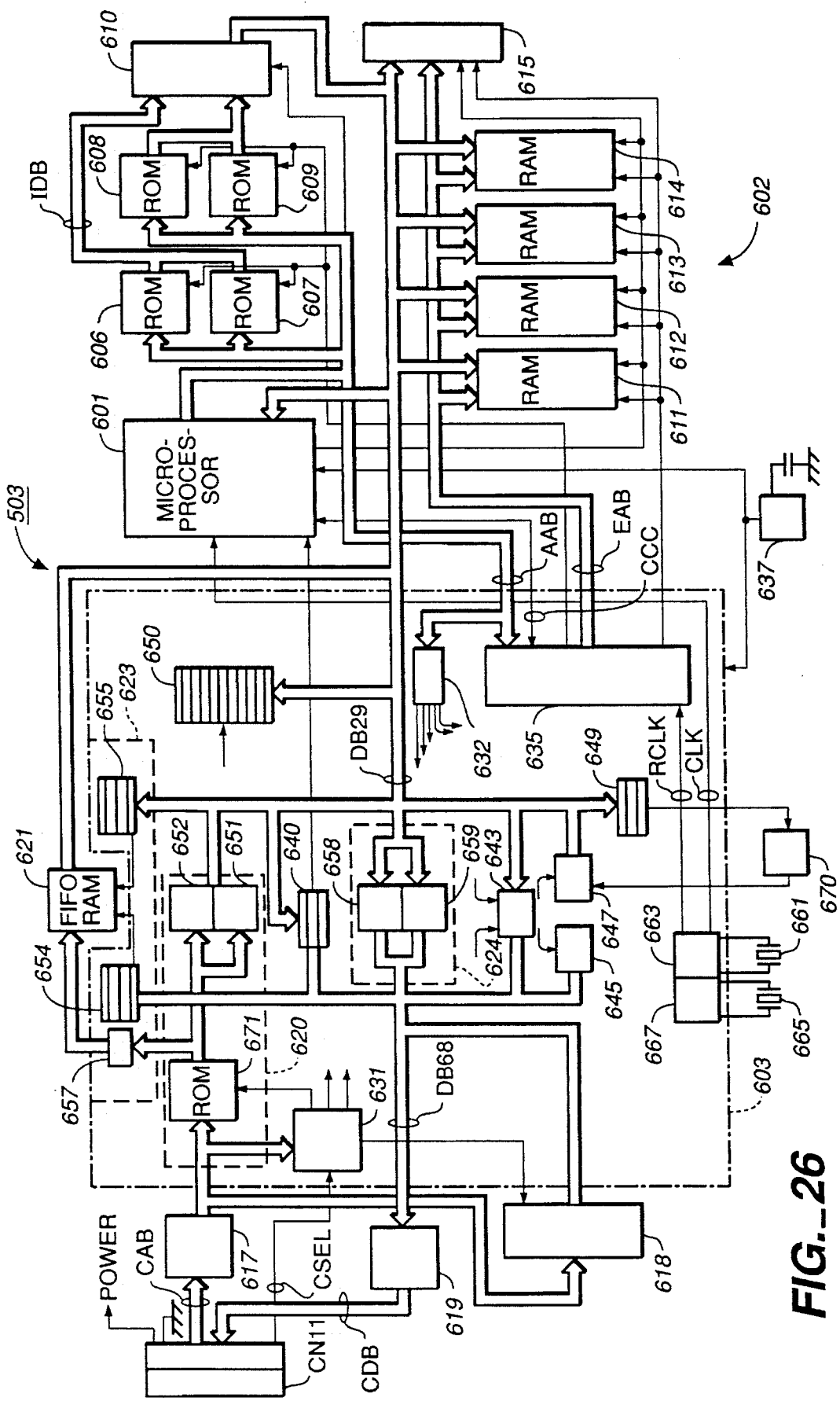
FIG._26

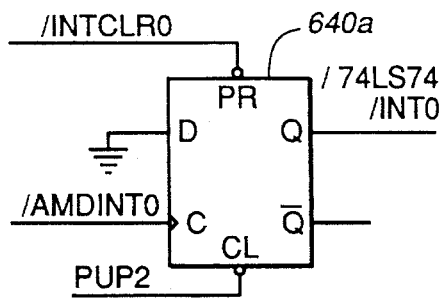
FIG._27A
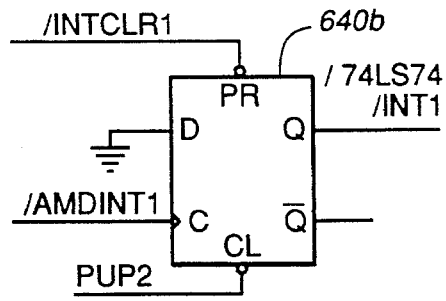
FIG._27B
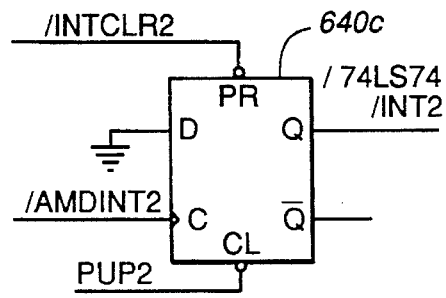
FIG._27C
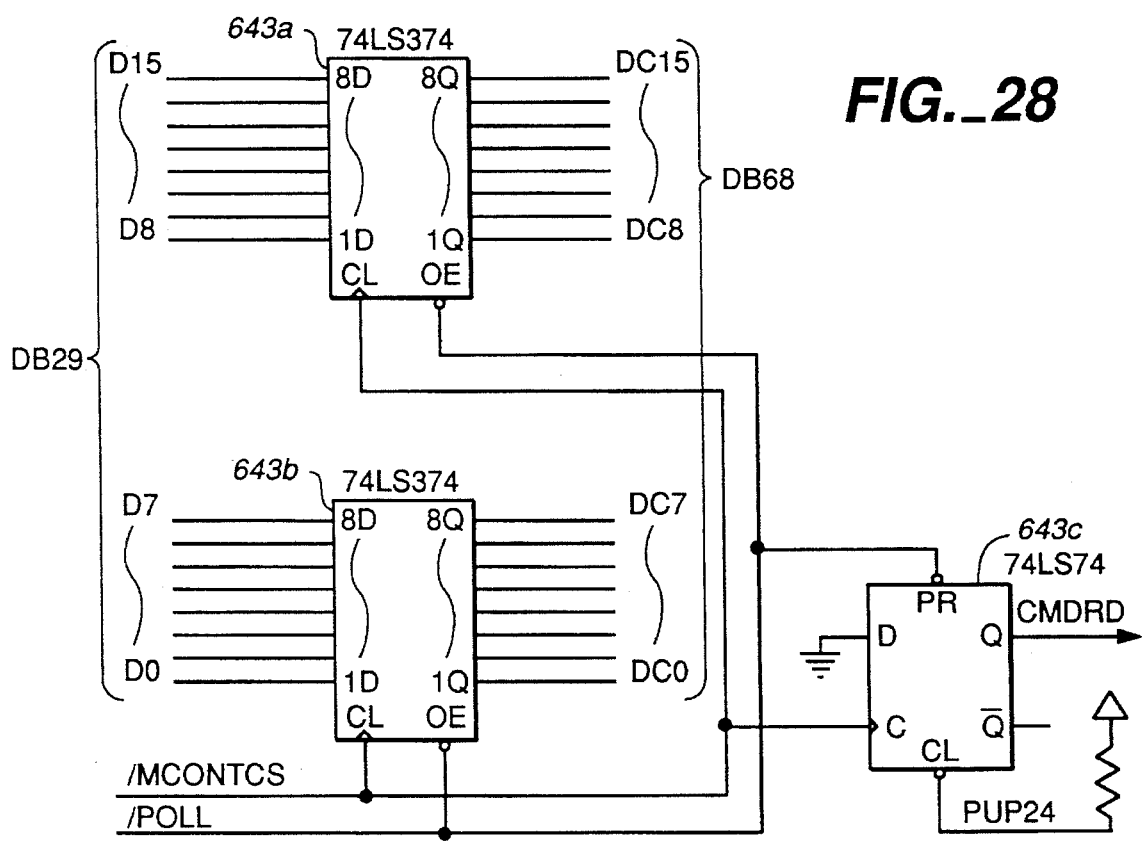
FIG._28

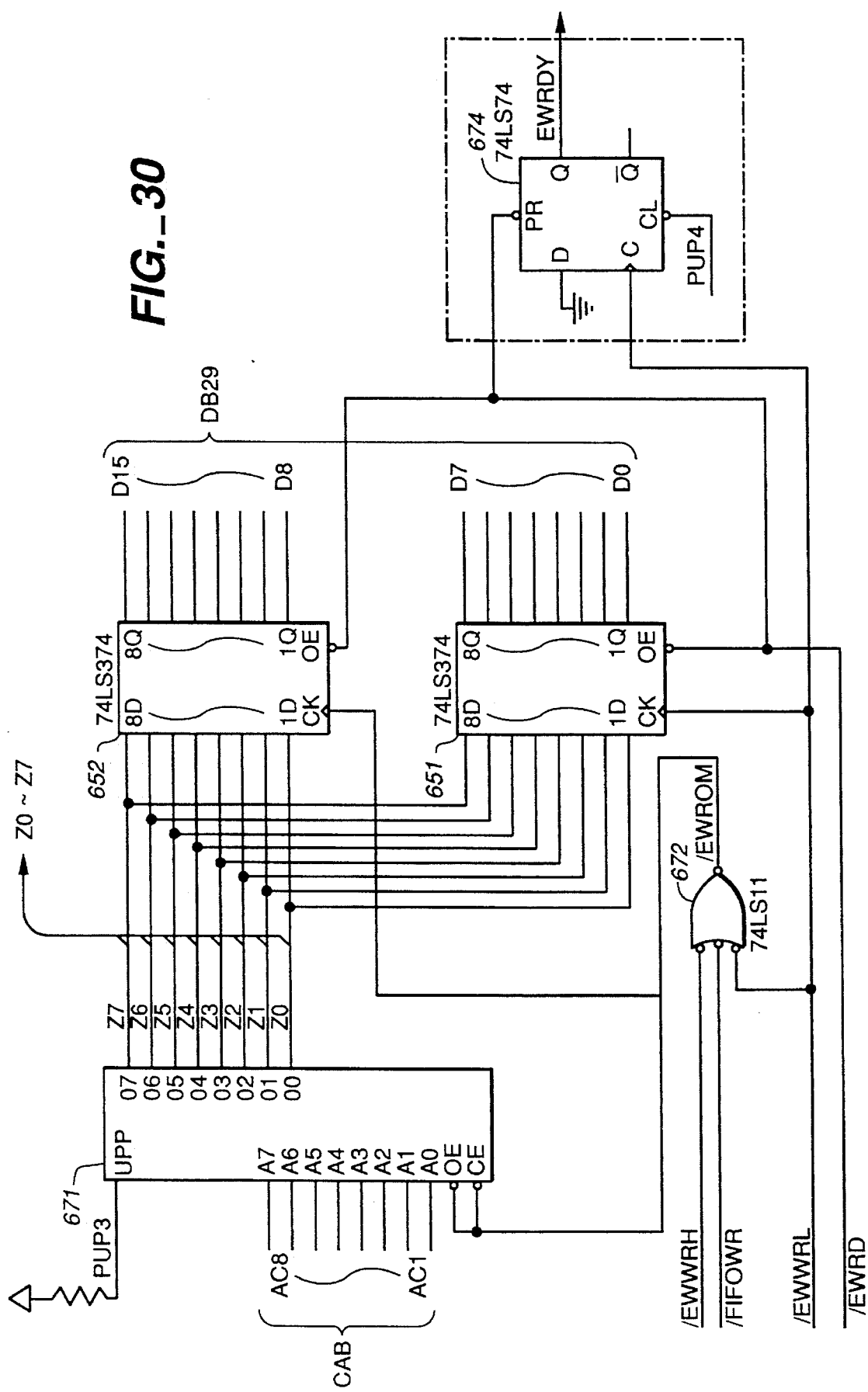
FIG._30

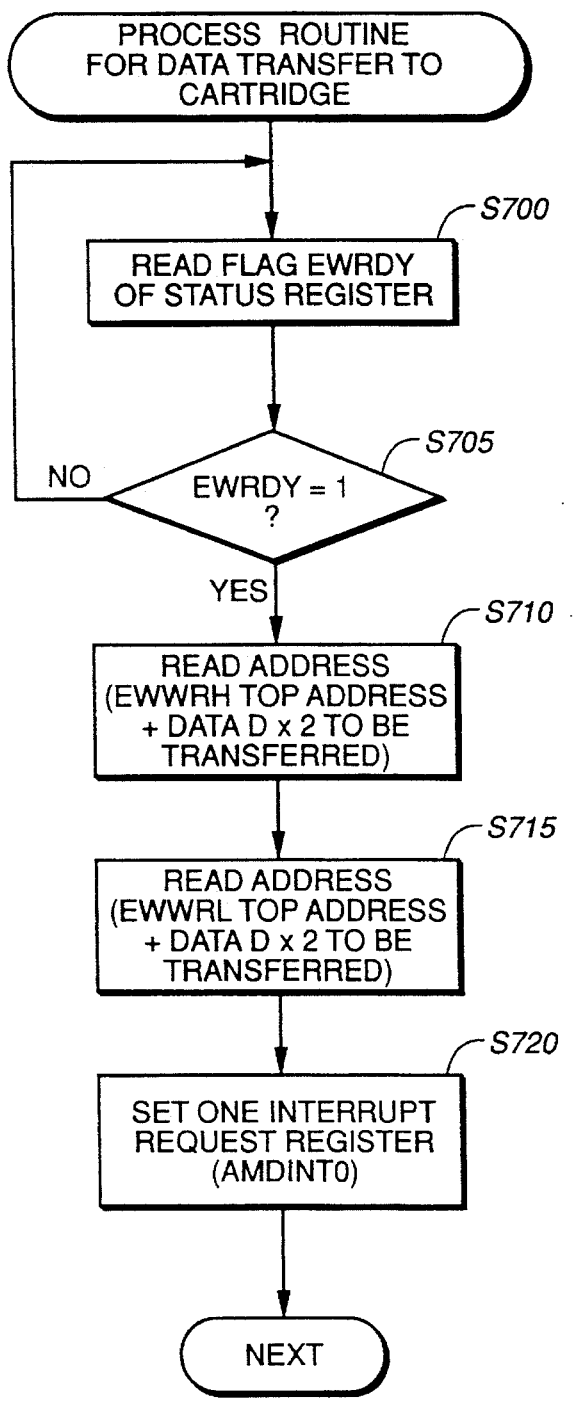
FIG._31
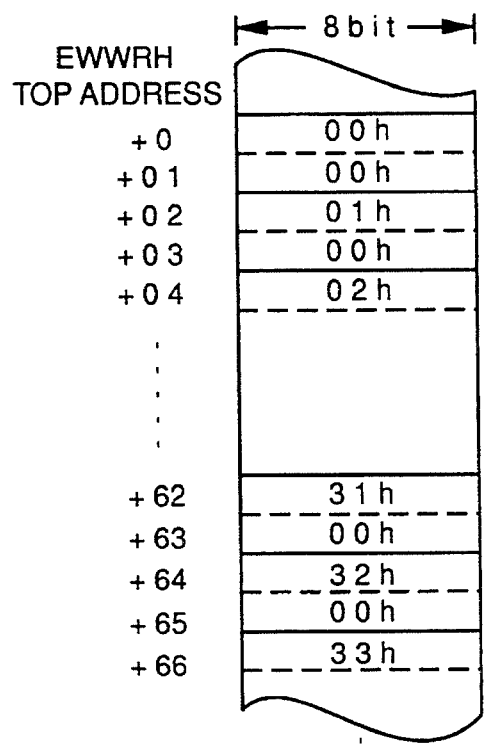
FIG._32
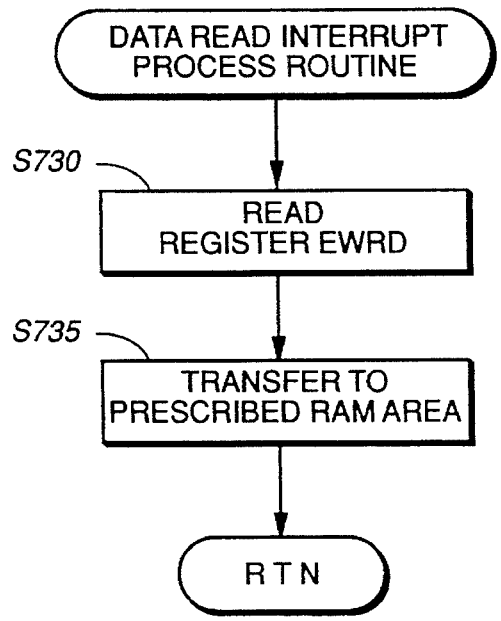
FIG._33

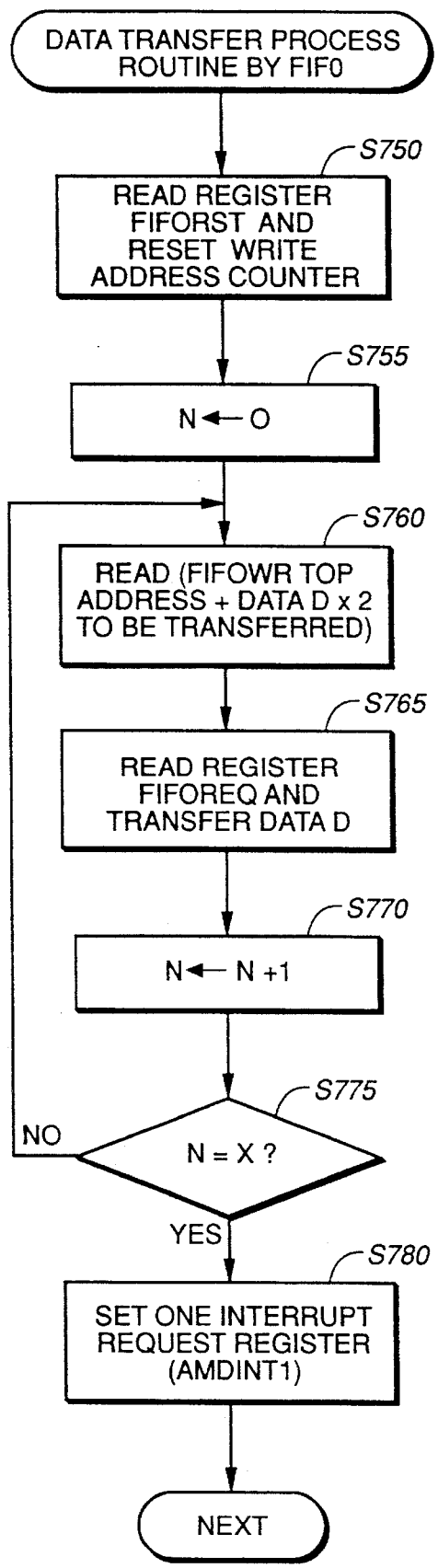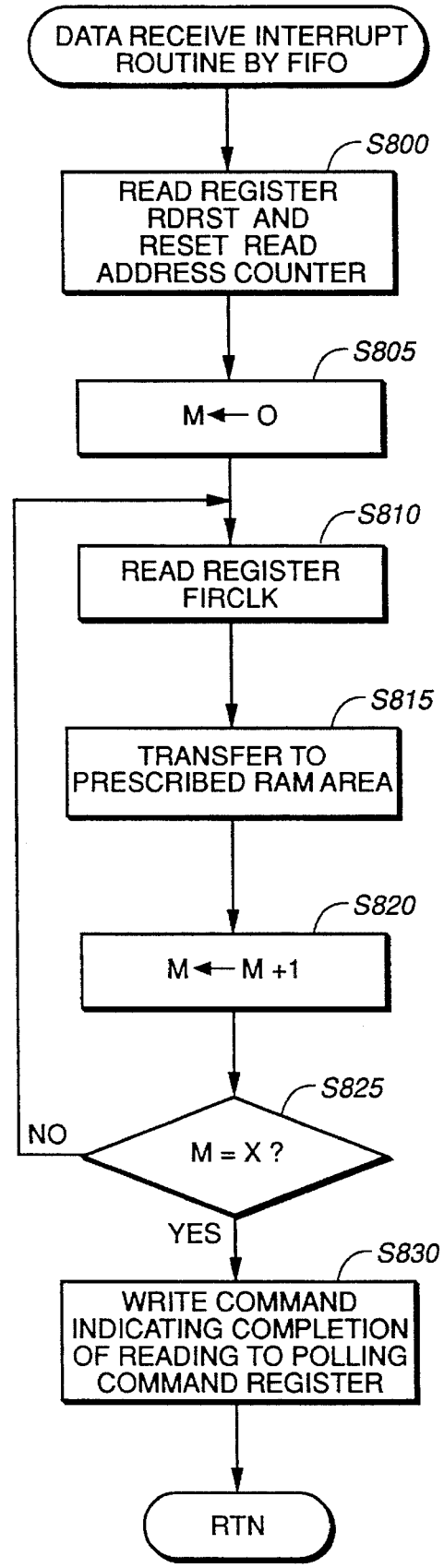
FIG._34      FIG._35

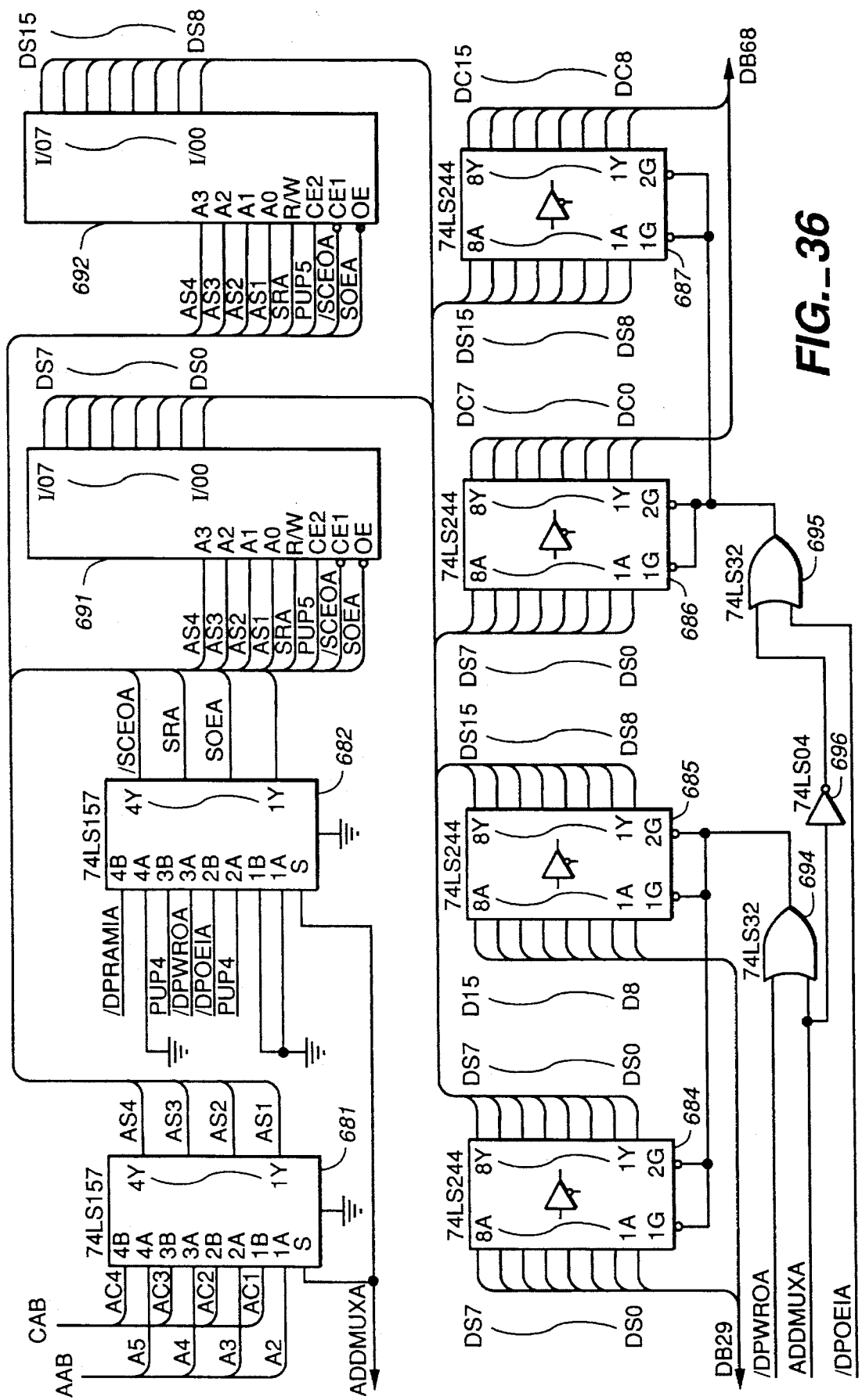
FIG._36

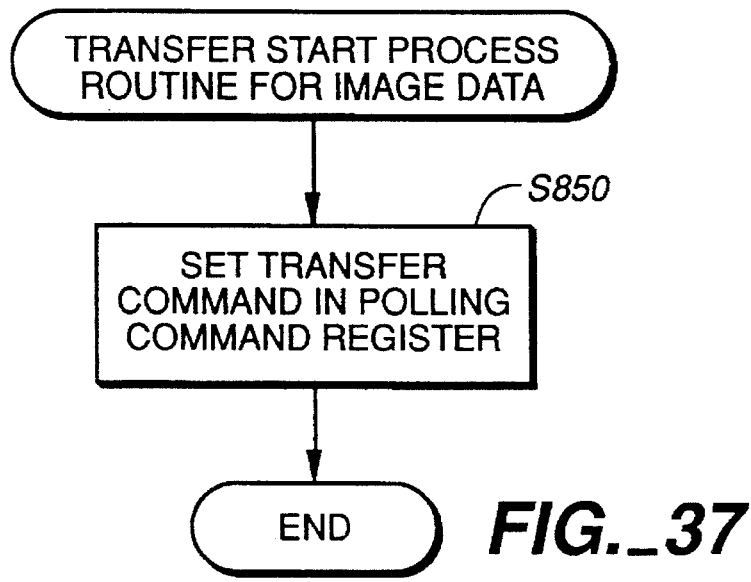
FIG._37
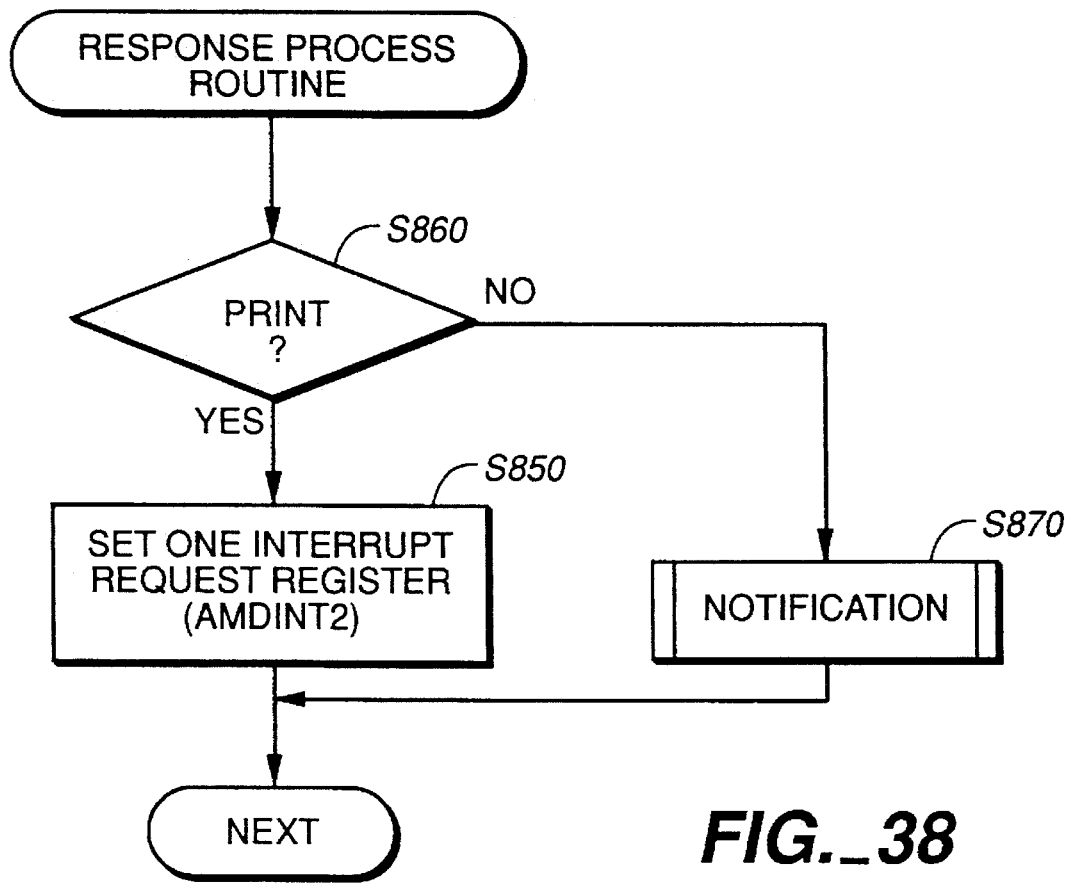
FIG._38

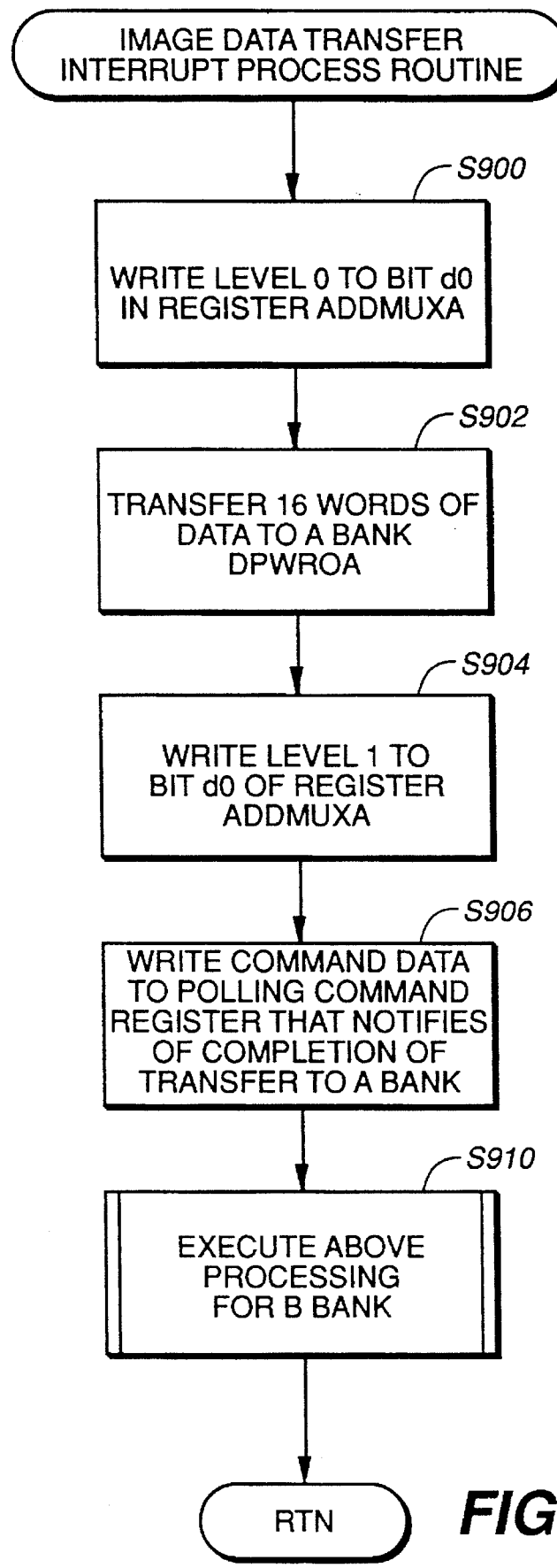
FIG._39

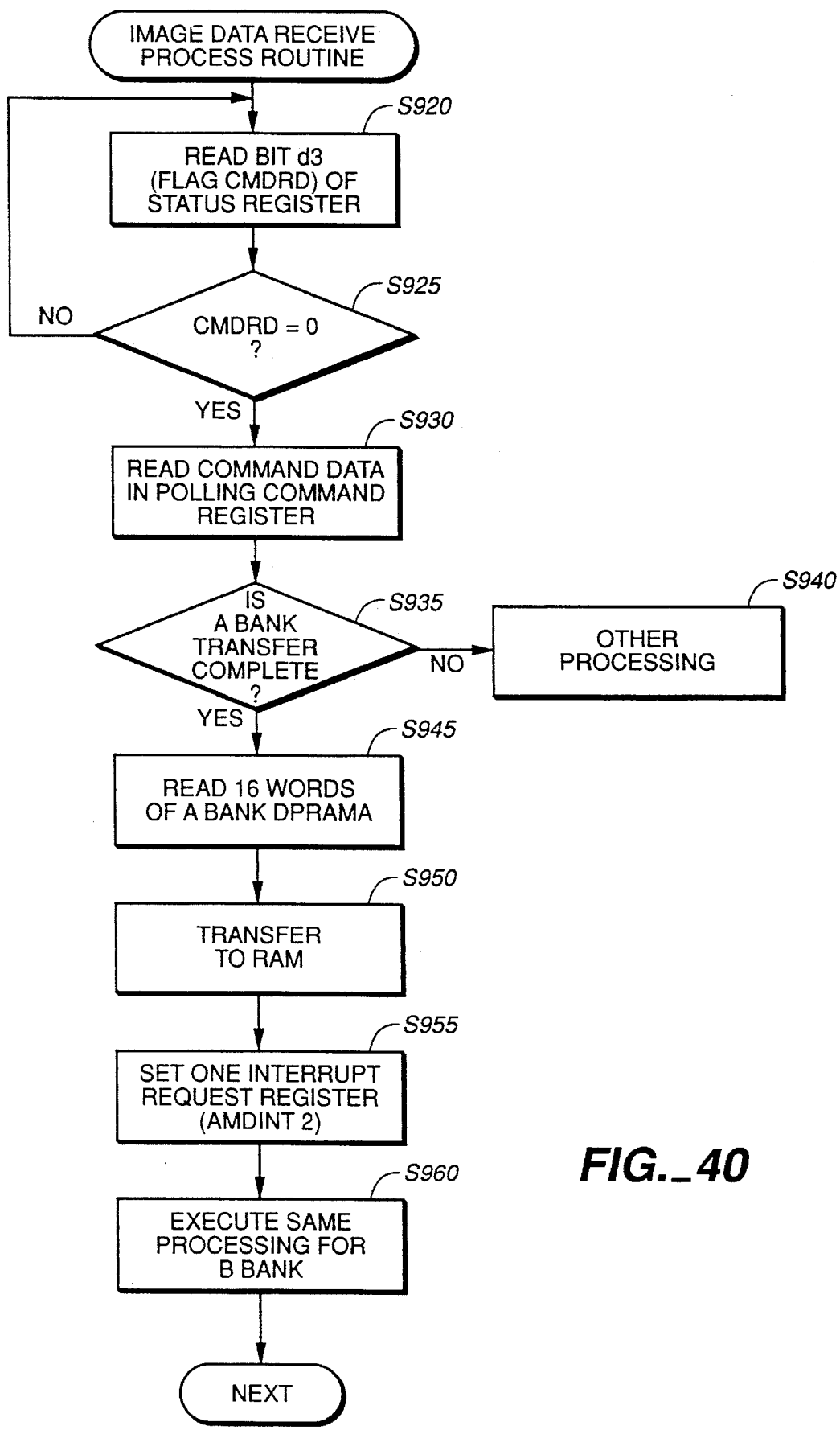
FIG._40

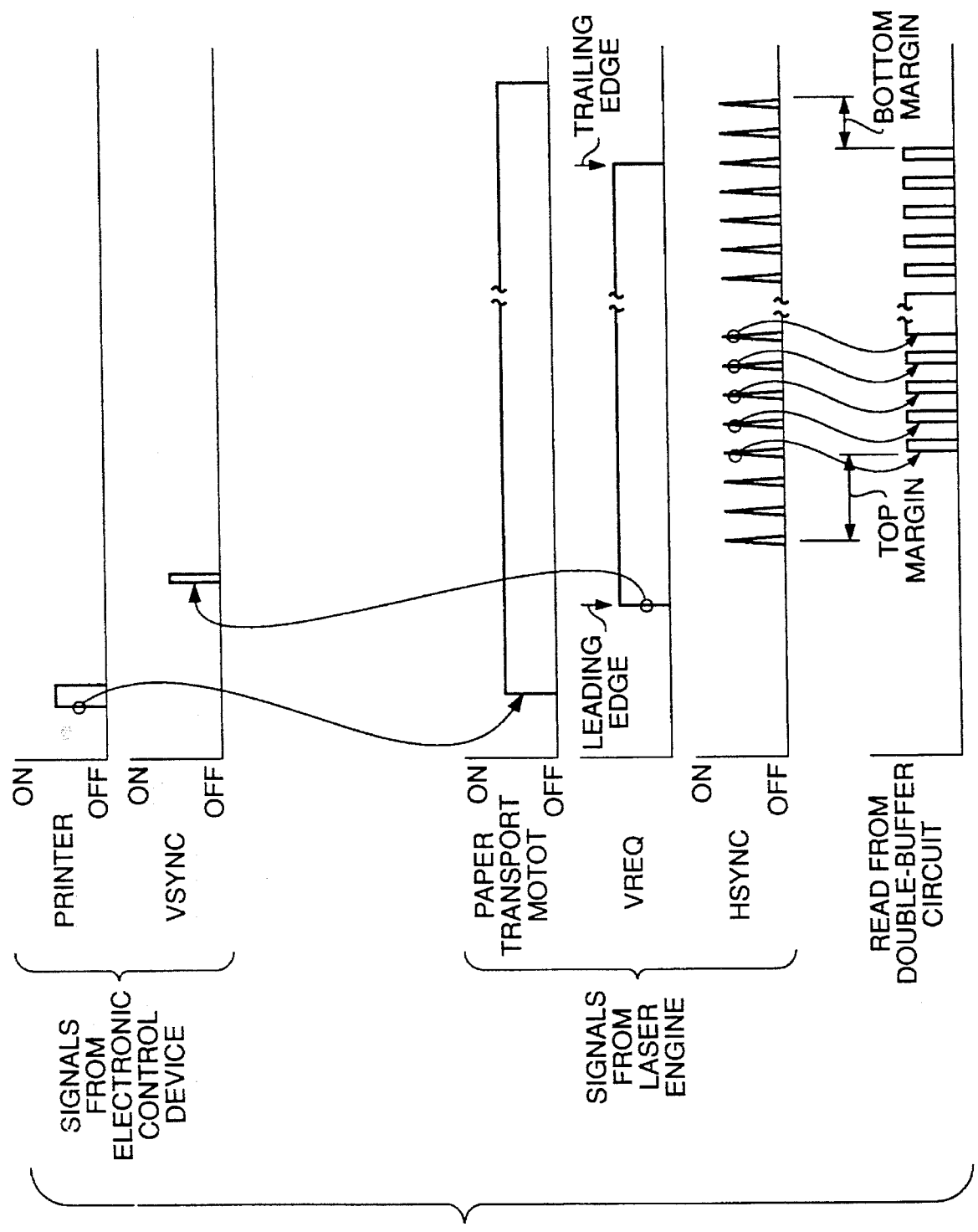
FIG._41

INFORMATION PROCESSING DEVICE IN AN ELECTRONIC APPARATUS UTILIZING AN ACCESSORY CONTROL DEVICE AND METHODS OF APPLICATION

CROSS REFERENCES TO RELATED APPLICATIONS

This application is a continuation in part of U.S. patent application, Ser. No. 07/816,455, filed Dec. 30, 1991 and entitled, "INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING", now U.S. Pat. No. 5,410,641. This application also is related to the following other applications: "INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/895,537, filed Jun. 8, 1992.

"ADD-ON ELECTRONIC DEVICE AND ELECTRONIC SYSTEM", Wakabayashi et al., Ser. No. 07/854,643, filed Jul. 1, 1992.

"TEMPERATURE CONTROL FOR ADD-ON ELECTRONIC DEVICES", Wakabayashi et al., Ser. No. 07/907,988, filed Jul. 1, 1992.

"INFORMATION PROCESSING DEVICE AND THE ACCESSORY CONTROL DEVICE AND INFORMATION PROCESSING METHOD IT USES", Wakabayashi et al., Ser. No. 07/910,590, filed Jul. 8, 1992.

"APPARATUS TYPE IDENTIFICATION DEVICE AND METHOD THEREFOR", Wakabayashi et al., Ser. No. 07/908,671, filed Jul. 2, 1992, now abandoned.

"INFORMATION PROCESSING DEVICE AND THE ACCESSORY CONTROL DEVICE AND INFORMATION PROCESSING METHOD IT USES", Wakabayashi et al., Ser. No. 07/910,851, filed Jul. 7, 1992.

"INFORMATION PROCESSING DEVICE AND THE ACCESSORY CONTROL DEVICE AND INFORMATION PROCESSING METHOD IT USES", Wakabayashi et al., Ser. No. 07/911,558, filed Jul. 7, 1992.

The foregoing listed applications are incorporated herein by reference thereto.

BACKGROUND OF THE INVENTION

This invention relates generally to releasably attachable accessory devices for use in enhancing the operation of electronic apparatus and more particularly to accessory control devices that operate upon being added to various kinds of electronic apparatus and, upon installation of the accessory control device in such electronic apparatus, enhancing information handling, processing and executing of functions in such electronic apparatus. More specifically, this invention relates to accessory control devices of the type for use in conjunction with electronic apparatus which are installed in an input connector of the apparatus wherein the inlet connector was initially adapted for read only data capability from inserted accessory control devices into the input connector. However, the accessory control devices of this invention are enhanced to have intelligence to provide the capability of efficiently handling and processing information of the information processing means of the electronic apparatus when inserted into the input connector of the electronic apparatus.

In recent years, personal computers, word processors, workstations and other electronic apparatus operating under digital logic control, and printers, facsimile machines, electronic pocketbooks, electronic musical instruments, electronic cooking appliances, electronic cameras and other electronic apparatus operating under microprocessor control are being employed in all areas of society. Further, the use of microprocessors is spreading rapidly to applications, such as, in automobiles, robotics and machine controlled tools, as well as all other types of electric products. Such apparatus utilizing digital logic operation and software have the potential of flexible control as compared with simple feedback control realized only with hardware, and, further, have the advantage of being able to change essential functions or change to different functions or to upgrade existing functions through changes to their software. Therefore, it is possible to accomplish completely different control utilizing the same hardware by, for example, merely changing the contents of the ROM utilized in conjunction with the microprocessor wherein procedures are stored or loading of a new program to the main memory from an external device, such as, a floppy disk is readily accomplished. As used herein, "procedures" is meant to be interchangeable with programs, instruction set, processing, process, instructions, program control, commands and the like.

However, since the throughput of the processor that actually performs control is dependent on the hardware, e.g., a predetermined number of operations per unit time, the number of bits that can be handled at one time and width of the bus that performs data transfer, improvement by upgrading the software is limited to only improved usage. As a result, any significant improvement in the performance of the existing electronic apparatus cannot, therefore, be realistically accomplished since it is limited by the existing hardware of the electronic apparatus. Further, upgrading by changing the software requires replacement of the ROM if the software is fused into the ROM, thus making it difficult to achieve in many cases. Therefore, upgrading the software is difficult in most cases except those in which ROM replacement is designed into the device from the beginning or the software is supplied on a replaceable medium, such as, by means of a floppy disk.

In personal computers, for example, accelerators on accelerator boards mounted in the computer housing are employed to improve the functionality of the computer system by completely replacing the microprocessor. However, this requires replacement of the CPU on the motherboard or other difficult operations that cannot generally be performed by ordinary computer users.

Generally, in the past, no consideration has been made regarding the improvement or changing of the functionality of existing printers, facsimile machines, electronic pocketbooks, electronic musical instruments, electronic cooking appliances, electronic cameras and other consumer electronic apparatus containing a microprocessor, and, further, existing electrical equipment for automobiles, robots, machine tools and other industrial electronic apparatus as well as all types of electric appliances. This lack of consideration is now described in conjunction with respect to one particular electronic apparatus, to wit, a page printer, although it should be realized that its is not limited to this particular kind of electronic apparatus.

In recent years, the rapid development and distribution of laser printers and other page printers has become widespread with high speed output in the transfer of data from computers to such printers for printing. In the case of laser printers, their resolutions range from 240 to 800 dots per inch (DPI), and these printers are capable of printing several pages a minute. One class of these printers generally employ a xerographic unit that employs a photosensitive medium, e.g., a xerographic drum, as the print engine. Since such a print engine continuously performs each of the functions of medium charging, exposure, toner application and image transfer processes in sync with the rotation of the photosensitive drum, the printing processing immediately begins after a image for a first single page has been processed and is stored in the printer memory. As a result, the memory provided in page printers for image processing must have the capacity to hold an image for at least one page. If compression of image data is not performed, the capacity is determined by the resolution and the size of the paper that is capable of being processed. For example, in the case of a resolution of 300 DPI and a paper size of 8 inches by 10 inches, 7,200,000 (8×10×300×300) dots must be manipulated and at least a 0.9 megabyte memory is required to hold this page of data.

In printers that function to receive character codes, row and column pitch and other information as print data and expand this data into an image, or in printers that receive a program described by a page description language and then expand the image by interpretation of the page description, it is necessary to calculate and produce a bit image based on such print data, which greatly reduces the overall processing speed compared to simple bit image transfer since there is huge volume of information to be expanded or interpreted. In other words, the processing speed of a printer is determined principally by the throughput of the printer processor that performs processing and memory access time and it is well known that their processing capability falls far short of the printing throughput and capability of the xerographic unit itself. For example, in a page printer capable of printing 10 pages per minute, only six seconds is allowed to prepare the image data for one page (0.9 megabytes of data) of printing. To process all 0.9 megabytes of data in this period of time means that the processing time allowed for one byte is a mere 6.6 microseconds (6 s/0.9 MB). This processing speed can possibly be realized with one of the high speed RISC type processors currently available on the market today. In contrast to this, however, there are currently many xerography units in use today capable of printing 10 pages per minute. Therefore, the throughput of the controllers that process print data in these printers is a bottleneck in improving overall print speeds of presently developed printers as well as existing printers being employed by end users.

For this reason, there are situations wherein the image processing throughput is remains below the throughput capability of the xerography unit utilized in laser printers. Furthermore, even if it becomes possible to obtain a processor with a high image processing throughput as the microprocessor technology continually advances, it is impossible to improve image processing functionality later in these printers already in the hands of end users.

There are some page printers whose functionality can be improved by being able to increase internal memory capacity or by providing an expansion slot and installing a cartridge with built-in fonts or programs stored in the cartridge. For example, to expand the functionality of a laser printer that supports only a specific page description language to process another page description language, the program of the other page description language interpreter is supplied in the form of an IC card or other type of cartridge. This cartridge contains the program in the form of a mask ROM and is installed in the expansion slot of the printer. However, these attempts to improve processing speed through memory expansion do not improve image processing throughput.

As a particular example, a cartridge provided in the input connector of the laser printer supplies a program of a particular page description language interpreter. The controller in the itself reads a prescribed address assigned to the cartridge in accordance with predetermined timing, such as, immediately upon power up of the printer. If the cartridge containing the page description language program has been installed, a specific code is returned so that the printer controller knows that the cartridge is the particular page description language. Through this means, control of the printer is transferred to the interpreter program in the cartridge. As a result, the printer becomes capable of interpreting data received from outside the printer environment, but the image processing speed itself is not improved. In fact, the overall printing speed may even be reduced when employing a new high level page description language.

It is an object of this invention to provide an accessory control device for an electronic apparatus that is capable of enhancing the operation of the processor of the electronic apparatus.

It is another object of this invention is an information processing device in conjunction with an electronic apparatus for use with an accessory control device to provide for overall improvement, change in or added functionality of the electronic apparatus.

It is another object of this invention to provide an accessory control device for an electronic apparatus, releasably attached to the electronic apparatus through an existing externally accessed read only data input thereof, to have the capability of not only permitting the reading of data from the accessory control device by the electronic apparatus but also provided with a capability of writing data to the electronic apparatus through the existing externally accessed read only input of the electronic apparatus.

It is a further object of this invention to provide an intelligent cartridge for adapted for releasably attachable employment with existing electronic apparatus, such as page printers, through an existing external inlet, and, when so attached, to improve the operational speed and functionality of the electronic apparatus.

It is a still further object of this invention to releasably attachable accessory control device or cartridge for page printers that is designed to work in conjunction with externally accessed, read only input connector to enhance the image processing throughput to the page print engine.

SUMMARY OF THE INVENTION

According to this invention, an accessory control device, adapted for releasably attachable employment with existing electronic apparatus, such as page printers, through an existing externally exposed accessory inlet or slot of the electronic apparatus previously designed for read only data capability in conjunction with the electronic apparatus processor or controller, but is designed with the capability also to process and thereafter write data to the electronic apparatus processor or controller employing the existing built read only data capability in the existing externally accessed accessory inlet or slot.

In a particular example of this invention, this invention has particular utility in conjunction with a printer, personal computer, word processor or workstation that is provide with a read-only slot for insertion of a read-only accessory control device, usually in the form of a cartridge, wherein the cartridge is adapted only to receive address information as input and provide cartridge stored data as output. However, according to this invention, means are incorporated into the cartridge providing added value, functionality and capability of receiving data input as well as providing for data output and, further, processing the received data for providing processed data at the cartridge output.

The accessory control device of this invention is connected via a connector to an electronic apparatus having a control system or controller including a first processor for performing logic operations, an exclusive processor memory means that stores the processed information and instruction set for the first processor, a first memory means for storing data processed by the first processor, and an input connector with a bus connected to the control system for at least reading data from the accessory control device position in externally accessed accessory or expansion inlet or slot external of the control system, and wherein the accessory control device comprises a second processor that processes information independently of the first processor, a second memory means that stores procedures or instructions executed by the second processor and processes information based upon data received from the control system, and a processing execution means that executes prescribed processing in the first processor in the electronic apparatus on information or data processed by the second processor. As a result, the accessory control device enhances or improves the functionality and utility of the electronic apparatus. Normally, it would not be common that both processors would perform the same processing of information. However, by allotting both processors to perform the same processing of information relative to a single tasking that is normally accomplished by the first processor, an increase in the processing speed can be realized with a result of increasing the processing throughput capability of the control system or controller.

In its preferred form, the accessory control device is configured as a cartridge having at least one printed circuit board on which the second processor is mounted and a housing for the printed circuit board to facilitate its use as a single unit for portability and adaptation to the electronic apparatus input connector. Alternatively, the printed circuit board may be configured as a single unit on the surface of the housing. Also, the connector of the accessory control device may be provided with an angular form or rotatable with respect to the device body to enhance its freedom of attachment to the electronic apparatus.

A third memory means may be provided for the accessory control device that is read by the second processor and a portion of the memory may be made to be removable from the device. In this manner, the memory capacity of the accessory control device may be easily varied thereby simplifying the flexibly in changing the memory configuration for the second processor, e.g., increasing the memory capacity according to the requirements of the function to be performed by the second processor. The third memory means may be in the form of an IC card or a laser card storing data by means of the magneto-optic effect.

In addition to the utilization of a third memory means, either the second processor or second memory means or both may be designed to be removable from the accessory control device. In this manner, the second processor or second memory means may be replaced thereby facilitating the viable functionality of the device in changing its functional capabilities or adding new functionality or configuring new capabilities into the accessory control device. In such circumstances, it is desirable to provide the accessory control device with means for shifting the processing performed by the second processor to a prescribed procedure stored in the third memory means.

Another aspect of this invention is the provision of an information processing device comprising an electronic apparatus having a control system or controller including a first processor for performing logic operations, an exclusive processor memory means that stores the processed information and instruction set for the first processor, and an input connector with a transfer bus connected to the control system for at least reading data external of the electronic apparatus. The information device further includes an accessory control device for coupling to the input connector of the electronic apparatus and having a first memory means for storing processed data from the first processor, a second processor for processing data independently of the first processor, and second memory means for storing processed data from the second processor. Further, the electronic apparatus includes processing transfer means for the purpose of transferring information processed by the first processor to the procedure stored in the first memory means according to a previously established procedure. For example, this transfer means is provided to transfer processed data executed by the first processor according to a program stored in the first memory means for performing further processing and output, such as, the transfer of data from a host to the first memory means or the transfer of data from the first memory means for final processing, such as, printing out as hardcopy data. Alternatively, the information processing device can transfer processed information executed by the first processor in the electronic apparatus to a procedure stored in the first memory means, according to a previously established procedure or program in the first memory means, for processing by the second processor. As a result, it becomes possible to execute processing corresponding to processing performed by the second processor in the accessory control device and the first processor of the electronic apparatus, thus facilitating the processing of information by cooperative working of both the in-board and outboard processors.

The accessory control device in this information processing device can be configured as a cartridge equipped with a printed circuit board on which is mounted, among other components, a second processor and having a housing for the printed circuit board to facilitate its utility as a single, compact unit. The electronic apparatus is provided with a slot for inserting the cartridge, thus making the cartridge plug adaptable for easy use with the electronic apparatus. Alternatively, the input connector of the electronic apparatus and the accessory control device can be connected via a cable so that there is freedom of independent positioning of these tow different components.

Furthermore, by providing selection means that switches the function of the accessory control device ON and OFF while the accessory control device is remains inserted in the slot of the electronic apparatus and connected to the input connector of the control system, it is not necessary to disconnect the accessory control device by its removal from the electronic apparatus slot each time its function is to be disabled thereby providing a convenient manner for its disablement when not in use. This selection means may be formed in the cable between the accessory control device an the control system input connector. Also in those cases where the accessory control device is attached through the sidewall of the electronic apparatus with a portion thereof extending outwardly from the sidewall, the top surface of the housing of the accessory control device may be provided with an inclined top surface to preclude the possibility by a user placing an heavy object on the device top surface.

A further aspect of this invention is the further provision of a timer in the control system of the electronic apparatus that provides an output signal to the accessory control device having a predetermined timed interval. Also, processing execution means in the control system of the electronic apparatus also executes prescribed processed information from the first processor in the electronic apparatus in accordance with processed information executed by the second processor in the accessory control device and response means in the accessory control device that returns a predetermined response to the electronic apparatus in response to the timed interval output signal from the timer in the electronic apparatus. Processor judgment means in the electronic apparatus is utilized to determine that the second processor in the accessory control device is not operating in a normal manner when a response from the response means is not received within a predetermined time period.

Thus, in the information processing device of this invention, a signal of predetermined time interval is repeatedly provided as an output from the electronic apparatus, and in response, the accessory control device returns a predetermined response to the electronic apparatus in response to this signal. If the device response is not received within a prescribed time period, then the second processor in the accessory control device is adjudged by the control system of the electronic apparatus not to be in a normal operating condition. As a result, the reliability of the operation of the accessory control device is assured.

Accessory control devices and information processing devices configured in accordance with this invention can be realized in many different kinds of electronic apparatus. Their application to printers is one example wherein enhanced processing of printing data can be achieved, particularly in the case of printers interpreting a page description language wherein the devices of this invention can contribute to high speed processing of print data thereby significantly increasing the output of the printer. Furthermore, the application of these devices to personal computers, word processors or workstations, with the accessory control device connected via an expansion slot, an IC card connector or an input slot for font cartridges, their functionality can be enhanced or changed, or new functionality added to these electronic apparatus. Thus, regardless of the original function of the electronic apparatus to which these devices are applied, the addition of the functionality of these devices will enhance the utility and operation of original function of the apparatus.

A particular example of the application of this invention is to a printer wherein the accessory control device is connected to the printer via an input connector. The printer, in addition to having print data input means that inputs print data received from a host or other source outside of the printer, the accessory control device stores the instruction set or procedure for processing print data by the second processor in at least a portion of the second memory means, and it stores the print procedure that executes print processing in the printer based on data processed by the second processor in at least portion of the processing execution means. As a result, it is possible, therefore, to improve, add or change the functionality of print processing capabilities of a printer, particularly existing printers in the field.

In one particular case, the accessory control device of this invention is connected to an electronic apparatus in the form of a printer via an input connector wherein the printer includes a control system or controller for processing two-dimensional images based on print data received from an outside source and controls the printing of the images at the print engine of the printer. The accessory control device includes a print data input means that is connected via the input connector to the address bus, data bus or other such bus of the printer and is adapted to receive print data via the printer controller from an outside source for processing or interpreting the print data into image data independent from the printer controller. Thereafter, the processed image data is transferred, via data transfer means, back to the printer controller for printing. The program for processing the print data is stored in a portion of the second memory means in the accessory control device and is employed by the second processor in the accessory control device to process the print data into image data. The program or print procedure that executes the printing process, via the first processor, of the developed image data processed by the second processor, may be stored in a portion of the second memory means in the accessory control device. In this particular situation, since the first processor in the printer performs the execution of the printing processing on the image data according to a program provided in the accessory control device, the accessory control device is basically capable of controlling a substantial portion of the operation of the printer.

In another particular case, the accessory control device of this invention is connected to an electronic apparatus in the form of a printer via an input connector wherein the printer includes a control system or controller for processing two-dimensional images based on print data received from an outside source and controls the printing of the images at the print engine of the printer. The accessory control device includes a print data input means that is connected via the input connector to the address bus, data bus or other such bus of the printer and is adapted to receive print data via the printer controller from an outside source for processing or interpreting the print data into image data, independent from the printer controller, via a second processor in the accessory control device by means a program stored in a portion of second memory means in the accessory control device. Thereafter, the processed image data is transferred, via data transfer means, back to the printer controller for printing. The program for processing the print data is stored in a portion of the second memory means in the accessory control device and is employed by the second processor in the accessory control device to process the print data into image data. In addition, the print program that executes the printing process of the developed image data is performed by the first processor and the print program may be stored in a portion of the first memory means in the printer controller. The printer includes processor judgment means that monitors the performance of the printing processing of developed image data by the first processor and includes abnormal condition processing means to terminate execution of the printing processing by the first processor and provides for reset of the second processor to an initialized state when the judgment means determines that the second processor in the accessory control device is not functioning under normal operating conditions. In this manner, improvement in printing reliability and unattended operation and supervision of the printer is accomplished in the processing of print data and subsequent printing of developed image data by the printer.

In the particular application of a printer, it is desirable that the print data received from an outside source be described in the form of a page description language and that the image development means provide an interpreter for the page description language to improve the throughput of the printer.

Whether the printer itself is an ink jet printer, a thermal sublimation printer, a printer that employs a xerographic unit or other type of printer engine technology, the improvement in performance as well as an addition or change in printer functionality can be realized regardless of the type of printing to be performed. Further, the utilization of the accessory control device of this invention can be applied directly to such a printer already in the field and in previous continuous use requiring no direct alteration to the printer to directly achieve improved performance or added functionality or change in function to the printer.

The accessory control device of this invention may be designed to connect directly into the expansion slot or an IC card connector or a font cartridge connector of a personal computer, word processor or workstation. Further, the accessory control device of this invention can be realized as an expansion board installed in the expansion slot, an IC card or a font cartridge of a personal computer, word processor or workstation.

With respect to the present invention, it is a desirability that the second processor employed in the accessory control device be either of the same type of processor as the first processor in the electronic apparatus or be a processor with having a high ips rating or greater frequency of operation than the first processor so that execution by the second processor is comparable or better than that of the first processor thereby providing an overall improvement in throughput, performance and functionality in the processing originally accomplished by the first processor. Even in the case where the processing speed of both processors is the same, if the processing of data to be accomplished is optimized relative to the particular application to be accomplished, such as, "off-line" conversion print data into image data for a printer, or whatever other processing of data is to be accomplished, an enhancement or improvement in throughput, performance and functionality can be achieved since the second processor is taking on the role of a helper in the performance of tasks or functions that were originally performed by the first processor in the printer. Further, depending on the particular application to be accomplished, such as the execution of the simplest tasks performed by the first processor, the second processor may even have same or an inferior processing speed or ips rating compared to that of the first processor and still provide for enhanced overall throughput, performance and execution of the particular application to be accomplished.

A processing transfer means may be provided in the information processing device of this invention to transfer data to processed by the first process to the accessory control device for processing by the second processor. In this case, a power-on means can be employed to immediately bring about the transfer of the processing executed by the first processor to the processing of stored data in the first memory means and functional operation of the accessory control device can be realized immediately after the power is turned on. Further, the present invention further includes a standby means to bring about either access of the accessory control device or recognition of the accessory control device after a delay period of a predetermined time period permitting the transfer means of the electronic apparatus to detect the installation of the accessory control device and/or the powering on of the accessory control device. As a result, reliance of proper power on and operational functionality of a connected accessory control device can be assured within a fixed period of time.

Furthermore, the present invention provides a method of information processing by electronic apparatus comprising a first processor that processes information received from outside source, a stand-alone or exclusive processor memory means that stores processed data performed by the first processor and has a first memory means for receiving data to be processed from an outside source and thereafter storing data processed from the received data, and a connector including a bus with at least read-only capability of data received from an outside source, and the accessory control device having a second processor and a second memory means connected to the connector of the electronic apparatus to work in functional cooperation with the first processor and comprising the steps of connecting the accessory control device to the connector, transferring, via the first processor, data to the second memory means from the first memory means to be processed according to a computer program stored either in the first or second memory means, causing the second processor to execute the computer program for processing at least a portion of the data transferred to the accessory control device thereby transferring at least a portion of the functional responsibilities of data processing normally performed by the first processor to the second processor.

After data is processed by the second processor, the accessory control device provides for output the processed information to the electronic apparatus for utilization by the electronic apparatus. Further, data can be processed while confirming normal operation of the second processor by means of communication between the first processor and second processor, functioning together to process data to concurrently complete a task. The electronic apparatus repetitively outputs a prescribed time period signal to the accessory control device and provides for detection at predetermined time intervals a predetermined return response signal from the second processor of the accessory control device in response to the prescribed time period signal. As a result, if the first processor does not receive the predetermined return response signal within the prescribed time period, determination is made that the second processor in the accessory control device is not operating in a normal manner so that the reliability of data processing is thereby improved.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a general configuration of a printer representing one example of an electronic apparatus with which the present invention is utilized.

FIG. 2 is a block diagram showing the architecture of an electronic control unit or controller incorporated in a printer of the embodiment shown in FIG. 1.

FIG. 3 is a perspective view of an intelligent cartridge comprising this invention attached to the printer.

FIG. 4 is a block diagram of the internal architecture for an intelligent cartridge comprising this invention.

FIG. 5 is a flowchart illustrating a print process routine executed by the printer electronic control unit shown in FIGS. 1 and 2.

FIG. 6 is a flowchart illustrating a data transfer process routine executed by the printer electronic control unit comprising this invention.

FIG. 7 is a flowchart illustrating a data development process routine executed by the intelligent cartridge comprising this invention.

FIG. 8 illustrates the data read process from a ROM utilizing the data as an index.

FIG. 9 is a flowchart illustrating a watch dog interrupt process routine executed by the printer electronic control unit of the printer comprising this invention.

FIG. 10 is a flowchart illustrating an interrupt acknowledge routine exerted by the cartridge comprising this invention.

FIG. 11 is a flowchart illustrating a response time interrupt process routine executed by the printer electronic control unit comprising this invention.

FIG. 12 is a block diagram generally illustrating the process executed by a timer in the printer electronic control unit comprising this invention.

FIG. 13 illustrates a circuit wherein a switch on the cartridge of this invention is utilized for providing active and inactive settings.

FIG. 14 is a perspective view of the intelligent cartridge comprising this invention illustrating the installation position of the switch shown in FIG. 14.

FIG. 15 illustrates the overall architecture of another embodiment of the intelligent cartridge comprising this invention having a timer circuit for counting elapsed time commencing with the beginning of the application of power to the intelligent cartridge.

FIG. 16 is a perspective view of a printer connected to the intelligent cartridge by means of a cable.

FIG. 17 is a perspective view of a connection configuration for connecting the intelligent cartridge to the printer.

FIG. 18 is a perspective view of an intelligent cartridge as inserted into a deep connection port of a printer connector.

FIG. 19 is a perspective view of an intelligent cartridge as inserted into a shallow connection port of a printer connector.

FIG. 20 is a block diagram showing the overall configuration of a second embodiment of this invention.

FIG. 21 is an exploded perspective view of an accessory control device in the form of a cartridge in accordance with the second embodiment of this invention.

FIGS. 22A and 22B are plan views of the top and bottom portions of the printed circuit board on which the second processor and other electronic components, such as, shown in FIG. 4, are mounted on the board.

FIG. 23 is an explanatory diagram of the configuration of signal wires in the connector CN11 between the electronic apparatus and the cartridge.

FIG. 24 is an explanatory diagram of the address map of the cartridge as viewed from electronic control device 501.

FIG. 25 is an explanatory diagram of the address map of the cartridge as seen from microprocessor 601.

FIG. 26 is a block diagram showing the internal electronic configuration of the cartridge.

FIGS. 27A, 27B and 27C are circuit diagrams illustrating an example configuration for interrupt request registers 640.

FIG. 28 is a circuit diagram illustrating an example configuration for polling command registers 643.

FIG. 29 is an explanatory diagram illustrating contents of status registers 645.

FIG. 30 is a circuit diagram illustrating an example configuration of read control circuit 620.

FIG. 31 is a flowchart illustrating the process performed by the electronic control device for accomplishing data transfer employing read/control circuit 620.

FIG. 32 is an explanatory diagram illustrating a configuration of data in ROM 671.

FIG. 33 is a flowchart illustrating the process performed in the cartridge for accomplishing data transfer employing read control circuit 620.

FIG. 34 is a flowchart illustrating the process performed by the electronic control device for accomplishing data transfer employing FIFO control circuit 623.

FIG. 35 is a flow chart illustrating the process performed in the cartridge for accomplishing data transfer employing FIFO control circuit 623.

FIG. 36 is a circuit diagram illustrating an example configuration of double-bank control circuit 624.

FIG. 37 is a flowchart illustrating the process for beginning data transfer employing double-bank control circuit 624.

FIG. 38 is a flowchart of the response process executed in electronic control device 501.

FIG. 39 is a flowchart illustrating the process executed in the electronic control device for accomplishing data transfer employing double-bank control circuit 624.

FIG. 40 is a flowchart illustrating the process executed in the cartridge for accomplishing data transfer employing double-bank control circuit 624.

FIG. 41 is a timing chart illustrating the timing for the printing of image data via the printer engine.

DESCRIPTION OF THE PREFERRED EMBODIMENTS

Embodiments of the invention are explained in conjunction with the drawings in order to describe the invention in detail. Since the description is extensive and covers a number of topics, the following is a table of contents of the description.

[I] First Embodiment
  A. Overall Configuration of Hardware
  B. Configuration and Operation of Electronic Control Device 10
  C. Configuration of Cartridge 3
  D. Transfer of Data from Electronic Control Device 10
  E. Cooperative Operation of Electronic Control Device 10 and Cartridge 3
  F. Effectiveness of the First Embodiment
  G. Exemplary Modification of the First Embodiment
[II] Second Embodiment
  A. Explanation of Overall Configuration
  B. Structure of the Cartridge
  C. Address Space of the Cartridge
  D. Internal Configuration of the Cartridge
  E. Explanation of Data Transfer Controller 603
  F. Explanation of the Registers
  G. Configuration and Operation of Read Control Circuit 620
  H. Configuration and Operation of FIFO Control Circuit 623
  I. Configuration and Operation of Double-Bank Control Circuit 624

J. Printing of Image Data

K. Effectiveness of Second Embodiment

[I] First Embodiment

A. Overall Configuration of Hardware

Preferred embodiments of the invention are explained below in order to further clarify the configuration and action of the invention described above. First is an explanation of an embodiment in which the invention is applied to a printer. FIG. 1 is a block diagram showing the general configuration of the main printer unit 1 of one embodiment of this invention with the access control device in the form of cartridge 3 installed in printer unit 1.

Printer 1 comprises a page printer capable of printing by means of xerographic processing. In operation, print data is transmitted from an external source, such as, host computer 5, and printer 1 forms a toned and fused image on a recording medium, such as, paper P. Printer 1 contains a controller comprising electronic control unit 10 which receives print data from computer 5 and develops the print data into a bitmap or bit image data. Intelligent cartridge 3 is insertable into printer 1 for image processing in conjunction with printer control unit 10 and is provided with a connector 11 to which the address bus and the data bus of printer electronic control unit 10 are connected to cartridge 3. Semiconductor laser unit 12 is driven by electronic control unit 10 to selectively expose the charged surface of photosensitive drum 14 in xerographic unit 15 to form a latent image of the processed bit image to be printed. Xerographic unit 15 includes photosensitive drum 14, paper cassette 17 for storing paper P, feed mechanism 19 for feeding single sheets of paper P for tangential engagement with the peripheral surface of photosensitive drum 14, thermal fixing roller unit 21 for fusing toner previously transferred to paper P and an external tray 23 into which printed paper P is fed from printer 1.

Xerography unit 15 also includes a charging unit 25 to apply electrical charge to the surface of photosensitive drum 14. Toner unit 27 applies charged toner onto photosensitive drum 14. Toner cleaner unit 29 removes remaining toner on the surface of photosensitive drum 14 after the toned image has been transfer to paper P. Electronic control unit 10 drives semiconductor laser unit 12 in synchronism with the rotational movement of photosensitive drum 14 and forms a latent image on drum 14 by means of selectively discharging the charged surface in an image-wise formation in accordance with an image to be printed and the image is toned at 27 by the attraction of charged toner to discharged regions of drum 16 that have been exposed to the laser beam. Synchronized with the rotational movement of photosensitive drum 14, a single sheet of paper P is removed from paper cassette 17 and fed tangentially relative to photosensitive drum 14 by feed mechanism 19. Paper P at this point is also fed by rotational movement of photosensitive drum 14 and transfer roller 30. As a result, most of the toner on photosensitive drum 14 is transferred to the paper P. The toned paper P is then fed to fuser unit 21 and the toner is melted by roller heat and fixed to paper P.

It should be noted that application of the present invention is not confined to a laser type printer but also has applicability to other types of printers, such as, LED array printers, thermal printers and ink jet printers.

B. Configuration and Operation of Electronic Control Device 10

Reference is now made to FIG. 2 which illustrates in more detail electronic control unit 10 of printer 1. Unit 10 comprises an arithmetic and logic operation circuit having a CPU 31 for operating the entire print processing. CPU 31 is connected to address bus 32, data bus 34 and control signal bus 36. Address bus 32 is connected to connector 11 as an address bus, PAD, for cartridge 3. Bus 32 is connected to address decoder 41, ROM 43, I/O port 49, laser interface (I/F) unit 51 and MUX 55. Data bus 34 is connected to connector 11 of cartridge, via bus driver/buffer 52, when cartridge 3 is engaged, and is also connected to I/O port 49, ROM 43 and laser I/F unit 51. Control signal bus 36 is connected to MCU 47, and MCU 47 is also connected to MUX 55 via a bus. All components, except for connector 11, are connected to respective buses as read/write enabled. Control unit data bus 34 is connected to the read-only data bus, PD, of cartridge 3 via bus driver 52, which is between data bus 34 and cartridge connector 11. Therefore, cartridge 3 is strictly a read-only device as viewed from CPU 31.

Address decoder 41 decodes address signals generated by CPU 31. When an address is designated by CPU 31, decoder 41 provides a select signal to ROM 43, DRAM 45, I/O port 49 and laser I/F unit 51 according to allocation in their designated memory areas. ROM 43 stores an operating program and CPU 31 normally operates according to the program stored in ROM 43. DRAM 45 is utilized for the development and processing of print data into bit image data. Since it is generally necessary to store image data for at least one page, DRAM 45 is provided with a capacity of at least 2 Megabytes.

MCU 47 analyzes and processes the control signals provided from the CPU 31 and outputs control signals for ROM 43 and DRAM 45. MCU also provides read/write signals for memories 43 and 45 and for I/O port 49 and, further, controls the refresh timing for DRAM 45. In this connection, refresh timer 53 is connected to MCU 47, and upon receiving a signal from refresh timer 53, MCU 47 provides a refresh address to DRAM 45 via multiplexer 55 if MCU 47 determines that the timing is proper for memory refresh. I/O port 49 receives print data from computer 5, which is then stored in DRAM 45, and also operates as an interface with xerographic unit 15. Laser I/F unit 51 is connected to electronic control unit 10 and drives and controls the interface of laser unit 12. Electronic control unit 10 also includes timer 57 which is connected to both connector 11 and CPU 31 via the control lines shown in FIG. 2.

The basic function of printer 1 utilizing electronic control unit 10 is to process and develop print data into a bit image in advance of printing. Unit 10 also controls the operation of xerographic unit 15 when print data for one page has been processed into a bit image and is ready for printing while also simultaneously driving semiconductor laser unit 12 to printout the image data on paper P. Beside performing these basic functions, printer 1 of this invention can execute more intelligent printing, as an expanded function utilizing cartridge 3 connected to printer connector 11. Cartridge 3, beside the storage of font data and a software program for interpretation of a page description language, further includes a processor unit to process PDL, which is explained in greater detail below.

C. Configuration of Cartridge 3

FIG. 3 illustrates an external view of cartridge 3, which is designed to be releasably attached in connection port 61 of printer 1. The external construction of cartridge 3 includes a rectilinearly shaped portion for insertion into connection port 61 while a larger trapezoidal shaped portion projects from and remains external of printer 1. When cartridge 3 is fully inserted into connection port 61, a connector portion on the forward end of cartridge 3 is coupled with printer connector 11, and, as a result, printer 1 is electrically coupled to cartridge 3. In this connected state, the larger rearward portion of cartridge 3 is substantially in engagement with the body of printer 1. The upper surface of the rearward portion of cartridge 3 is exposed outside of printer 1 and is provided with an angular surface to prevent the careless placement of objects on the surface of the inserted cartridge.

Reference is now made to FIG. 4 which is a block diagram of the internal circuitry of cartridge 3. In FIG. 4, bus lines are indicated by diagonal slash lines while other connection lines shown are signal lines. Bus lines may be, for example, an 8 bit or 16 bit configuration.

Cartridge 3 includes a CPU 71 which is a separate CPU from CPU 31 of printer electronic control unit 10. CPU 71 may be a RISC type processor which is appropriate for the processing of a page description language (PDL), such as, PostScript®. An address bus, CAD, of CPU 71 is connected to a ROM 73 which stores a page description language, such as, PostScript®, representing character or graphic data or the like, and a PDL program. Address bus CAD is also connected to RAM 75 for storing data, logic array 77 for performing control functions via cartridge address bus, CAD, and selector 79. Both printer address bus, PAD, and cartridge address bus, CAD, are connected to selector 79 and selector 79 is connected as input AD to RAM 95, which may be a 16 Kbyte SRAM. Cartridge data bus CD for CPU 71 is connected to ROM 73, RAM 75, the data input D of first latch 81, the data output O of second latch 82, and an of first bi-directional buffer 84. Buffer 84 is shown as a bi-directional buffer but may also be a single direction buffer for only the transfer of bit image data from bus, CD, to bus, PCD, for storage in RAM 95.

With reference to FIGS. 2 and 4, when cartridge 3 is electrically coupled to printer controller 10 by means of the releasable attachment of connector 90 to connector 11, printer address bus 32 is electrically coupled to its counterpart bus PAD on cartridge 3. Printer data bus, PD, is driven by the output of buffer 92 across attached connectors 90, 11 and received by the input of buffer 52. Control interrupt signals IA and TB also are coupled between the print controller 10 and cartridge 3 by means of connectors 90, 11 as in FIGS. 2 and 4. Both cartridge address bus, CAD, and printer address bus, PAD, are coupled to logic array 77 as inputs.

The primary function of cartridge 3 is to execute bi-directional data communication (read/write) via read-only data bus PD. ROM 91 (e.g., 128 Kbyte ROM) with its input coupled to printer address bus, PAD, operates under the control of control unit CPU 31 and functions similar to an I/O driver. ROM 91 has two portions. A first portion is a translation table containing print data information, a portion of which is illustrated in FIG. 8. The print data, DDh, in the example here is 8 bit wide for a table having 256 memory locations. A second portion contains a program which is executed by control unit CPU 31 for the transfer of print data address signals to cartridge 3. Thus, if cartridge 3 is attached, CPU 31 will function with cartridge ROM 91 rather than control unit ROM 43.

Address signals, YYYYh+DDh, are provided on address buses 32 and PAD which are coupled to and decoded by logic array 77 and utilized for addressing locations in ROM 91 corresponding to print data to be developed. FIG. 8 illustrates a portion of these address signals representing DDh data as part of the byte address and function as an index or pointer to print data locations in the access table of ROM 91. ROM 73 contains operating programs for CPU 71 including a PDL program. As previously indicated, RAM 75 has a large capacity for receiving at least one page of bit image data processed by CPU 71 based upon print data accessed from ROM 91. The data accessed at ROM 91 is provided on OD bus onto the CD bus via latch 82 under the control of logic array 77. The data is developed by CPU 71 and the bit image data is stored in RAM 75 until a full page of data has been completed. Segments of the page image data are thereafter transferred to RAM 95 in segments via buffer 84 when logic array 77 has placed RAM 95 in its write-enable state. Based upon cartridge timing, logic array 77 places RAM into its read-enable state after which the stored image data in RAM 95 is transferred off of cartridge 3 via the read-only data bus, PD under the control of logic array 77, and stored in DRAM 45 in preparation for printing.

An input bus to second buffer 92 is referred to as output bus, OD. Output bus, OD, is connected to the data output of ROM 91, the output O of first latch 81, the input D of second latch 82 and the output of third unidirectional buffer 93. The input of third buffer 93 is connected to printer/cartridge data bus, PCD, which is connected also between first buffer 84 and the data input D of RAM 95. Latches 81 and 82 are tri-state devices and they can latch and hold the contents of their inputs D for presentation at their outputs O under the control of logic array 77. Also, under the control of logic array 77, these latches are able to convert their outputs into a high-impedance state. Logic array 77 is also connected to control selector 79 and RAM 95, which components will be explained later. Logic control array 77 controls selector 79 and RAM 95 either as addressed by CPU 71 via address bus, CAD, or as addressed by CPU 31 in electronic control unit 10 via address bus, PAD, connected to address bus 32 in electronic control unit 10.

It will be understood by those skilled in the art that an alternate approach to the use of the data table in ROM 91 is that the print data portion, DDh, with each address byte on address bus, PAD, may be decoded and data DDh portions provided to a tri-state latch (similar to latches 81 and 82) for transfer to RAM 75 and processing into bit image data. This approach would require additional logic and logic control on cartridge 3 compared to the configuration of FIG. 4, which latter configuration would be a more cost effective approach.

D. Transfer of Data from Electronic Control Device 10

In operation, when CPU 31 of electronic control unit 10 provides an instruction to read the contents at a specified address of RAM 95 in cartridge 3, logic array 77 analyzes the address and switches selector 79 to enable printer address bus, PAD, and to change RAM 95 to its read-enable state. The data read from RAM 95 is transmitted to CPU 31 of electronic control unit 10 via printer/cartridge data bus, PCD, third buffer 93, output data bus, OD, second buffer 92 and printer data bus, PD. Therefore, if the bit image data has already been written in advance in a specific area of RAM 95 by CPU 71 of cartridge 3 via cartridge data bus, CD, first buffer 84 and print/cartridge data bus PCD, the bit image data can be transferred from cartridge 3 over to electronic control unit 10.

It should be noted that there is another way to transfer the bit image data from cartridge 3 to electronic control unit 10. Since first latch 81 is connected to cartridge data bus, CD, CPU 71 can hold the bit image data at first latch 81. When electronic control unit 10 instructs the addresses allotted to first latch 81 under this condition, logic array 77 enables the output 0 from first latch 81 and the latched bit image data is transferred to electronic control unit 10 via output data bus, OD, buffer 92 and printer data bus, PD.

Since the data bus connecting electronic control unit 10 and cartridge 3 is read-only as viewed from electronic control unit 10 via one-way driver 52, it is a simple task to transfer data from cartridge 3. As previously indicated, it is not possible for cartridge 3 to receive any data from control unit 10 by normal access and communication protocol. However, the present invention utilizes the above described architecture to accomplish the transfer of the data to cartridge 3 by the following method.

When control unit CPU 31 executes an instruction via a program stored in ROM 91 to read the contents of a specified address in cartridge ROM 91, logic array 77 analyzes the address and operates second latch 82, via specified timing, to capture the data output of ROM 91. ROM 91 functions as a tri-state device relative to bus, OD. As a result, the data read out from ROM 91, via bus, OD, is latched at second latch 82 and can be read by cartridge CPU 71 through control of logic array 77. At this same time, second buffer 92 is idle so that any data in this latch cannot be read by control unit CPU 31. Thus, there is no problem if control unit CPU 31 tries to read data at buffer 92 via control unit driver 52 and printer data bus, PD, since no data will be present.

CPU 71 will then output a specific address to logic array 77, via address bus, CAD, to enable the output of second latch 82 and reads its contents and stores the content in RAM 75. Thus, data loading from control unit 10 is accomplished in address coding wherein a portion of address data from control unit 10 is utilized as an index or pointer to print data already stored in a memory table in ROM 91. With the decoding of the address data via logic array 77, print data is accessed out of ROM 91 via logic array 77 for development into bit image data.

E. Cooperative Operation of Electronic Control Device 10 and Cartridge 3

Next to be described are the processing operations executed by electronic control unit 10 and cartridge 3. Cartridge 3 processes page description language (PDL) and printer 1 delivers the PDL transmitted from computer 5 to cartridge 3 and, on reception of the processed result from cartridge 3, unit 10 operates xerographic unit 15 to print the developed image data.

Reference is made to FIG. 5 which shows a flowchart of the print process routine executed by electronic control unit 10. When the print process commences, control unit CPU 31 first executes the process of loading contents at a specified address at ROM 91 into RAM 75 (step S100). The expected addressed contents of specified data is returned in the case where cartridge 3 has been attached to printer 1. If the expected specified data is not returned (step S110), CPU 31 determines that cartridge 3 is not attached and alternatively receives print data from computer 5 and develops the bit image data within control unit 10 per se. Then, according to the print data received from computer 5, electronic control unit 10 generates bit image data for a single page (step S120).

If the expected addressed contents is return as specified at the address location in ROM 91 and, therefore, CPU 31 has reliably determined that cartridge 3 is attached (step S110), CPU 31 will proceed as follows. CPU 31 receives print data from computer 5, and receives the image data developed in cartridge 3 according to the print data (step S140). An image data transfer process is executed wherein CPU 31 in printer 1 directly executes a transfer program in cartridge 3, which process is described in greater detail later.

Through the process described above, DRAM 45 stores either the image data generated by electronic control unit 10 when cartridge 3 is not attached or the image data developed by cartridge 3 when cartridge 3 is attached. Then, printer 1 operates xerographic unit 15 according to the developed image data in order to print the image onto paper P (step S150).

Data transfer from electronic control unit 10 to cartridge 3 is executed by the data transfer process routine of printer 1, which is illustrated in the flowchart of FIG. 6, and by the data development process routine of cartridge 3, which is illustrated in the flowchart of FIG. 7. Electronic control unit 10 commences with the data transfer routine shown in FIG. 6 if there is print data to be transferred to cartridge 3. When this processing commences, electronic control unit 10 operates to read address YYYYh+DDh of ROM 91 of cartridge 3 utilizing the hexadecimal data DDh (h is a code indicating hexadecimal representation) as an index to a location in the ROM translator table of FIG. 8 (S200).

Following this operation, logic array 77 of cartridge 3 controls second latch 82 to latch the data read out from ROM 91. As shown in FIG. 8, for 256 bytes of data commencing with addresses starting from YYYYh of ROM 91, data from 00h to FFh is written in advance. When addresses commencing from YYYYh are read utilizing the data to be transmitted as an index, the print data corresponding to the index, which is latched at second latch 82, is provided on output data bus, OD. FIG. 8 shows a specific example for the case wherein print data to be accessed is data 41h.

At this time, cartridge CPU 71 is carrying out the data development process routine illustrated in the flowchart of FIG. 7. CPU 71 determines first if second latch 82 has latched data (step S210) and if it has not yet latched data, will wait until the data is latched. When the data is latched by second latch 82, CPU 71 executes the process of transferring the data from second latch 82 to print data memory, RAM 75 (step S220). CPU 71 also determines if all the print data for one page has been loaded from electronic control unit 10 into RAM 75 (step S230). The foregoing process via steps S210 to S230 are repeated until print data for a single page is completely loaded in RAM 75. The data transferred from electronic control unit 10 to RAM 75 is the page description language (PDL) program.

On completion of the loading of print data for one page (step S230), CPU 71 executes the data development process (step S240). The data development process executed by CPU 71 is a graphic operation to generate and develop the PDL program into a graphic image having a resolution of 300 dpi. The final operational results are sequentially developed at RAM 95 (step S250). The above described processes (steps S240 to S250) are repeated until the completion of the data development and storage of the results. The data development process (step S240) is executed by CPU 71 which is a processor and not CPU 31 of electronic control unit 10. On completion of the image data development (step S260), the operation comes to an [END], and the developed image data is then sequentially transferred to electronic control unit 10 via printer data bus, PD (FIG. 5, step S140).

F. Effectiveness of the First Embodiment

In summary, when cartridge 3, incorporating CPU 71 for image processing, is attached to connector 11 in electronic control unit 10, cartridge CPU 71 receives print data from printer 1 as a portion of the address byte code and accordingly develops the print data into bit image data for transfer to control unit 10 and printing at xerographic unit 15. Therefore, in comparison with the case where cartridge 3 supplies the function of the page description language processor per se, the operating performance of the page description language is significantly improved. It is also possible to supply a higher level page process language, such as, PostScript® level 2 with a cartridge CPU.

It is, thus, possible to transfer print data to cartridge 3 while utilizing connector 11 which is incorporated for the purpose of supplying fonts and a page description language processor to printer 1 and which is equipped with a read-only data bus when viewed from the side of electronic control unit 10. Therefore, the cartridge adapter of this invention may be used with any existing laser or page printer not previously or originally designed for attachment of a PDL interpreter cartridge incorporating a CPU. Therefore, with the employment of such PDL interpreter cartridge, existing printers can be effectively utilized to their fullest potential in performance and speed of printing.

Generally, when a main frame computer functions are improved, the printer connected to the computer becomes a bottleneck in the system. Thus, the older printer may need to be replaced at the time of upgrading the functionality of the main frame computer. With the implementation of the PDL interpreter cartridge of this invention, all that is required is the attachment of cartridge 3 to the older existing printer 1 thereby saving costs in procurement of an new printer.

G. Exemplary Modification of the First Embodiment

In a further expansion of an embodiment of this invention, electronic control unit 10 may include timer 57, which is connected to connector 11 by signal line TB. Signal line TB is also connected to cartridge CPU 71 as an interrupt request. Timer 57 is further connected directly to CPU 31 of electronic control unit 10, and interval timing is setup at timer 57 by CPU 31 to output an interrupt request to cartridge CPU 71 at specified intervals. In periods of elapsed time, cartridge CPU 71 returns to the read mode operation.

Reference is now made to FIG. 9 wherein control unit CPU 31 executes a watch dog interrupt process routine repetitively at specified timing intervals. At the beginning of this routine, CPU 31 first determines whether or not the value at flag, Fwd, is 0 (step S300). The initial value of flag, Fwd, is 0 and remains zero as long as cartridge CPU 71 is operating normally. Therefore, if CPU 31 determines that the value of flag, Fwd, is 0, CPU 31 controls timer 57 to provide an interrupt process request signal, Iwd, to cartridge 3 via signal line TB (step S310). After setting the value at flag, Fwd, to 1 (step S320), CPU 31 terminates this routine upon reaching RTN.

On receiving the interrupt process request signal, Iwd, via signal line TB, cartridge CPU 71 commences an interrupt acknowledge process routine illustrated in FIG. 10. With the commencement of this routine, CPU 71 executes a process to increment the value of variable, Tc, by 1 (step S330), which process relates to the time required for processing page description language after the power is turned on. Then, CPU 71 executes a process to decrement the variable, T0, by 1 (step S340), which process is utilized for the monitoring of the wait time for print data reception from electronic control unit 10 and the amount of time required for completion of the printing on paper P. Since cartridge 3 does not have a counting timer for keeping track of timing, these signals from electronic control unit 10 are utilized for timing at the cartridge adapter.

After output of the interrupt acknowledge signal (step S350), CPU 71 terminates this routine upon reaching RTN. The interrupt acknowledge signal provided from CPU 71 is provided to CPU 31 of electronic control unit 10 as interrupt acknowledge signal, IA, via connectors 90 and 11. On receiving signal, IA, CPU 31 utilizes the response time interrupt process routine of FIG. 11. On commencing this routine, CPU 31 resets the value at flag, Fwd, to 0 (step S360) and terminates the routine upon reaching RTN.

Thus, so long as the foregoing described processing is being executed in a normal manner at both electronic control unit 10 and cartridge 3, a condition where the value at flag, Fwd, is at 1 will not occur. Therefore, the determination made at step S300 of the routine in FIG. 9 is always [YES], and cartridge CPU 71 utilizes the interrupt process request signal, Iwd, to count the time required for the page description language.

If, on the other hand, cartridge CPU 71 cannot operate properly due, for example, to program run-way, the interrupt acknowledge process routine of FIG. 10 and the response time interrupt process routine of FIG. 11 will not be executed. As a result, the value at the flag, Fwd, will remain at 1 and the determination at step S300 will be [NO]. CPU 31 will recognize this as a failure to operate and communicate and will execute the required processes after cartridge 3 has hung up from further processing (step S370). These processes include visual and/or audio indication to the user of the occurrence of a problem, followed by reset and reinitialization of cartridge 3 and restart at the print data transfer step. On completion of these processes, the value at the flag, Fwd, is reset to 0 (step S380 in FIG. 9) and CPU 31 will terminate this routine upon reaching RTN.

The above described processing is further illustrated by way of the block diagram in FIG. 12. When the interrupt process request signal, Iwd, is provided from timer 57 of electronic control unit 10, interval timer process unit 393 provides for counting of the timer variables, Tc; T0, for page description language (PDL) interpreter or processor 390 and a response process unit 395 outputs an interrupt acknowledge signal, IA, to control unit CPU 31. Interval timer process unit 393 returns the time value, Tc, on receiving a user time request signal, for example, from PDL processor 390 or, upon receiving a time monitoring request for the time waiting for data reception from electronic control unit 10, and returns a time-out signal when the time value, T0, becomes 0.

The architecture described above is has the advantage of being highly simplified since the print data to image data accelerator of cartridge 3, separately attached to printer 1, does not require its own timer in cartridge 3 and can utilize timer 57 of electronic control unit 10 to accurately detect an operational problem in cartridge 3. Although the embodiment utilizes control unit CPU 31 to detect a problem in cartridge 3, a circuit exclusively for problem detection can be incorporated in either printer 1 or in cartridge 3.

Reference is now made to the embodiment shown in FIGS. 13 and 14. Cartridge 3 is determined to be active or inactive by control unit CPU 31 when CPU 31 reads the contents of a specified address in ROM 91 and determines that cartridge 3 is attached if the contents are at a specified data location. Therefore, if cartridge 3 is attached, it is always active, but it is also possible that, as attached, the cartridge may be alternately active or inactive too. In such a situation, the continual detachment or attachment of cartridge 3 is not good relative to durability. For this reason, cartridge 3 may be provided with a switch 400 which, if in its OFF state, will prevent cartridge 3 from being responsive to transmit the specific code indicative that cartridge 3 is in its attached state when CPU 31 of electronic control unit 10 attempts to read cartridge ROM 91. As shown in FIG. 14, switch 400 may be located on the outside cover of cartridge 3 for easy access by the user when cartridge 3 is attached to printer 1. Although the output of switch 400 in FIG. 13 is provided to control unit CPU 31, it is preferred to connect the switch output to a reset signal generation circuit in cartridge 3 (not shown) so that CPU 71 and cartridge 3 will be reset and initialized when switch 400 is turned ON to permit printer 1 to recognize the presence of cartridge 3.

A possible problem that may occur in the attachment and detachment of cartridge 3 is the situation where cartridge 3 is inserted for attachment while the power for printer 1 has been previously turned ON. Generally, RAM 75 in cartridge 3 would be the dynamic type and, therefore, its memory performance cannot be assured without the elapse of a predetermined time interval after the supply voltage has reached a specified voltage level. This duration of time is different for different types of DRAM memories, and some DRAM memories require about 200 ms. For this reason, if cartridge 3 is immediately attached before electronic control unit 10 accesses the specific address to check for the attachment state of cartridge 3, it may happen that a writing operation onto RAM 75 will not occur or be assured even though electronic control unit 10 recognizes the presence of cartridge 3 and commences writing initial print data to RAM 75. This problem can be prevented by incorporating a timer circuit 410 and control circuit 420 in cartridge 3, illustrated in FIG. 15. Timer circuit 410 provides an output to a control circuit 420. Control circuit 420 is a circuit which outputs specific data, e.g., FFh, which will indicate the presence of cartridge 3 when a specified address is accessed by electronic control unit 10.

Timer circuit 410 incorporates first and second parallel connected resistors R1; R2, which are connected at one end thereof to power supply line, Vcc, of cartridge 3. Transistor Tr has its collector and base respectively connected to first resistor R1 and second transistor R2 and its emitter connected to ground. Third resistor R3 is connected at one end to the base of transistor Tr and capacitor C1 together with second resistor R2. The other end of resistor R3 and capacitor C1 are connected to ground.

In operation, circuit 410 functions as an integrator located at the base terminal of transistor Tr which is switched ON after a period of time. With the introduction of cartridge 3 in printer 1, the power supply line voltage, Vcc, immediately rises in cartridge 3 and the collector terminal voltage of transistor Tr immediately goes to a high level and, at the same time, the base terminal voltage begins to gradually rise. When the base terminal voltage exceeds a specified value, transistor Tr will turn ON and its collector potential will drop to a low level since it will be connected to ground.

The collector terminal of transistor Tr of timer circuit 410 is connected to inverter 430 and the output from inverter 430 is connected to one of the input ports of an AND gate 440 in control circuit 420 which AND gate is attached to the least significant bit D0 of the data bus for control circuit 420. Therefore, so long as the output signal from timer circuit 410 is at a high level, AND gate 440 will be off so that the least significant bit D0 of the output from control circuit 420 is always 0. As a result, the content of the specified address accessed by electronic control unit 10 is always FEh. About 500 ms after cartridge 3 has been energized, the output signal from timer circuit 410 is reversed to a low level. When the content of the specified address is read by electronic control unit 10, the content of FFh is provided as output and electronic control unit 10 is able to recognize that cartridge 3 has been attached. Since the circuit architecture of FIG. 15 allows printer 1 to recognize cartridge 3 only after the function of RAM 75 of cartridge 3 has been assured, print data will not be written from electronic control unit 10 until there is final assurance of the functional operation of cartridge RAM 75.

If cartridge 3 contains a CPU 71 and several memory IC chips, the size of cartridge 3 may itself be large. The size of an attachment in the form of a cartridge 3 coupled to printer 1 is limited by connection port 61. In order to increase the inner capacity of cartridge 3, it is necessary either to increase the thickness of the end or the longitudinal length of cartridge 3. If these methods are attempted, the projected portion of cartridge 3 extending out of printer 1 may be too large for secured connection and stability. In such a case, a cable 450, as shown in FIG. 16, may extend from cartridge 3 and having at its forward end connector 460 adapted for insertion into connection port 61 for direct coupling to connector 11. In this embodiment, there is no limitation on the size of cartridge 3. Further, cartridge 3 can be configured to have practically the same width and length configuration as printer 1 and function as a support beneath printer 1 with cartridge active/inactive switch 400 provided on its front surface for easy user access.

Because cartridge 3 enables data writing with only the need of a read only data bus (PD), various types of present day or existing printers can be easily employed for conjunction with the application of this cartridge. However, these existing printers have different configurations for connection port 61 wherein some printers are adapted to receive a substantial portion of cartridge 3 in the printer while other printers are adapted to receive only connector 90 of cartridge 3 in printer. In the latter situation, it will be very unstable to attach a large size cartridge 3 to extend any great length from the body of the printer. In order to accommodate these variations in existing printers, various types of universal adapters can be provided. In one example shown in FIG. 17, connector 509 of cartridge 503 may be adapted to be rotatable on a printed circuit (PC) board 510 in cartridge 503 so that cartridge 503 can be attached to connector 11 in a folded state orthogonal with PC board 510 or may be maintained in an aligned position with PC board 510 depending on the particular application requirements. This two alternatives are illustrated in connection with FIGS. 18 and 19 wherein if printer connection port 61 is deep insertion pocket as shown in FIG. 18, connector 509 will aligned with PC board 510 for deep insertion inserted and attachment to printer 1. On the other hand, if connection port 61 is shallow insertion pocket as shown in FIG. 19, connector 509 may be folded at a right angle relative to the main body of cartridge 503, which is placed or secured against the outer vertical surface of printer 1.

[II] Second Embodiment

A. Explanation of Overall Configuration

Reference is now made to a second embodiment of this invention. This embodiment combines cartridge 503 as an accessory control device with laser printer 500 as an electronic apparatus. Laser printer 500 uses a xerography unit as in the main printer unit of the first embodiment, and the part that prints using a photosensitive drum functions independently as laser engine 505. Electronic control device 501, which performs control of entire laser printer 500, can perform printing by only sending commands to laser engine 505 via connector CN10 and transferring image data to a prescribed buffer.

As shown in FIG. 20, inside electronic control device 501 are disposed a commonly used CPU (e.g., Motorola's MC68000), ROM 511 that stores the programs executed by CPU 510, a RAM where print data or image data subsequent to being developed are stored, data input port 514 that receives print data from host workstation 507, line buffer 515 connected to bus line 516 which exchanges data with cartridge 503, register 517 for exchanging commands and status information with laser engine 505, console panel I/F 519 that serves as the interface with console panel 518 of laser printer 500, and double-buffer circuit 520 where the image data to be transferred to laser engine 505 is stored. The bus line configuration and the control line configuration are the same as set forth relative to the first embodiment and so they are simplified in this figure.

Double-buffer circuit 520 is equipped with RAMs 520A and 520B, capable of holding 8 lines of print data, i.e., 4-kilobyte capacity, for printing by laser engine 505, and image data from CPU 510 are written alternately to these RAMs by memory write controller 520C. Laser engine 505 performs printing by reading these two RAMs 520A and 520B alternately via memory read controller 520D and converting the image data to a video signal in sync with the rotation of the photosensitive drum. These two RAMs 520A and 520B are provided and written and read alternately because access from CPU 510 and access from laser engine 505 must be performed independently.

After CPU 510 has written data to one RAM, it sets a flag at a prescribed bit in register 517. In response, the laser engine checks this flag and reads the image data stored in the one RAM where the data was written to. During reading, it sets a flag at another bit in register 517 to let CPU 510 know which RAM is being read. Since the other RAM is not accessed by laser engine 505 at this time, CPU 510 writes the next 8 lines of image data into the other RAM during this time period. When laser engine 505 finishes reading data from one RAM, it then resets the flag and switches to reading data from the other RAM. Since the speed with which CPU 510 writes data is faster than the speed with which laser engine 505 reads data, i.e., speed with which printing is executed, it is easy to avoid interference between memory access by the two and realize the reliable transfer of one page of image data.

Cartridge 503 is mounted in connector CN11 of electronic control device 501. The relationship between laser printer 500 and cartridge 503 mounted in it is the same as in the first embodiment in that electronic control device 501 judges whether or not cartridge 503 is installed in connector CN11 at the time of power on, and if it is judged to be installed, then after initialization of device 501, it jumps to a prescribed address in the ROM provided in cartridge 503, after which the processing provided in cartridge 503 is executed in sequence. Cartridge 503 interprets the program generated by the page description language and output from workstation 507 to laser printer 500 and develops it into image data and laser engine 505 performs printing, which are the same as in the first embodiment.

B. Structure of the Cartridge

Cartridge 503 of this embodiment, which is installed in cartridge connector CN11 of printer 500 has a structure like that shown in FIG. 21 in which a multilayer printed circuit board is inserted between an upper case 521U recessed on the inside and a plate-like lower case 521L and cap 540 is inserted on the connector side of printed circuit board 550. Microprocessor 601, to be described below, as well as other circuit elements are mounted on printed circuit board 550. Both upper case 521U and lower case 521L are made from aluminum. Due to the high heat conductivity of aluminum, the heat generated by the internal elements can be effectively carried outside and released.

Two grounding spring members 522 for securing a ground connection with the main printer unit are fixed to the lower case 521L with rivets 524, and a cylindrically shaped piece of silicon rubber 526 for applying pressure on printed circuit board 550 up from below is fitted in rubber retainer 528 on the inside surface of the lower case. Silicon rubber 526 for applying pressure is disposed directly below microprocessor 601. A sheet shaped piece of silicon rubber 552 for radiating heat is positioned between the top surface of microprocessor 601 and the inside surface of upper case 521U to improve contact and heat conductivity. When cartridge 503 is assembled, silicon rubber 526 for applying pressure pushes up on printed circuit board 550 to improve the contact between microprocessor 601, silicon rubber 552 for radiating heat and upper case 521U. As a result, good conductivity of heat from microprocessor 601 to upper case 521U is achieved, thus efficiently radiating heat up and away from the microprocessor.

In assembly, first upper case 521U is turned upside down and silicon rubber 552 for radiating heat is fixed in a prescribed position on upper case 521U, after which printed circuit board 550 is secured to the inside of the upper case by one screw 560. Lower case 521L is then fitted in upper case 521U and each of the corners are secured in place with screws. The cartridge is then completed by inserting cap 540 in the cap opening between upper case 521U and lower case 521L.

FIG. 22A is a plan view showing the top of the printed circuit board 550, and FIG. 22B is a plan view showing the bottom of printed circuit board 550.

As shown in FIG. 22A, microprocessor 601 is attached at one end to the top surface of printed circuit board 550, and at the other end is formed insertion plug 551 in which multiple electrodes are formed in a row for connecting to the connector of the main printer unit.

On each of the sides of printed circuit board 550 near the microprocessor are disposed four ROMs 606–609 for storing the control program and other data and software programs for the operation of microprocessor 601. Four tristate buffers 617 are disposed in a square pattern in the center of printed circuit board 550 next to microprocessor 601. Four dynamic RAMs 611–614 are arranged in a row between the ROMs 606–609 and plug 551 and between tristate buffers 617 and plug 551. To simplify the drawing, the wiring pattern formed on the surface of printed circuit board 550 is omitted.

Microprocessor 601 is a pin grid array (PGA) type element, and the other elements are SOJ, SOP or QFP types of elements. AMD Corporation's Am29030 RISC processor (25-MHz clock frequency), for example, may be employed as microprocessor 601.

As shown in FIG. 22B, plug 551 is also formed at one end on the bottom surface of printed circuit board 550. Further, pins 601p of microprocessor 601 protrude at the other end. Two tristate buffers 619 are disposed on each side of microprocessor 601. ASIC chip 603 contains the control circuit and registers for microprocessor 601 and is disposed in a position in the center of printed circuit board 550 toward plug 551.

EEPROM 670, stores the configuration of the main printer unit (number of pages to be printed, paper size, margins, fonts, communication parameters and other parameters related to the operation of the printer) and is disposed on the side of printed circuit board 550 near ASIC chip 603. Next to EEPROM 670 is disposed a ROM 618, which stores the program for operating the microprocessor of the main printer unit.

On the side opposite EEPROM 670 are disposed two oscillators 661 and 665. First oscillator 661 is a circuit that generates a signal which becomes the basis for the clock signal of microprocessor 601 and generates a 50-MHz clock signal, for example. Second oscillator 665 is a circuit that generates a clock signal for use in the interval timer processor and generates a 5-MHz clock signal, for example. By providing oscillator 661 exclusively for microprocessor 601 in this manner, the clock frequency of microprocessor 601 may be easily changed by merely replacing oscillator 661.

Next to oscillator 665 are disposed reset element 637, FIFO memory 621 and NAND gate 680 in a row along the edge of printed circuit board 550. Five tristate buffers 684-688 are disposed in a row parallel to plug 551.

As shown in FIGS. 22A and 22B, the longitudinal direction of rectangular elements is arranged in the direction of insertion of cartridge 3 on both the top and bottom of printed circuit board 550. This arrangement facilitates the flow of air, as indicated by the arrows, from plug 551 toward microprocessor 601 thereby contributing to cooling of microprocessor 601.

As described above, cartridge 3 is inserted in the cartridge insertion opening of the main printer unit. Regular font cartridges only house ROM memory in which font data is stored. In contrast to this approach, cartridge 3 of this invention is equipped with a microprocessor 601, ROMs 606–609 in which the processing program for microprocessor 601 is stored, a ROM 618 in which the processing program for the processor in the main printer unit is stored and a control circuit including ASIC chip 603.

FIG. 23 shows the wiring relationship between the plug 551 formed on the end of printed circuit board 550 and connector CN11. Plug 551 has 25 terminals formed on each of the two sides (side A and side B) of the two-sided printed circuit board. FIG. 23 lists the signal names corresponding to each of the terminals of plug 551. The slash (/) attached to the front of signal names indicates that the signal is low active. The meaning of each of the signals is as follows.

Signal /ASB: address strobe signal output by CPU 510 (MC68000, Motorola Corporation).

Signal /UDS: upper data strobe signal output by CPU 510.

Signal /LDS: lower data strobe signal output by CPU 510.

Signal /ADS: auxiliary address strobe signal generated based on address strobe signal /ASB in electronic control device 501. This auxiliary address strobe signal /ADS demonstrates different behavior in different types of printers when the printer is initialized. In this embodiment, as described below, the printer type is judged based on the behavior of this auxiliary address strobe signal /ADS at the time of initialization.

Signal /ODTACK: output data acknowledge signal for when data is transferred from cartridge 50 to electronic control device 501.

Signal /CTRGSEL: cartridge selection signal when CPU 510 selects cartridge 3 and accesses ROM 56, register, etc., assigned to the address space inside the cartridge.

Signals A1–A20: address signals output by CPU 510.

Signals D0–D15: output signals from cartridge 50.

Signal R/W: read-write signal output by CPU 510.

Signal SCLK: clock signal output from the oscillator (not shown) built into laser printer 1.

The signal /CTRGS supplied to laser printer 1 becomes low level when cartridge 50 is inserted, and CPU 510 detects that cartridge 50 has been inserted in connector CN11 in this manner.

CPU 510 specifies word addresses using the 23-bit address signals A1 to A23, and it specifies the upper byte and lower byte of each word using the signals /UDS and /LDS. As a result, CPU 510 is capable of using the 16-megabyte address space from 000000h to FFFFFFh. The "h" added to the end of the address here is a hexadecimal indicator.

C. Address Space of the Cartridge

Cartridge 503 is assigned to part of the address space handled by CPU 510 in electronic control device 501. CPU 510 can handle the 16-megabyte address space from 000000h to FFFFFFh, and part of that is set aside for the ROM cartridge. The space assigned cartridge 503 differs depending on the type of laser printer, but in the case of a Hewlett Packard laser printer, normally the 2-megabyte space from 200000h to 3FFFFFh or from 400000h to 5FFFFFh is assigned as shown on the left side of FIG. 24.

Microprocessor 601 disposed in cartridge 503 of this embodiment is a 25-MHz AMD29030 produced by AMD Corporation, and the address space it can handle is 4 gigabytes from 00000000h to FFFFFFFFh. This address space is assigned to not only ROM or RAM but also to the various registers, etc., used to exchange data with electronic control device 501 in the printer. This is shown in FIG. 25. Below, the internal electrical configuration of cartridge 503 is explained together with the address space assignments for both microprocessors.

D. Internal Configuration of the Cartridge

The internal configuration of cartridge 503 is shown in FIG. 26. As shown in the figure, cartridge 503 is configured around microprocessor 601, which handles all control, and comprises mainly memory section 602 made up of the ROM, RAM and their peripheral circuitry, data transfer controller 603, which handles all exchange of data with electronic control device 501, and other circuits.

Memory section 602 comprises ROMs 606–609, totaling 2 megabytes, where the programs executed by microprocessor 601 are stored, selector 610 for facilitating use of ROMs 606 to 609 by bank selection, and RAMs 611–614, totaling 2 megabytes, where the print data from electronic control device 501 is stored or the image data after being developed is stored. ROMs 606 to 609, totaling 2 megabytes, are each 4-megabit (16 bits×256 kilobits) mask ROM, and as shown in FIG. 25, they are assigned the address space 00000000h to 001FFFFFh. ROMs 606 and 607 and ROMs 608 and 609 each make up a bank, and each bank of two make up a 32-bit data bus. ROMs 606–609 and microprocessor 601 are connected via the address bus AAB and the control signal bus. Further, the data bus IDB of ROMs 606–609 is connected to data bus DB29 via data selector 610, whereby microprocessor 601 is capable of reading data from ROMs 606–609.

Except for the least significant 3 bits (A0, A1, A2) of address bus AAB from microprocessor 601, all address signals are input to ROMs 606 and 607 and ROMs 608 and 609. The least significant 2 bits (A0 and A1) are not input because the reading of data by microprocessor 601 is done in 1-word=32-bit units (4-byte units). Also, since address A2 is not assigned, when data of a prescribed area is read, four ROMs 606–609 simultaneously output data. In other words, since access of ROM by microprocessor 601 is often performed on consecutive addresses, two consecutive words, where one word is 32 bits, are read from ROMs 606–609 at one time, and when words that are actually consecutive are read, the bank to which the ROM belongs is sequentially switched by data selector 610 to facilitate the reading of contiguous data. As a result, the reading of data in two contiguous words is extremely fast.

RAMs 611–614, on the other hand, are 16-bit×256-kilobit=4-megabit DRAM, and as shown in FIG. 25, they are assigned to the two megabytes of address space from 20000000h to 201FFFFFh. The memory in cartridge 503 can be increased by 2 megabytes, for which expansion RAM interface 615 is provided. Expansion RAM interface 615 is assigned to the address space from 20200000h to 203FFFFFh. A SIMM type RAM up to 2 megabytes can be installed in expansion RAM interface 615. It is not necessary to limit the expansion RAM to a SIMM type RAM, as it can also be a memory card with a built-in semiconductor memory or a laser card that stores data using the photoelectromagnetic effect.

The data line of RAMs 611–614 and expansion RAM interface 615 are connected directly to data bus DB29 of microprocessor 601, and the address line is connected to address bus AAB of microprocessor 601 via data transfer controller 603. The I/O of each of the registers, etc., described below is assigned to the address space beginning from 80000000h.

When cartridge 503 is seen from electronic control device 501 of printer 500, the ROM is assigned the top 128 kilobytes as shown on the right side of FIG. 24. In other words, cartridge 503 contains the program executed by CPU 510 of electronic control device 501. When cartridge 503 is installed, CPU 510 executes a jump instruction to go to a prescribed address in this ROM upon completion of initialization. Following this, CPU 510 operates according to the procedure stored in this ROM.

When CPU 510 accesses this 128-kilobyte space beginning from the top of the 2-megabyte space assigned to cartridge 503, ROM 618 is accessed by the address signal output via address buffer 617 provided in address bus CAB for the connector of cartridge 503, and the instructions and data stored in ROM 618 is sent to CPU 510 in electronic control device 501 via data buffer 619 provided in data bus CDB for the connector. In FIG. 24, "X" indicates the value of the most significant 4 bits of the top address of the assigned space.

E. Explanation of Data Transfer Controller 603

In the address map shown in FIG. 24 and FIG. 25, addresses other than the addresses assigned to ROM and RAM contain the various control registers and status registers. Since these registers are realized by data transfer controller 603, the data transfer controller will be explained next. The explanation will center around the circuitry, but the address maps shown in FIGS. 24 and 25, are referred to as required.

Data transfer controller 603, shown in FIG. 26, is realized by means of an ASIC gate array 7900. This ASIC is a standard cell, model No. SSC3630, produced by and available from Seiko Epson Corporation, and it is a low-power element manufactured by CMOS processing. Data transfer controller 603 was designed employing Seiko Epson's ASIC design system, LADSNET, which is a CAD system. This CAD system contains latches, flip-flops, counters, programmable logic arrays and other elements used in logic circuit design in the form of libraries, and after the required logic circuit is designed using these, the pattern of the ASIC can be automatically generated.

Data transfer controller 603, realized as an ASIC chip, controls the exchange of data between CPU 510 of electronic control device 501 and microprocessor 601 of cartridge 503 when cartridge 503 is installed in connector CN11 of printer 500. The exchange of data between these two is realized by means of read control circuit 620 for sending data from electronic control device 501 to cartridge 503 via the read-only data bus, FIFO control circuit 623, which performs the same function by passing data via FIFO memory 621 using part of the configuration of read control circuit 620, and double-bank control circuit 624, which makes it possible to read data prepared by cartridge 503 from electronic control device 501. The FIFO memory 621 is a RAM that stores and reads data based on a first-in-first-out procedure. In this embodiment, the RAM employed is Mitsubishi Electric's M66252FP.

The address bus CAB is connected to data transfer controller 603 via address buffer 617 and data bus CDB is connected to electronic control device 501 via data buffer 619 as signal lines with electronic control device 501. Inside data transfer controller 603 is first decoder 631 that receives the signal of address bus CAB and cartridge select signal CSEL and outputs a selection signal to the respective parts inside data transfer controller 603. In a similar manner, address bus AAB and control signal CCC from microprocessor 601 are connected to data transfer controller 603, and inside data transfer controller 603 is second decoder 632 that receives address bus AAB and outputs a selection signal to each of the internal circuits. There is also a bus controller that receives address bus AAB and control signal CCC and outputs address signals and control signals to ROMs 606–609, RAMs 611–614 and expansion RAM interface 615.

In addition to these, data transfer controller 603 also contains various registers, a number of which are automatically written to when a specific process is performed in addition to those that are read from and written to by normal read-write operation. The configuration of these special registers is described below. In a relationship that treats cartridge 503 as a read-only device as seen from electronic control device 501, the registers addressable from electronic control device 501 have a configuration whereby they are written to by performing read function from a prescribed address. In other words, by specifying a prescribed address, a selection signal is output from first decoder 631, and data is written to the register by means of this signal. Reading from the register is performed by a normal read cycle. Further, the reading and writing of data from microprocessor 601 is performed by normal read-write operation. In FIG. 26, registers are shown connected to a readable bus and writing operation is indicated by only arrows. These registers include interrupt request registers 640, polling command registers 643, status registers 645 (STATUS register in FIG. 24), transfer flag registers 647 (BPOLL register in FIG. 25), PROM control registers 649 and control registers 650.

Except for status registers 645 and transfer flag registers 647, all of these registers are generic names for multiple registers assigned as memory mapped I/O to CPU 510 of electronic control device 501 or microprocessor 601 of cartridge 503. The multiple registers are not necessarily assigned contiguous addresses. Interrupt request registers 640 include registers AMDINT0, -1 and -2 and registers AMDCLR0, -1 and -2, shown in FIGS. 24 and 25. Polling command registers 643 include the register POLL and the register MCONTCS. The PROM control registers include the registers EEPCS, EEPSK and EEPDI.

Control registers 650 include those registers not belonging to read control circuit 620, FIFO control circuit 623 and double-bank control circuit 624 and are all those registers not mentioned in the above explanation. These are the registers ADDMUXA, ADDMUXB, CLKDIV, RTCVAL, RTCON, RTCSEL, RTCCLR and SYSKEEP shown in FIGS. 24 and 25.

Each of the 512-byte areas EWWRL and EWWRH shown in the memory maps in FIGS. 24 and 25 are used to write from electronic control device 501 to first and second latches 651 and 652 of read control circuit 620, and register EWRD corresponds to these latches 651 and 652, seen as one word from microprocessor 601. The registers FIFOREQ, FIFORST and FIFOWR correspond to FIFO register 653 of FIFO control circuit 623, and the registers FIRCLK, RDCLK, FIFORD and RDRST correspond to FIFO read register 655 of FIFO control circuit 623. FIFO control circuit 623 has latch 657 that uses some of the functions of read control circuit 620 to retain the data to be written to FIFO memory 621.

The area indicated by the codes DPRAMA and DPRAMB in FIG. 24 are buffers with a 32-byte capacity, and they correspond to first and second buffers 658 and 659 of double-bank control circuit 624 as seen from electronic control device 501. These buffers 658 and 659, as seen from microprocessor 601, are the banks DPWROA and DPWROB shown in FIG. 25. The prescribed bits d1 and d2 of status register 645 are used in the exchange of data via double-bank control circuit 624, which will be discussed in detail later.

F. Explanation of the Registers

Interrupt request register 640 generates the request for an interrupt from electronic control device 501 to microprocessor 601 and retains it. Interrupts from electronic control device 501 to microprocessor 601 are prepared in three levels, and as shown in FIG. 24, they have three registers (AMDINT0, -1, -2). By reading one of these interrupt request registers 640 from electronic control device 501, an interrupt request for microprocessor 601 is generated. These registers are set by a read operation from electronic control device 501, but the data read has no meaning and is not related to the generation of an interrupt request.

Specific examples of configurations of these interrupt request registers 640 are shown in FIGS. 27. These registers are configured from D-type flip-flops, and the output terminal Q of each of the flip-flops 640a, -b and -c are set to active low by the signals /AMDINT0, -1 and -2 output by first decoder 631 by the read operation of the above registers from electronic control device 501, resulting in the output of the interrupt signals /INT0, -1 and -2. The slash (/) affixed to the front of signal names indicates that signal is low active (same below). The registers that clear the outputs of these flip-flops 640a, -b and -c are assigned, as shown in FIG. 25, to prescribed addresses as three read-only registers (AMDCLR0, -1, -2). Therefore, when reading of each of the addresses assigned to these registers is performed by microprocessor 601, second decoder 632 outputs each of the signals /INTCLR0, -1 and -2), and the corresponding flip-flops are preset.

When an interrupt request is given from electronic control device 501, any of interrupt request registers 640 can be accessed, and microprocessor 601 judges the precedence and performs processing in response to the interrupt requests. In this case, microprocessor 601 clears corresponding interrupt request registers 640a, -b and -c.

Polling command registers 643 are used to pass commands from microprocessor 601 to electronic control device 501, and these registers are written to by microprocessor 601 and readable by electronic control device 501. An example of a hardware configuration of these registers is shown in FIG. 28. As shown in the figure, polling command registers 643 comprise two octal D-type flip-flops 643a and -b and one D-type flip-flop 643c, which make up a 16-bit-wide data latch.

Data bus DB29 (16-bit-wide bus) from microprocessor 601 is connected to data input terminals 1D–8D of the octal D-type flip-flops 643a and -b, and data bus DB68 (16-bit-wide bus) from electronic control device 501 is connected to output terminals 1Q–8Q. The signal /MCONTCS output from second decoder 632 at the time of access (register MCONTCS in FIG. 25) of polling command registers 643 by microprocessor 601 is connected to clock terminal CK of the octal D-type flip-flops 643a and -b, and when this signal becomes active low, the contents of data bus DB29 of microprocessor 601 are latched in octal D-type flip-flops 643a and -b. Further, the signal /POLL output from first decoder 631 at the time of access (register POLL in FIG. 24) of polling command registers 643 by electronic control device 501 is connected to output-enable terminal OE, which enables the output of octal D-type flip-flops 643a and -b, and when this signal becomes low active, the data latched in octal D-type flip-flops 643a and -b are output to data bus DB68 of electronic control device 501.

The signal /MCONTCS and the signal /POLL are connected to clock terminal C and preset terminal PR of D-type flip-flop 643c, and the signal CMDRD from the output terminal Q is set to high level when octal D-type flip-flops 643a and -b latch data (signal /MCONTCS is low level) and to low level when this data is read by electronic control device 501 (signal /POLL is low level). The signal CMDRD output from D-type flip-flop 643c becomes prescribed bit d3 (flag CMDRD below) of status registers 645, which is readable by electronic control device 501. Therefore, when electronic control device 501 reads status registers 645, electronic control device 501 can know that a command was set in polling command registers 643 from microprocessor 601.

When electronic control device 501 looks at flag CMDRD, which is bit d3 of status registers 645, and knows that a command has been sent, it reads the contents of polling command registers 643, i.e., command sent from microprocessor 601, in a normal read cycle. The command may be an instruction to begin transfer of the print data to data transfer controller 603, an instruction to begin printing or the display of a message in console panel 518. When electronic control device 501 reads the contents of polling command registers 643, the output signal CMDRD of D-type flip-flop 643c is inverted to high level by the signal /POLL as shown in FIG. 28. Therefore, microprocessor 601 can determined whether or not the command it provided as an output was read by electronic control device 501 by monitoring the prescribed bit d2 of transferred flag register 647.

In addition to the above-described information that indicates the whether or not a command has been set from microprocessor 601, status registers 645 also hold the information shown in FIG. 29. A description of each bit is as follows. Bit d0 is set to low level by the signal EWRDY generated in read control circuit 620 when data is written to read control circuit 620 from electronic control device 501, and when this data is read by microprocessor 601, bit d0 is set to high level by a signal from second decoder 632. This bit is called flag EWRDY.

Bits d1 and d2 indicate whether double-bank control circuit 624 can be accessed from electronic control device 501 or microprocessor 601, and are respectively referred to as flag ADDMUXA and ADDMUXB. These two bits correspond respectively to the two transfer banks built into double-bank control circuit 624. These bits d1 and d2 are set and reset by microprocessor 601 writing data to bit d0 of the registers ADDMUXA and ADDMUXAB included in the control registers 650 as shown in FIG. 25. Therefore, by setting this flag to low level before microprocessor 601 writes data to one of the banks of double-bank control circuit 624 and resetting it to high level upon completion of writing and having electronic control device 501 read data from the bank for which the flag is high level, data can be passed continuously from microprocessor 601 to electronic control device 501 by alternately writing data to and reading data from these two banks.

Bit d3 (flag CMDRD) has already been described. Bit d5 is flag CLKDIV, which is set based on the operation clock of microprocessor 601. The operation clock of microprocessor 601 is the clock CLK output from first oscillator 661, which employs externally attached liquid crystal vibrator CRC1, and when microprocessor 601 writes level 0 to the prescribed bit d0 of register CLKDIV of control register 650, the operation CLK of microprocessor 601 becomes 25 MHz, and when level 1 is written to bit d0, then the operation clock becomes 12.5 MHz. The flag CLKDIV of status registers 645 as seen from electronic control device 501 is set to a low level when this clock CLK is 25 MHz and is set to a high level when it is 12.5 MHz. When it is necessary for electronic control device 501 to know the frequency of the operating clock, i.e., operating speed, of microprocessor 601 in order to match timing for data transfer, etc., it checks this bit of status registers 645.

Bit d6 is the flag ADMON, which is set to high level when microprocessor 601 is operating and to low level when it enters the sleep mode. In this embodiment, microprocessor 601 performs processing that receives the page description language from electronic control device 501 and develops it into image data, and therefore when a prescribed amount of time has elapsed during which no page description language to be processed is sent from electronic control device 501, microprocessor 601 reduces its initial operating frequency by one half to 12.5 MHz in order to reduce power consumption, and after more time has elapsed, it stops its own operation and enters the so-called "sleep mode." At this time, microprocessor 601 writes level 0 to register ADMON of control register 650. As a result, this bit d6 of status registers 645 becomes low level as seen from electronic control device 501, and by checking this bit, electronic control device 501 can know the operating mode of microprocessor 601.

This time is measured with a real-time clock built into data transfer controller 603. The clock RCLK for this real-time clock is a clock from second oscillator 667 configured using an externally attached liquid crystal vibrator 665. The real-time clock is disposed inside bus controller 635, and it receives instructions from microprocessor 601 to measure the elapse of prescribed time periods. The reason why two sets of liquid crystal vibrators and oscillators are employed is to make it possible to change the operating clock CLK of microprocessor 601 independently of the operating clock RCLK of the real-time clock.

The real-time clock sets the d1 bit of registers RTCVAL and RTCSEL, which belong to control registers 650, to low or high, and it is capable of specifying four interval timers, which it can start by writing level 1 to the prescribed bit d0 of the register RTCON. A timer that has been started outputs an interrupt request signal to microprocessor 601 at prescribed intervals until level 0 is written to bit d0 of register RTCON and it is stopped. When microprocessor 601 receives this interrupt request signal, it reads register RTCCLR and clears the interrupt request. The output of these interval timers are used for counting user time, etc., in the processing of the page description language.

Next is an explanation of the configuration of PROM control registers 649. PROM control registers 649 include the registers EEPCS, EEPSK and EEPDI, shown in FIG. 25, but these registers are memory built into cartridge 503 and are used to exchange data with EEPROM 670, which is capable of electrical erasure and rewriting of data.

Cartridge 503 of this embodiment stores the various variables (configuration) required for operation of laser printer 500 in EEPROM 670. EEPROM 670 is one that reads, erases and writes data by serial transfer. In this embodiment the EEPROM employed is National Semiconductor's NMC93C66X3. EEPROM 670 has a storage capacity of 16 bits×256 bytes (number of registers) and is capable of reading, erasing or writing the contents of any specified register. When EEPROM 670 is set to a selection condition by the chip select signal CS, the "0" and "1" data sent to the serial data input terminal $D_{in}$ is received in sync with the serial data clock SL, but the first three transferred bits of the data is interpreted as a command to the EEPROM, and the next 8 bits are interpreted as the register number where the data is to be read, erased or written. In the case of writing data, the data to be stored are supplied to the data input terminal $D_{in}$ in sync with the serial data clock SL following these command and register specifications.

The register EEPCS switches the chip select signal, and when microprocessor 601 writes level 1 to bit d0 of this register, EEPROM 670 goes to a select condition. Register EEPSK generates the serial data clock SK, and when microprocessor 601 alternately writes level 0 and level 1 to this register, it generates the serial data clock for EEPROM 670. The register EEPDI holds the 1-bit data to be written to EEPROM 670, and microprocessor 601 rewrites to the register EEPSK and rewrites the prescribed bit d0 of register EEPDI according to the data to be written in sync with the generation of the serial data clock SK. The data output terminal Dour Of EEPROM 670 is the prescribed bit d0 of the transfer flag register 647 explained above, and if microprocessor 601 reads bit d0 of the transfer flag register 647 in sync with the serial data clock SK after it outputs the data read command and the number of the register to be read to EEPROM 670, then it can read the contents of the specified register. Since the data stored in EEPROM 670 is retained even after the power is turned off, the contents of EEPROM 670 can be read immediately after laser printer 500 is powered on again, thus making it possible to return the configuration to the condition it was in immediately before powering off.

G. Configuration and Operation of Read Control Circuit 620

Next, an example configuration of read control circuit 620 and a data transfer procedure using read control circuit 620 are explained. Read control circuit 620 comprises two 8-bit first and second latches 651 and 652 in addition to, as shown in FIG. 30, ROM 671 that outputs the data required for transfer, three-input AND gate 672, and D-type flip-flop 674 that generates the flag EWRDY (bit d0) for status registers 645. When read control circuit 620 is viewed from electronic control device 501, these latches correspond to two registers EWWRL and EWWRH, which transfer data in 8-bit units, as shown in FIG. 24. These registers are used to transfer the lower byte and upper byte, respectively, of the 16-bits/word data. First and second latches 651 and 652 correspond to the register EWRD shown in FIG. 25 when viewed from microprocessor 601. In other words, microprocessor 601 can read both latches 651 and 652 as one word via data bus DB290.

ROM 671 of read control circuit 620 stores 256 bytes of data; e.g., it can be realized with a one time PROM, a low-capacity PROM, etc. Of course it may also be realized using part of a large-capacity ROM, and the same function can be achieved when RAM is used by transferring the data in advance. The lower 8 bits (AC1–AC8) of the address line from connector address bus CAB are connected to address terminals A0–A7 of ROM 671, and the data terminals 00–07 are connected to the inputs 1D–8D of first latch 651 and second latch 652. The outputs of ROM 671 are also output to FIFO control circuit 623 as data bus Z0–Z7 for FIFO control circuit 623.

The outputs of first latch 651 and second latch 652 are connected to data bus DB29, and these can be read by microprocessor 601 as the register EWRD. The output signal /EWROM of three-input AND gate 672 is input to chip select CE and output-enable OE of ROM 671, and when any one of the signals /EWWRH, /FIFOWR and /EWWRL input to three-input AND gate 672 becomes low active, this signal becomes active, at which time ROM 671 outputs the data at the address specified by the lower 8 bits of connector address bus CAB.

The signal /EWWRH becomes low level when transfer of the upper byte is specified by read control circuit 620, the signal /EWWRL becomes low level when transfer of the lower byte is specified by same, and the signal /FIFOWR becomes low level when data transfer is specified by FIFO control circuit 623. Since the signal /EWWRL and the signal /EWWRH are input to the clock terminals CK of first latch 651 and second latch 652, respectively, when these signals become active and data is output from ROM 671, this data is held in first latch 651 and second latch 652. Moreover, since the signal /EWWRL is input to the clock terminal C of D-type flip-flop 674, the output Q of D-type flip-flop 674 is inverted to low level when the lower byte is transferred. The output EWRDY is handled as bit d0 of status registers 645 and bit d1 of transfer flag registers 647, i.e., flag EWRDY.

First latch 651 and second latch 652 are handled as register EWRD by microprocessor 601, and therefore when microprocessor 601 goes to read the data held by first latch 651 and the second latch 652, it performs a read operation on the register EWRD. At this time, the signal EWRD becomes low level, and this signal outputs the previously held data from the output side of first latch 651 and second latch 652, i.e., to data bus DB29, connected to the output-enable terminal. This signal /EWRD is connected to the preset terminal PR of D-type flip-flop 674, and, therefore, the signal EWRDY, which is the Q output of D-type flip-flop 674, is inverted to high level at the same time microprocessor 601 reads the data of first latch 651 and second latch 652. In other words, the flag EWRDY, which is bit d0 of status registers 645 and bit d1 of transfer flag registers 647, is set to level 1.

Assuming this hardware, electronic control device 501 and microprocessor 601 transfer data from electronic control device 501 to microprocessor 601 according to the following procedure. The data to be transferred from electronic control device 501 to microprocessor 601 is print data electronic control device 501 has received from workstation 507 and is the page description language program to be processed in microprocessor 601 in cartridge 503. Data transfer by read control circuit 620 is performed by the routine for handling data transfer to cartridge 503 executed by CPU 510 of electronic control device 501 (FIG. 31) and by the data read interrupt handler routine executed by microprocessor 601 of cartridge 503 (FIG. 33).

When the print data to be transferred to cartridge 503 is accomplished, CPU 510 initiates the processing shown in the flowchart in FIG. 31, whereby it first reads the flag EWRDY (bit d0) of status registers 645 (step S700). This flag EWRDY (bit d0) becomes level 0 when data is set in first latch 651 and second latch 652 of read control circuit 620, and when this data is read by microprocessor 601, the flag is set to level 1, after which it is determined whether or not flag EWRDY has been set to level 1 (step S705).

CPU 510 is in standby condition until flag EWRDY is level 1. When it becomes level 1, CPU 510 reads the addresses corresponding to [top address of area EWWRH+ data D×2 to be transferred]. When reading of the area EWWRH is performed, the data is provided as an output from ROM 671. As shown in FIG. 32, the 256 data at the even-numbered addresses from 00h to FFh from the top address EWWRH is written in order to ROM 671. The reason why data is not positioned at odd-numbered addresses is basically because data access by CPU 510 is performed in single words (16 bits) and because word units cannot be accessed beginning from odd-numbered addresses (results in address bus error). When an address separated from the top of the area EWWRH by D×2 is read, the data D from ROM 671 is read and is latched in second latch 652 as shown in FIG. 30.

When transfer (second latch 652 holds data) of the upper byte of the data to be transferred is performed in this manner, CPU 510 performs transfer of the lower byte (first latch 652 holds data) in the same manner (step S715). Assuming one word of data is being held by first and second latches 651 and 652 as a result of the above processing, CPU 510 performs processing that sets one interrupt request register (AMDINTO in this embodiment) (step S720).

CPU 510 then repeatedly executes the transfer handler routine shown in FIG. 31, but when data is held by first latch 651, the flag EWRDY is set to a low level, as shown in FIG. 30, and, therefore, the next data transfer is not processed until flag EWRDY again becomes high or level 1 (steps S700, S705).

When CPU 510 sets the interrupt request register (AMDINTO), microprocessor 601 receives this interrupt request and initiates the data read interrupt handler routine shown in FIG. 33. This processing is initiated immediately after data is held in first and second latches 651 and 652 in read control circuit 620, and microprocessor 601 reads the one word of data prepared by electronic control device 501 by reading the register EWRD (step S730). Next, microprocessor 601 transfers the data it just read to a prescribed area in RAMs 611–614 (step S735).

By means of the processing described above, electronic control device 501 is capable of transferring data to cartridge 503, which is connected by no more than the data bus CDB, which is a read-only line. Moreover, since data is written in byte units and is read in word units, microprocessor 601 takes in data with great efficiency. This explanation covers the transfer of one word of data, but data do not have to be transferred in word units and can be transferred in byte units. In that case, only transfer that uses the area EWWRL is performed and the upper eight bits of data can be discarded by microprocessor 601.

H. Configuration and Operation of FIFO Control Circuit 623

FIFO control circuit 623 is equipped with latch 657 that latches the data to be written to FIFO memory 621, FIFO write registers 653 that control the writing of data to FIFO memory 621 and FIFO read registers 655 that control the reading of data from same. FIFO memory 621 can hold 2048 bytes of data and is equipped internally with an address counter for writing and a counter for reading. FIFO memory 621 also has a write reset terminal and a read reset terminal for resetting these respective counters, an 8-bit data bus on the write side, an 8-bit data bus on the read side, a clock terminal for writing and a clock terminal for reading.

By utilizing FIFO memory 621, CPU 510 in electronic control device 501 can employ FIFO control circuit 623 to transfer data to microprocessor 601. Data transfer using read control circuit 620 is performed on a byte unit basis, whereby each time a byte of data is transferred, an interrupt request signal is output to microprocessor 601 to notify it of the transfer, while data transfer using FIFO control circuit 623 takes advantage of the function of FIFO memory 621 to combine multiple bytes for transfer. In order to transfer data from electronic control device 501 to microprocessor 601, CPU 510 of the electronic control device executes the transfer handler routine shown in FIG. 34 and microprocessor 601 of cartridge 503 executes the handler routine shown in FIG. 35. First is an explanation of the handler routine illustrated in the flowchart of FIG. 34.

When CPU 510 of electronic control device 501 initiates the data transfer handler routine shown in FIG. 34, first the register FIFORST of FIFO write circuit 654 of FIFO control circuit 623 is read and the write address counter is reset (step S750). Next, the variable N is reset to 0 to count the number of data to be read out (step S755). Following this, the addresses [top address of register FIFOWR+data D×2 to be transferred] are read (step S760). When these addresses are read, a prescribed address in ROM 671 is accessed (see FIG. 32) in the same manner as read control circuit 620, the data D to be transferred by CPU 510 are provided as output, and is latched in latch 657 via bus Z0–Z7, shown in FIG. 30.

Next, the data D read from register FIFOREQ of FIFO control circuit 623 and held in latch 657 is transferred to FIFO memory 621 (step S765). When register FIFOREQ is read, a write clock is output to the write clock terminal of FIFO memory 621, and the data D held in latch 657 is written to the address indicated by the write address counter of FIFO memory 621. At the same time, the contents of the write address counter in FIFO memory 621 are incremented by 1. When one byte of data is written in this manner, the variable N, which indicates the number of data transferred, is incremented by 1 (step S770), and judgment is performed to determine whether the variable N is equal to the total byte number X of the data to be transferred (step S775). Therefore, the processing in steps S760 to S775 is repeated until the byte number N of the transferred data is equal to the total byte number X of the data.

When all data have been transferred, CPU 510 sets one of the interrupt request registers (AMDINT1) to notify microprocessor 601 that the transfer of data is complete (step S780), after which the routine escapes to NEXT and is terminated.

Microprocessor 601, on the other hand, initiates the data receive interrupt routine, shown in the flowchart of FIG. 35, when it receives interrupt request AMDINT1. When this routine is initiated, microprocessor 601 first reads the register RDRST in FIFO read registers 655 of FIFO control circuit 623 and resets the address counter on the read side of FIFO memory 621 (step S800). Next, the variable M for counting the number of received data is reset to 0 (step S805).

Following this, the register FIRCLK in FIFO read registers 655 is read (step S810), and the read data is transferred to a prescribed area in RAMs 611–614 (step S815). When the register FIRCLK is read, a read clock is output to the clock terminal on the read side of FIFO memory 621, and the data D at the address indicated by the read address counter at that time are read out. At the same time, the contents of the read address counter in FIFO memory 621 are incremented by 1. The reason why data is normally transferred via FIFO control circuit 623 is because it is the page description language program, and the received data is transferred immediately to a prescribed area in RAM for the development of image data.

When one byte of data is received, the variable M is incremented by 1 (step S820), and the variable M is judged whether or not it is equal to the total byte number X (step S825). Therefore, the processing in steps S810 to S825 above is repeated until the byte number M of the received data equals the total number X for the data.

When it is determined that all data has been received, microprocessor 610 writes a command to polling command registers 643 that indicates the completion of the writing of data (step S630). CPU 510 of electronic control device 501 knows that data reception by FIFO control circuit 623 is complete by reading the contents of polling command registers 643. Microprocessor 601 then escapes to RTN and terminates this routine.

By means of the processing described above, large amounts of data can be efficiently transferred. The transferred data is stored in a prescribed area in RAMs 611–614 of data transfer controller 603 and wait for processing by microprocessor 601. Microprocessor 601 receives all of the print data (program described by the page description language) to be developed by electronic control device 501, activates the interpreter of the page description language stored in ROMs 606–609, and processes the print data stored in the prescribed area in RAMs 611–614. This processing develops the image, and the developed result is stored as image data in a prescribed area in RAMs 611–614.

I. Configuration and Operation of Double-Bank Control Circuit 624

The image data obtained upon completion of image development is transferred to electronic control device 501, where it is stored in RAM 512 and printed by laser engine 505 according to a prescribed timing. The image data is transferred by double-bank control circuit 624. Double-bank control circuit 624 transfers from microprocessor 601 to electronic control device 501 and is equipped with two banks that store 32 bytes (16 words) of data. These are referred to as A bank and B bank. Since the hardware of both banks are the same, only the configuration for A bank is shown in FIG. 36.

The address and data buses of each of these banks are configured such that they can be switched from microprocessor 601 and from the electronic control device 501. As shown in FIG. 36, they are configured from data selectors 681 and 682, which select the address line; the four octal line buffers 684 to 687, used in two sets of two each and select the data bus (16 bits wide); RAMs 691 and 692, which have a 32-byte storage capacity; OR gates 694 and 695, which make up the other gates; and inverter 696. In FIG. 36, a configuration is shown in which two memory chips with a 32-byte storage capacity are employed, but the memory can also be achieved by switching the upper address of a single memory chip.

Data selector 681 is configured such that it selects the least significant four bits (AC1–AC4) of address bus CAB on electronic control device 501 side and the lower four bits (A2–A5) of address bus AAB on microprocessor 601 side and outputs them, and selection of the address bus is performed by the signal ADDMUXA (bit d0 of register ADDMUXA) connected to the select terminal S. Data selector 682 switches the read-write signal for RAMs 691 and 692 in addition to selecting an address bus, and in a similar manner, the signal ADDMUXA connected to the select terminal S determines which signal is connected to the chip select terminals CE1 and -2 and the output-enable terminal OE by switching them.

Octal line buffers 684 and 685 are tristate line buffers connected to data bus DB29. When the gate terminals 1G and 2G become low or level 0, data bus DB29 on microprocessor 601 side and the data bus of RAMs 691 and 692 are connected, resulting in a condition that allows writing of data from microprocessor 601 to RAMs 691 and 692. The output of OR gate 694, whose inputs are the signal /DP-WROA and the signal /DDMUXA, is connected to the gate terminals 1G and 2G of octal line buffers 684 and 685. The signal /DPWROA becomes low or level 0 when microprocessor 601 writes data to A bank. Therefore, by setting bit d0 of register ADDMUXA to low level in advance of writing data to A bank, when microprocessor 601 does write data to A bank, the gates of octal line buffers 684 and 685 open and the data output to data bus DB29 is provided as output to the data bus of RAMs 691 and 692, where they are written.

When gate terminals 1G and 2G of octal line buffers 686 and 687 become low or level 0, data bus DB68 on electronic control device 501 side and the data bus of RAMs 691 and 692 are connected, resulting in a condition wherein data can be read out from RAMs 691 and 692 to electronic control device 501. The output of OR gate 695, whose inputs are the signal /DPOE1A and the signal ADDMUXA inverted in inverter 696, is connected to gate terminals 1G and 2G of octal line buffers 686 and 687. The signal /DPOE1A becomes low level when electronic control device 501 tries to read the data of A bank. Therefore, by setting bit d0 of register ADDMUXA to high level in advance of reading the data of A bank, the gates of octal line buffers 686 and 687 open and the data output to the data bus of RAMs 691 and 692 are output to data bus DB68 when electronic control device 501 performs a read operation on A bank.

The transfer processing of image data by the microprocessor 601 and its receiving processing by the CPU 510 of electronic control device 501 are explained below assuming this hardware. FIG. 37 is a flowchart illustrating the transfer start handler routine for image data executed by microprocessor 601. As shown in FIG. 37, microprocessor 601 sets a transfer start command in polling command register 643 before transferring image data (step S850).

CPU 510 of electronic control device 501 reads polling command register 643 and executes the response handler routine shown in FIG. 38. In other words, electronic control device 501 determines whether or not laser printer 500 is in a print-enabled condition (step S860), and if it determines that it is in a condition that will allow printing, then it sets one (AMDINT2) of the interrupt request registers (step S865) and escapes to NEXT and temporarily terminates the routine. If the printer is not in a condition that will allow printing, then CPU 510 performs processing that notifies microprocessor 601 of cartridge 503 (step S870). A condition that will not allow printing is one in which the laser engine has not completely warmed up yet, or there is a paper jam or other condition that will not allow printing even though the image data have been received.

When the interrupt request signal AMDINT2 is received from electronic control device 501, microprocessor 601 initiates the data transfer interrupt handler routine shown in FIG. 39. When this processing is activated, microprocessor 601 first writes level 1 to bit d0 of register ADDMUXA (step S900). When bit d0 of register ADDMUXA is level 1, the data bus of RAMs 691 and 692 is connected to data bus DB29 on microprocessor 601 side as was explained using FIG. 36, thus disabling access from electronic control device 501.

Next microprocessor 601 transfers 16 words (32 bytes) of data to A bank DPWROA (step S902). When data is written to A bank DPWROA, the signal /DPWROA shown in FIG. 36 becomes low or level 0, and the data is written to RAMs 691–692 via octal line buffers 684 and 685. Upon completion of transfer of the 16 words of data, microprocessor 601 writes level 1 to bit d0 of register ADDMUXA (step S904), and data bus of RAMs 691 and 692, which make up A bank, is connected to data bus DB68 of electronic control device 501.

Microprocessor 601 then writes the command data that notifies that transfer to A bank is complete to polling command registers 643 (step S906). This completes transfer of data to A bank, and microprocessor 601 then executes the same processing, as in the case above, with respect to B bank (step S910). When data transfer to B bank is complete, microprocessor 601 writes command data that notifies that transfer is complete in the same way to polling command registers 643. In this manner, the transfer of a total of 32 words (64 bytes) of data to A and B banks from cartridge 503 is completed.

In response to the above processing performed by microprocessor 601, CPU 510 of electronic control device 501 executes image data receive handler routine shown in FIG. 40. In other words, CPU 510 first reads bit d3 of status registers 645, i.e., flag CMDRD, (step S920) and determines whether or not it is at level 0 (step S925). When command data is written to polling command registers 643 by microprocessor 601, flag CMDRD is set to level 0, and, therefore, CPU 510 reads the command data in polling command registers 643 (step S930).

CPU 510 checks the read command data and determines if it is command data that indicates that data transfer to A bank is complete (step S935), and if it is not, then CPU 510 executes other processing (step S940). When the command data in polling command register 643 indicate that data transfer to A bank is complete, electronic control device 501 reads the 16 words in A bank DPRAMA (step S945; see FIG. 24) and transfers the read data to RAM 512 (step S950).

Since the above processing completes the reading of the 16 words of data in A bank, electronic control device 501 sets one interrupt request register (AMDINT2) that will allow transfer of the next 16 words from microprocessor 601. The processing in steps S920 to S955 is then repeated with respect to B bank. In other words, when it is determined that the transfer of data by microprocessor 601 from B bank has been completed based on the command data in polling command registers 643, then one interrupt request register is set to send an interrupt request to microprocessor 601 after which the 16 words of data in B bank DPRAMB is read and transferred to RAM 512.

When it receives the interrupt request, microprocessor 601 executes the interrupt handler routine shown in FIG. 39 again, and, therefore, microprocessor 601 and CPU 510 complete the transfer of all image data by executing both routines shown in FIGS. 39 and 40. If new print data is not received from electronic control device 501 after all image data have been transferred, then microprocessor 601 writes level 1 to register CLKDIV of control registers 650 after a prescribed time period has elapsed and switches its own operating frequency to half, i.e., to 12.5 MHz, to reduce power consumption and reduce the amount of heat generated.

J. Printing of Image Data

Electronic control device 501, which receives the transfer of all image data, prints the image data by exchanging signals with laser engine 505 employing double-buffer circuit 520 and register 517 explained above. The exchange of signals between electronic control device 501 and laser engine 505 is roughly depicted in FIG. 41. Printing is summarized below with reference to FIG. 41.

When the image data that have been developed is received from cartridge 503, electronic control device 501 inquires whether or not laser engine 505 is in a print-enabled condition, and if it determines that preliminary functions have occurred and are completed, e.g., warming up, etc., and the laser engine is in a print-enabled condition, then it outputs the print signals shown in FIG. 41 to laser engine 505 via register 517. When laser engine 505 receives these signals, it immediately starts the motor for paper transport. Rotation of the photosensitive drum, charging processing, etc., are started in sync with the receipt of these signals.

When the paper to be printed reaches a position at a predetermined distance from the photosensitive drum, laser engine 505 detects the front end of the paper and outputs the signal VREQ to electronic control device 501 via register 517. When electronic control device 501 receives signal VREQ, it waits a predetermined period of time, i.e., the time required for the photosensitive drum to rotate to the position where formation of the latent image by the laser beam begins, and outputs the signal VSYNC via register 517. When laser engine 505 receives this signal VSYNC, it outputs the laser beam horizontal sync signal HSYNC via register 517. Since this signal HSYNC is a signal that instructs the beginning of reading one line of image data, laser engine 505 reads image data from either RAM 520A or RAM 520B of double-buffer circuit 520 in sync with this signal. When there is a top margin, control is performed that ignores the signal VSYNC for a predetermined number of lines corresponding to the width of the top margin. This kind of control is the same in forming the bottom margin.

At the same time, CPU 510 counts this signal and transfers the necessary image data to RAM 520A or RAM 520B of double-buffer circuit 520. When a predetermined amount of time has elapsed or the count of the horizontal sync signal becomes equal to a value previously set to conform with the paper size after laser engine 505 detects the trailing edge of the paper, CPU 510 terminates the transfer of image data to double-buffer circuit 520. By means of the above processing, one page of image data is transferred to the laser engine and the image is printed onto paper.

K. Effectiveness of Second Embodiment

The same advantages as achieved in the first embodiment are realized in the second embodiment. Moreover, since an ASIC chip is employed in this embodiment, the circuit can be made more compact and simpler. Further, since both read control circuit 620 and FIFO control circuit 623 are employed to transport data from electronic control device 501 to data transfer controller 603, data can be transferred efficiently by using one or the other depending on the type of data to be transferred. Also, if one circuit should fail, the other circuit can be used to continue the process.

Since electronic control device 501 uses an interrupt to notify in the case of transfer of data to cartridge 503 in this embodiment, microprocessor 601 of cartridge 503 need not continually monitor the operation of electronic control device 501 thereby allowing it to be more efficiently operated.

The embodiment explained above concerned the application of the invention to a printer, but application of the invention is not limited to printers; e.g., it can also be applied to word processors, personal computers and workstations. In recent years, in addition to expansion slots, many computer-related devices have the ability to accommodate cartridge-type expansion devices such as IC cards. By mounting the accessory control device of the invention in a word processor, personal computer, etc., equipped with an expansion slot, IC card, etc., and shifting processing by the processor of the main unit to processing stored in the memory built into the accessory control device by a monitor command, etc., and processing information together with the processor in the accessory control device, the information processing function can be easily upgraded. Further, once control is shifted to the accessory control device, the contents of the processing can be changed in any manner, and therefore, the functions of devices that have already been purchased can be changed or improved and the software in word processors and other dedicated devices can be upgraded.

In this manner, the invention can be applied to all types of devices that employ a processor, e.g., electrical equipment for vehicles, facsimile machines, telephones, electronic notebooks, electronic musical instruments, electronic cameras, translating machines, handy copiers, cash dispensers, remote controllers, calculators and any other information processing device to which an accessory control device can be connected via a connector. If the processor in the main unit of these types of information processing devices has a function that recognizes an accessory control device and transfers its processing to an address prepared in the accessory control device, the accessory control device and information processing device of the invention can be easily realized. Even in cases wherein this function is not provided, various means can be considered for shifting the processor of the main unit to processing stored in the accessory control device.

When the 68000 family of processors read data from a prescribed address, data on the data bus is judged to be fixed or not by the signal DTACK returned to the processor of the device (slave) outputting the data. Therefore, when the processor of the main unit attempts to execute a jump instruction to an absolute address while executing processing stored in ROM in the main unit, the accessory control device analyzes the instruction and detects it as the execution of a jump instruction to an absolute address, and before the original ROM in the main unit can output the target absolute address of the jump to the data bus, the accessory control device outputs the execution address in ROM in the accessory control device to the data bus and returns the signal DTACK to the processor in the main unit, whereby processing is forcibly shifted subsequent to a prescribed address in the accessory control device. Once processing is shifted to ROM in the accessory control device, subsequent processing can be configured in any manner.

This example is premised on the execution of a jump instruction to an absolute address by the processor in the main unit, but since the jump instruction itself comes from ROM in the main unit, a configuration can be employed that supplies a code equivalent to the jump instruction from the accessory control device to the data bus when the instruction is first read from ROM after powering on and also returns the signal DTACK. In these methods, there is a possibility of conflict with the signal DTACK, but the methods can be realized through careful analysis of the bus timing.

Further, in the embodiments described above, the accessory control device is configured as a cartridge capable of being handled as a single unit in which a printed circuit board is housed in a case, but it may also be configured as a single circuit board that mounts in an expansion slot. An accessory control device having multiple connectors can also be realized. In another configuration of the invention, the case itself may be configured as a printed circuit board.

The invention is not limited by the above embodiments; e.g., a configuration in which the cartridge, with built-in outline fonts, receives the character point size and other data from the printer, generates a bit image at the specified point size and transfers it to the printer, a configuration in which the main printer unit is an ink jet printer, and other configurations are possible as long as they do not deviate from the essential points of the invention.

The invention described herein can be applied relative to all types of devices that employ a processor, e.g., electrical equipment for vehicles, facsimile machines, telephones, electronic pocketbooks, electronic musical instruments, electronic cameras, translating machines, handy copiers, cash dispensers, remote controllers, calculators and any other information processing device to which an accessory control device can be connected via a connector. By applying the invention to these devices, the functionality of the electronic apparatus may be improved, added to or changed, and the invention can be utilized in a wide range of fields in industry including effective utilization in existing devices already in the hands of users.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. An intelligent cartridge for releasable attachment to a printer wherein the printer has a printer controller capable of receiving print data from an external source and developing the print data into printer controller developed bit image data for printout, the cartridge including logic means and memory means for receiving the print data from the printer controller when connected thereto, developing the print data into logic means and memory means developed bit image data, and transferring said logic means and memory means developed bit image data to the printer controller for printout in lieu of said printer controller developed bit image data;

the printer further including interval timing means for generating and sending to the cartridge a sequence of timed interval signals for timing operations of the logic means and memory means, the cartridge further including response means for sending acknowledge signals to the printer in response to said timed interval signals, and the printer further including detection means for indicating a malfunction of the cartridge if said acknowledge signals are not received within predetermined lengths of time after said timed interval signals are sent to the cartridge.

2. The intelligent cartridge of claim 1, wherein the detection means further generates a signal to stop operation of the printer controller and reset the logic means if said acknowledge signals are not received within predetermined lengths of time after said timed interval signals are sent to the cartridge.

3. The intelligent cartridge of claim 1, wherein the logic means develops said print data into logic means and memory means developed bit image data using a page description program stored in the memory means, and the interval timing means generates said timed interval signals as corresponding to a length of time required for initializing the memory means to make said page description program available to the logic means after power is applied to the cartridge.

4. The intelligent cartridge of claim 1, wherein the interval timing means generates said timed interval signals as corresponding to a length of time required for the memory means to receive said print data from the printer controller.

5. The intelligent cartridge of claim 1, wherein the interval timing means generates said timed interval signals as corresponding to a length of time required for the printer to print said logic means and memory means developed bit image data.

6. The intelligent cartridge of claim 1, in which said timed interval signals comprise interrupt signals.

7. The intelligent cartridge of claim 1, in which said acknowledge signals comprise interrupt signals.

8. The intelligent cartridge of claim 1, further comprising means for generating a code signal indicating that the memory means is not ready to receive said data signals from the printer controller for a predetermined length of time after the cartridge is attached to the printer.

9. The intelligent cartridge of claim 1, wherein the logic means and memory means receive and develop the print data under timing provided from the printer controller.

10. The intelligent cartridge of claim 1, wherein the logic means and memory means receive the print data via address data transferred to the cartridge from the printer controller as an index for access to the print data in the memory means.

11. The intelligent cartridge of claim 1, wherein the logic means and memory means receive the print data via address data transferred to the cartridge from the printer controller as a print data portion of said address data, the cartridge further including transfer means for receiving said address data and forwarding said print data portion to the logic means for developing into said logic means and memory means developed bit image data.

12. The intelligent cartridge of claim 11, wherein the printer controller includes index means for reading data at a specified address in the memory means which represents an index of a byte distance from a prescribed reference address, bytes defined by said index corresponding to print data to be transmitted, the memory means being configured such that print data equivalent to said byte distance from said reference address is arranged in a sequential order from said reference address.

13. A method of image processing carried out, in part, via a separate intelligent cartridge having its own CPU processing unit and releasably connected to a printer having a CPU operated printer control unit, the cartridge being electrically connected to the printer control unit to provide a read-only address capability to the cartridge and a read-only data capability to the printer control unit, said printer control unit being capable of developing a printer control unit developed bit image based on print data received from an external source and printing the printer control unit developed bit image, and comprising the steps of:

transferring address data from the printer control unit to the cartridge, a portion of said address data comprising an index to the print data;

storing the print data corresponding to said index in memory means in the cartridge;

employing the processing unit to develop a cartridge developed bit image based upon the print data corresponding to said index;

transferring said cartridge developed bit image to the printer control unit to print said cartridge developed bit image;

generating and sending from the printer control unit to the processing unit a sequence of timed interval signals for timing operations of the processing unit;

sending from the processing unit to the printer acknowledge signals in response to said timed interval signals; and indicating a malfunction of the cartridge if said acknowledge signals are not received by the printer control unit within predetermined lengths of time after said timed interval signals are sent to the cartridge.

14. The method of claim 13, further comprising stopping operation of the printer control unit and resetting the processing unit in response to said indication of said malfunction of the cartridge.

15. The method of claim 13, wherein the processing unit develops said cartridge developed bit image using a page description program stored in the memory means, and said timed interval signals are generated as corresponding to a length of time required for initializing the memory means to make said page description program available to the logic means after power is applied to the cartridge.

16. The method of claim 13, wherein said timed interval signals are generated as corresponding to a length of time required for the processing unit to receive said print data from the printer control unit.

17. The method of claim 13, wherein said timed interval signals are generated as corresponding to a length of time required for the printer to print said cartridge developed bit image.

18. The method of claim 13, in which said timed interval signals are generated as interrupt signals.

19. The method of claim 13, in which said acknowledge signals are generated as interrupt signals.

20. The method of claim 13, further comprising feeding from the processing unit to the printer control unit a code signal indicating that the memory means is not ready to receive said data signals from the printer control unit for a predetermined length of time after the cartridge is attached to the printer.

21. A method of image processing carried out, in part, via a separate intelligent cartridge having its own CPU processing unit and releasably connected to a printer having a CPU operated printer control unit, the cartridge being electrically connected to the printer control unit to provide a read-only address capability to the cartridge and a read-only data capability to the printer control unit, said printer control unit being capable of developing a printer control unit developed bit image based on print data received from an external source and printing the printer control unit developed bit image, and comprising the steps of:

transferring address data from the printer control unit to the cartridge, a portion of said address data comprising an index to the print data;

interpreting the print data in the cartridge into a cartridge developed bit image employing the processing unit;

transferring said cartridge developed bit image to the printer control unit to print said cartridge developed bit image;

generating and sending from the printer control unit to the processing unit a sequence of timed interval signals for timing operations of the processing unit;

sending from the processing unit to the printer acknowledge signals in response to said timed interval signals; and indicating a malfunction of the cartridge if said acknowledge signals are not received by the printer control unit within predetermined lengths of time after said timed interval signals are sent to the cartridge.

22. The method of claim 21, further comprising stopping operation of the printer control unit and resetting the processing unit in response to said indication of said malfunction of the cartridge.

23. The method of claim 21, wherein processing unit develops said cartridge developed bit image using a page description program stored in the memory means, and said timed interval signals are generated as corresponding to a length of time required for initializing the memory means to make said page description program available to the logic means after power is applied to the cartridge.

24. The method of claim 21, wherein said timed interval signals are generated as corresponding to a length of time required for the processing unit to receive said print data from the printer control unit.

25. The method of claim 21, wherein said timed interval signals are generated as corresponding to a length of time required for the printer to print said cartridge developed bit image.

26. The method of claim 21, in which said timed interval signals are generated as interrupt signals.

27. The method of claim 21, in which said acknowledge signals are generated as interrupt signals.

28. The method of claim 21, further comprising feeding from the processing unit to the printer control unit a code signal indicating that the memory means is not ready to receive said data signals from the printer control unit for a predetermined length of time after the cartridge is attached to the printer.

* * * * *